(12) United States Patent
Seger, Jr. et al.

(10) Patent No.: US 12,446,798 B2
(45) Date of Patent: Oct. 21, 2025

(54) PERSONAL MONITORING SYSTEM FOR MONITORING BODY CONDITIONS USING E-FIELD COMMUNICATIONS

(71) Applicant: SigmaSense, LLC., Wilmington, DE (US)

(72) Inventors: Richard Stuart Seger, Jr., Belton, TX (US); Michael Shawn Gray, Elgin, TX (US); Kevin Joseph Derichs, Buda, TX (US); Daniel Keith Van Ostrand, Leander, TX (US); Timothy W. Markison, Mesa, AZ (US)

(73) Assignee: SigmaSense, LLC., Austin, TX (US)

( * ) Notice: Subject to any disclaimer, the term of this patent is extended or adjusted under 35 U.S.C. 154(b) by 360 days.

(21) Appl. No.: 17/823,729

(22) Filed: Aug. 31, 2022

(65) Prior Publication Data

US 2022/0409092 A1    Dec. 29, 2022

Related U.S. Application Data

(63) Continuation-in-part of application No. 17/649,506, filed on Jan. 31, 2022, now Pat. No. 12,225,979, (Continued)

(51) Int. Cl.
*G01L 1/14* (2006.01)
*A61B 5/00* (2006.01)
(Continued)

(52) U.S. Cl.
CPC .......... *A61B 5/1038* (2013.01); *A61B 5/0002* (2013.01); *A61B 5/6807* (2013.01); *H04B 13/005* (2013.01)

(58) Field of Classification Search
CPC .......... A61B 5/00; A61B 5/103; H04B 13/00; A43B 3/40; G01N 27/028; G06F 3/041;
(Continued)

(56) References Cited

U.S. PATENT DOCUMENTS 5,437,178 A    8/1995  Esin et al.
6,218,972 B1   4/2001  Groshong
(Continued)

FOREIGN PATENT DOCUMENTS

CN    103995626 A    8/2014
CN    104182105 A    12/2014
(Continued)

OTHER PUBLICATIONS

European Patent Office; Extended European Search Report; Application No. 19853507.2; Jun. 13, 2023; 7 pgs.
(Continued)

*Primary Examiner* — Brandi N Hopkins
(74) *Attorney, Agent, or Firm* — Garlick & Markison; Timothy W. Markison

(57) ABSTRACT

A personal monitoring system includes one or more passive biometric sensors and a communication device. A passive biometric sensor is operable to sense a body condition of a body in accordance with a sense signal at a sense frequency to produce sensed data of a body condition. The passive biometric sensor is further operable to transmit an e-field signal via the body regarding the sensed data, wherein the e-field signal is in accordance with an e-field transmit/receive frequency. The communication device is operable to receive the e-field signal via the body. The communication device is further operable to recover the sensed data from the received e-field signal.

19 Claims, 52 Drawing Sheets

Related U.S. Application Data which is a continuation-in-part of application No. 15/679,831, filed on Aug. 17, 2017, now Pat. No. 11,246,507, application No. 17/823,729 is a continuation-in-part of application No. 17/575,594, filed on Jan. 13, 2022, now Pat. No. 12,181,352.

(60) Provisional application No. 62/376,555, filed on Aug. 18, 2016, provisional application No. 63/202,251, filed on Jun. 3, 2021.

(51) Int. Cl.
*A61B 5/103* (2006.01)
*H04B 13/00* (2006.01)

(58) Field of Classification Search
CPC .... G06F 3/0418; G01D 21/00; G01D 5/2086; G01D 5/245; G01R 29/26; G01R 19/257
See application file for complete search history.

(56) References Cited

U.S. PATENT DOCUMENTS

| | | |
|---|---|---|
| 6,665,013 B1 | 12/2003 | Fossum et al. |
| 7,476,233 B1 | 1/2009 | Wiener et al. |
| 7,528,755 B2 | 5/2009 | Hammerschmidt |
| 8,031,094 B2 | 10/2011 | Hotelling |
| 8,089,289 B1 | 1/2012 | Kremin et al. |
| 8,113,843 B2 | 2/2012 | Naya |
| 8,279,180 B2 | 10/2012 | Hotelling et al. |
| 8,537,110 B2 | 9/2013 | Kruglick |
| 8,547,114 B2 | 10/2013 | Kremin |
| 8,587,535 B2 | 11/2013 | Oda et al. |
| 8,625,726 B2 | 1/2014 | Kuan |
| 8,657,681 B2 | 2/2014 | Kim |
| 8,966,400 B2 | 2/2015 | Yeap |
| 8,982,097 B1 | 3/2015 | Kuzo et al. |
| 9,081,437 B2 | 7/2015 | Oda |
| 9,201,547 B2 | 12/2015 | Elias |
| 9,256,281 B2 | 2/2016 | Ur |
| 9,349,301 B2 | 5/2016 | Ur |
| 10,007,335 B2 | 6/2018 | Lee |
| 10,307,081 B2 | 6/2019 | Nino |
| 2003/0052657 A1 | 3/2003 | Koernle et al. |
| 2005/0235758 A1 | 10/2005 | Kowal et al. |
| 2011/0063154 A1 | 3/2011 | Hotelling et al. |
| 2011/0298745 A1 | 12/2011 | Souchkov |
| 2012/0278031 A1 | 11/2012 | Oda |
| 2013/0278447 A1 | 10/2013 | Kremin |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |
| 2018/0049671 A1* | 2/2018 | Markison ............ A61B 5/7275 |
| 2018/0157354 A1 | 6/2018 | Blondin et al. |
| 2018/0275824 A1 | 9/2018 | Li |

FOREIGN PATENT DOCUMENTS

| | | |
|---|---|---|
| CN | 104536627 A | 4/2015 |
| CN | 107771273 A | 3/2018 |
| EP | 2284637 A1 | 2/2011 |

OTHER PUBLICATIONS

Baker; How delta-sigma ADCs work, Part 1; Analog Applications Journal; Oct. 1, 2011; 6 pgs.

Brian Pisani, Digital Filter Types in Delta-Sigma ADCs, Application Report SBAA230, May 2017, pp. 1-8, Texas Instruments Incorporated, Dallas, Texas.

\* cited by examiner personal monitoring system 10 coupling circuit 72 coupling circuit 72 programmable sense signal generator 102 communication device 12 communication device 12 communication device 12 communication device 12 communication device 12 communication device 12 communication device 12 foot force sensing cell unit 225 foot force sensing cell unit 225 foot force sensing cell unit 225

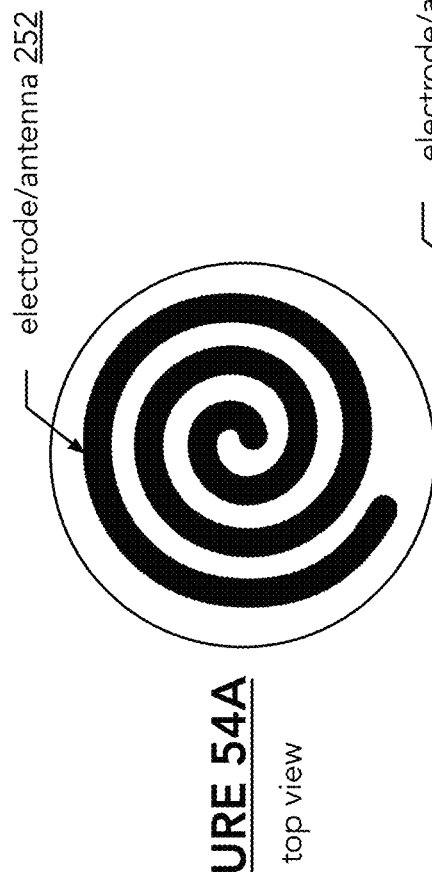
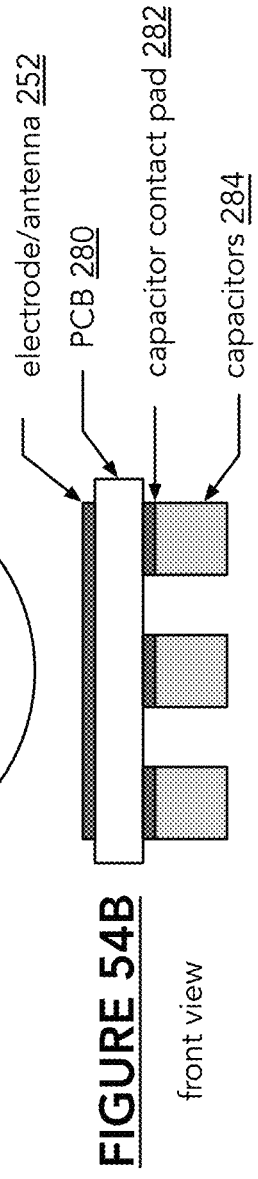
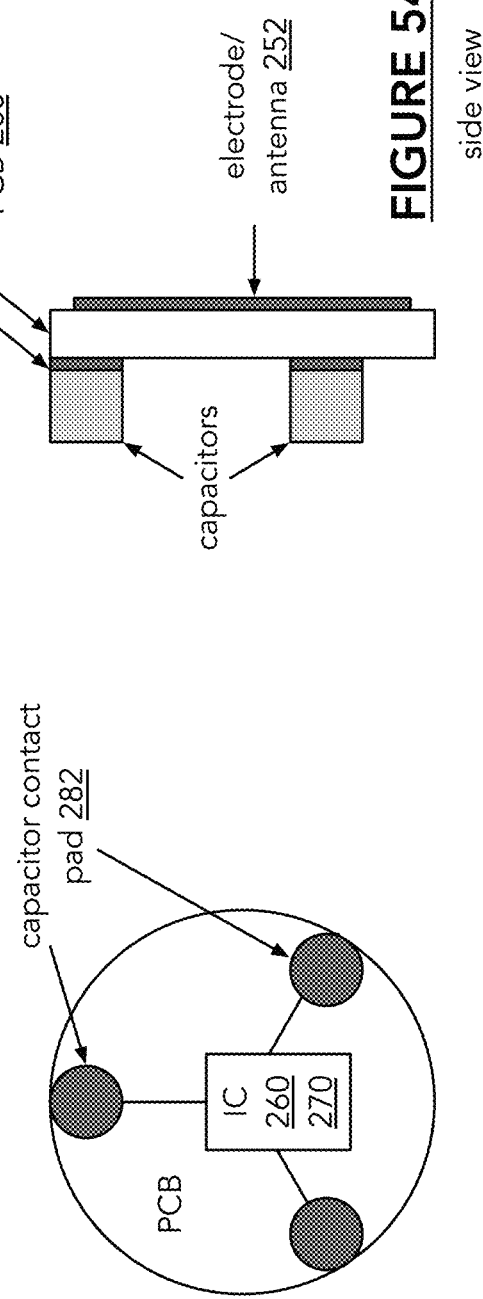
FIGURE 54A top view
FIGURE 54B front view
FIGURE 54C bottom view (without caps)
FIGURE 54D side view

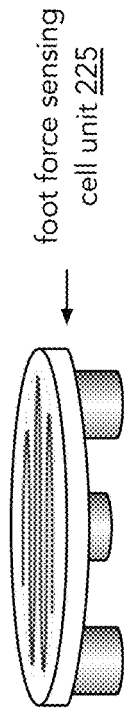
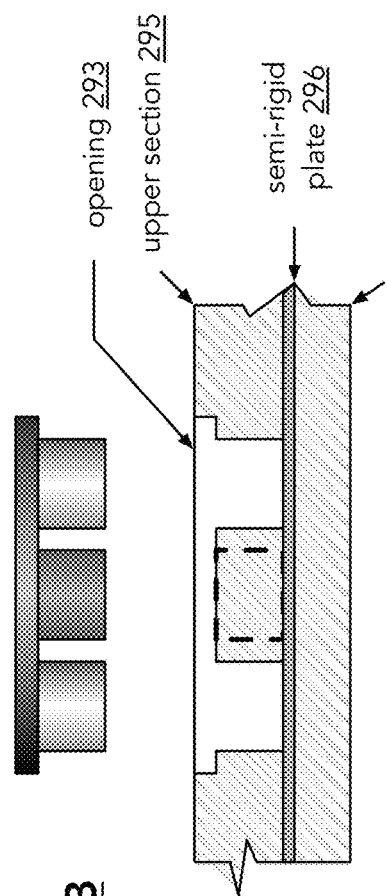
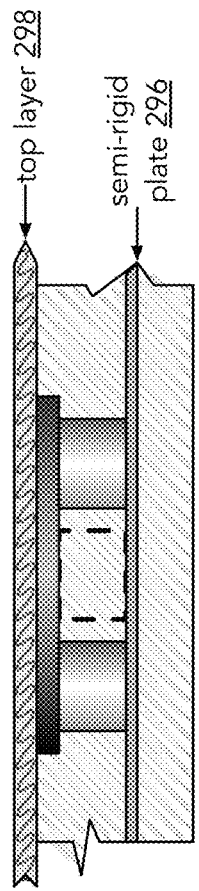
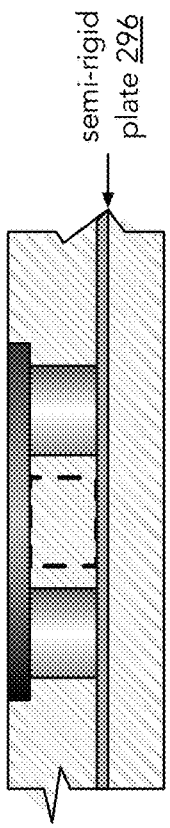
FIGURE 56A
FIGURE 56B
FIGURE 56C
FIGURE 56D
FIGURE 56E
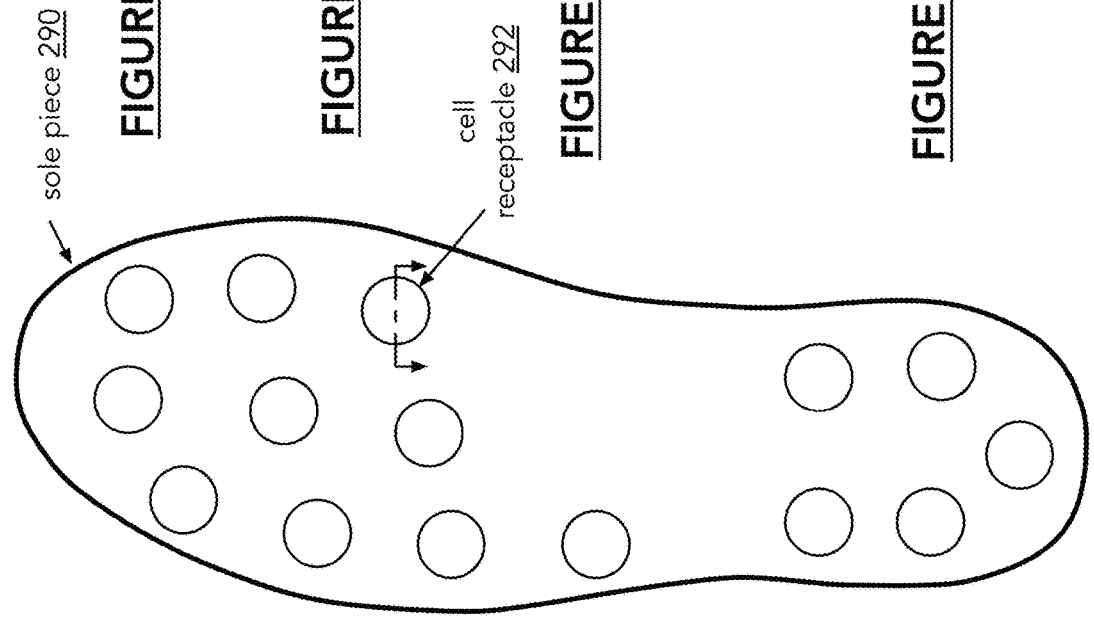
FIGURE 55

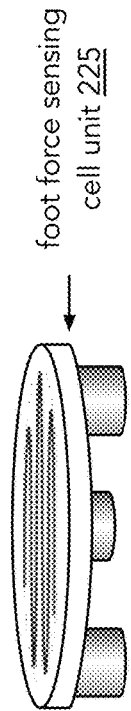
foot force sensing cell unit 225
FIGURE 58A
sole piece 290
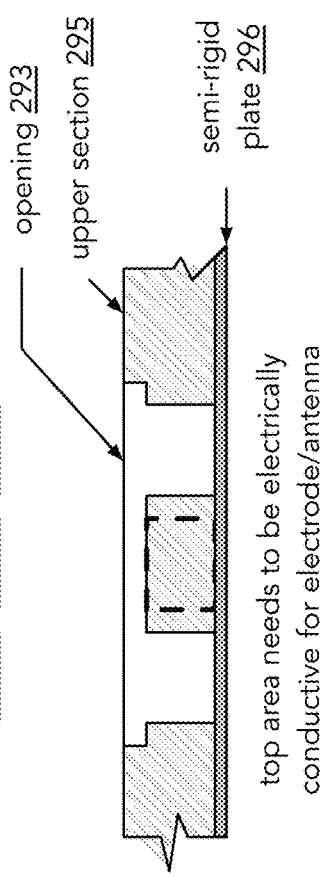
opening 293
upper section 295
semi-rigid plate 296
top area needs to be electrically conductive for electrode/antenna
FIGURE 58B
FIGURE 58C
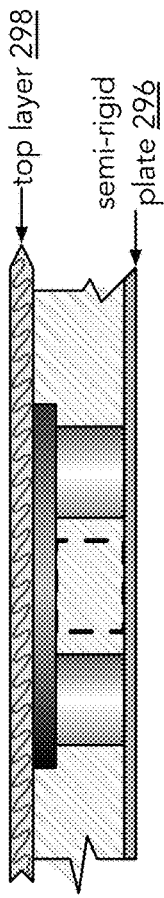
top layer 298
semi-rigid plate 296
FIGURE 58D
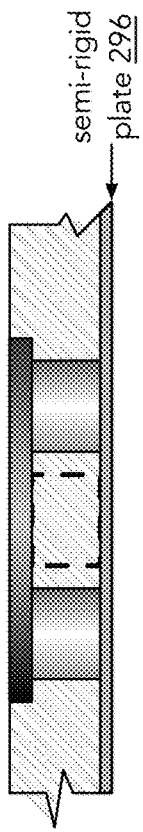
semi-rigid plate 296
FIGURE 58E
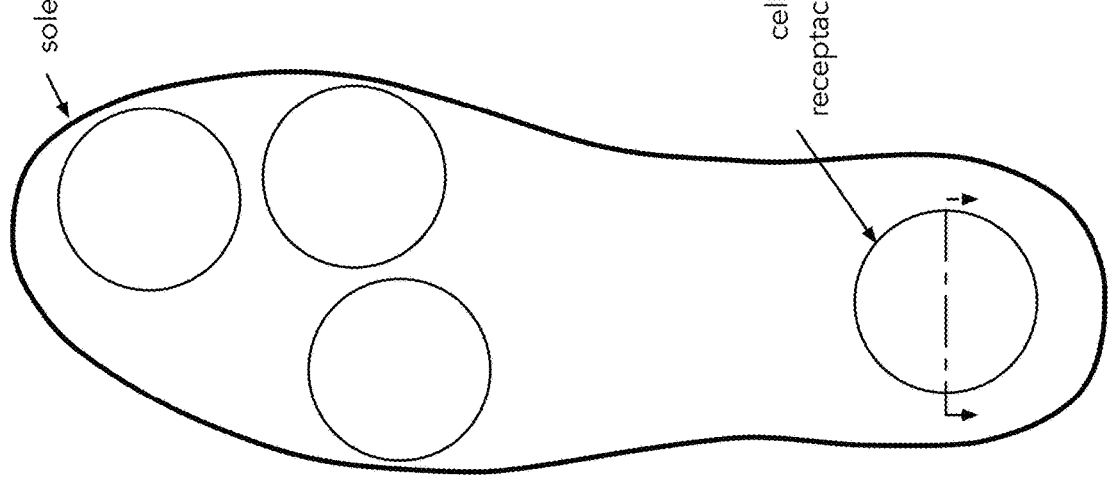
cell receptacle 292
FIGURE 57

PERSONAL MONITORING SYSTEM FOR MONITORING BODY CONDITIONS USING E-FIELD COMMUNICATIONS

CROSS-REFERENCE TO RELATED APPLICATIONS

The present U.S. Utility Patent Application claims priority pursuant to 35 U.S.C. § 120 as a continuation-in-part of U.S. Utility application Ser. No. 17/649,506, entitled "VARIABLE SAMPLING RATE WITHIN A FOOT FORCE DETECTION SYSTEM", filed Jan. 31, 2022, which claims priority pursuant to 35 USC § 120 as a continuation-in-part of U.S. Utility patent application Ser. No. 15/679,831, entitled "WIRELESS IN-SHOE PHYSICAL ACTIVITY MONITORING APPARATUS," filed Aug. 17, 2017, issued as U.S. Pat. No. 11,246,507, on 02/15/2022, which claims priority pursuant to 35 U.S.C. § 119(e) to U.S. Provisional Application No. 62/376,555, entitled "IN-SHOE GROUND REACTIVE FORCE MEASURING SYSTEM," filed Aug. 18, 2016, all of which are hereby incorporated herein by reference in their entirety and made part of the present U.S. Utility Patent Application for all purposes.

The present U.S. Utility Patent Application also claims priority pursuant to 35 U.S.C. § 120 as a continuation-in-part of co-pending U.S. Utility patent application Ser. No. 17/575,594, entitled "INSOLE XYZ FORCE DETECTION SYSTEM," filed Jan. 13, 2022, which claims priority pursuant to 35 U.S.C. § 119(e) to U.S. Provisional Application No. 63/202,251, entitled "INSOLE XYZ FORCE DETECTION SYSTEM," filed Jun. 3, 2021, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to a data communication system and analysis and more particularly to data regarding a body.

Description of Related Art

Technology is being used more and more to monitor a person's physical activities, rest patterns, diet, and vital signs. Some of this technology is wearable. For example, there are wrist wearable devices to monitor the number of steps a person takes in a day, the approximate distance traveled, heart rate, and/or sleep patterns. As another example, there are chest straps that communicate wirelessly with a module for monitoring heart rate.

As yet another example, there are shoe insert systems to monitor forces of the foot during walking. One such system includes a flexible circuit board insert that includes a resistive sensor grid that is hard wired to a module that straps to the ankle. The two ankle modules are then hard wired to another module that straps to the waist. The waist module collects the data and communicates it to a computer via a wired or wireless connection.

Another technology for monitoring foot force is to use a pressure sensitive mat on which a person stands to perform a physical activity (e.g., golf). The mat detects variations in foot forces during the execution of the physical activity, which is then analyzed to evaluate the performance of the physical activity.

BRIEF DESCRIPTION OF THE SEVERAL VIEWS OF THE DRAWING(S)

FIGS. 54A-54D are schematic block diagrams of an example of construction of a foot force sensing cell unit;

FIG. 55 is a schematic block diagram of an example of a sole piece that includes receptacles for foot force sensing cell units;

FIGS. 56A-56E are schematic block diagrams of an example of placing a foot force sensing cell unit in a receptacle of a sole piece of FIG. 55;

FIG. 57 is a schematic block diagram of another example of a sole piece that includes receptacles for foot force sensing cell units;

FIGS. 58A-58E are schematic block diagrams of an example of placing a foot force sensing cell unit in a receptacle of a sole piece of FIG. 57;

DETAILED DESCRIPTION OF THE INVENTION

Figure 1:
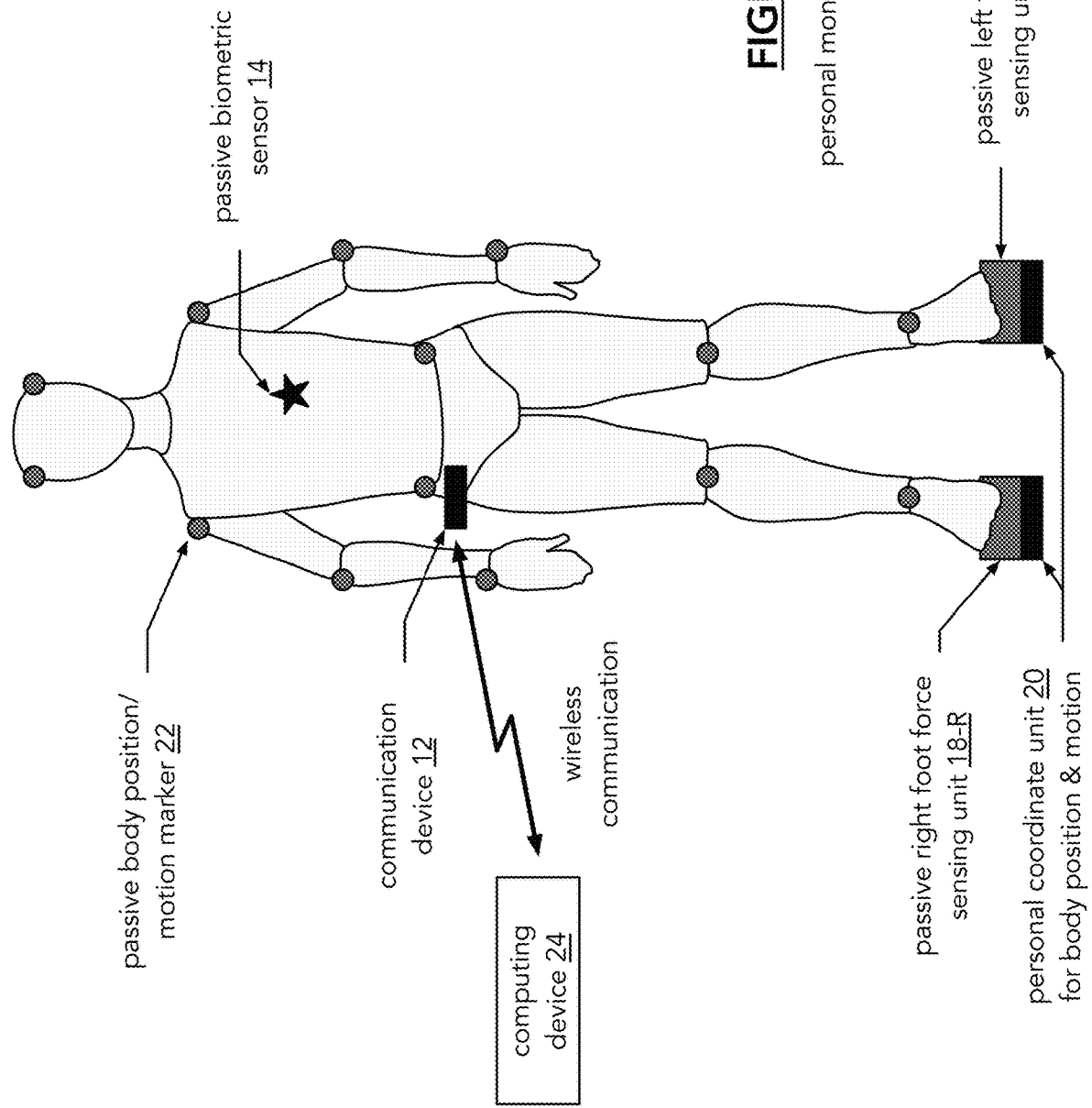
FIG. 1 is a schematic block diagram of an embodiment of a personal monitoring system.

FIG. 1 is a schematic block diagram of an embodiment of a personal monitoring system 10 that includes a communication device 12, one or more passive biometric sensors 14, a passive right foot force sensing unit 18-R, a passive left foot force sensing unit 18-L, a personal coordinate unit 20 for body position and motion, and a plurality of passive body position/motion markers 22. As used herein, passive means fully passive or battery assisted passive.

Fully passive means a device, unit, and/or circuit that harvests power from radio frequency (RF) signals, motion, heat, compression, light, sonic vibrations, and/or ultrasonic vibrations and does not include a battery. Battery assisted passive means a device, unit, and/or circuit that harvests power from radio frequency (RF) signals, motion, heat, compression, light, sonic, and/or ultrasonic vibrations and does include a battery. For battery assisted passive devices, units, and/or circuits at least ten percent of the power that they consume is produced by one or more power harvesting circuits and the remaining power is provided by the battery.

In this embodiment of the personal monitoring system 10, it monitors one or more biomechanical expressions and one or more physiological responses. Biomechanical expressions include, but are not limited to, body movement, ground-body connection, and forces that impact body movements. Physiological responses include, but are not limited to, heart rate, respiration rate, temperature, perspiration, hydration, weight, and neurological systems (e.g., sensing electrochemical bodily functions such as muscle activity, brain activity, etc.).

The biometric sensor 14 senses one or more physiological responses, the foot force units 18 senses the forces of the ground-body connection, and the personal coordinate unit 20 senses body movement via the passive body position/motion markers 22. The biometric sensor 14 and the foot force sensing units 18 provide their sensed data to the communication device 12 via e-fielding signaling, which occurs through the body. The personal coordinate unit 20 provides body position data to the communication device 12 in a variety of ways. For example, the personal coordinate unit 20 provides body position data to the communication device 12 via e-field signaling. As another example, the personal coordinate unit 20 is embedded in the communication device 12 and provides the body position data via a bus or other internal communication connection. As a further example, the personal coordinate unit 20 provides the body position data to communication device 12 via RF communications (e.g., Bluetooth, 60 GHz personal area network, RFID like communication (e.g., backscatter)).

The physical embodiment of the communication device 12 may be implemented in a variety of ways. For example, the communication device 12 is physically embodied in a ring. As another example, the communication device 12 is physically embodied in a wrist band. As yet another example, the communication device 12 is physically embodied in a dongle that clips to an item of clothing. As a further example, the communication device 12 is physically embodied in a necklace. As a still further example, the communication device 12 is physically embodied in a watch (e.g., smart or regular). Basically, the physical embodiment of the communication device 12 may be any wearable item.

The communication device 12 provides the data it gathers from the biometric sensor 14, the foot force sensing units 18, and/or the personal coordinate unit 20 to a computing device 24 via a wireless communication. The wireless communication may be an RF communication or a near field communication (NFC). For an RF communication, the communication device 12 and the computing device include an RF transceiver, such as a Bluetooth RF transceiver, a wireless local area network (WLAN or wi-fi) RF transceiver, and/or a personal area network RF transceiver.

The computing device 24 is any device that is capable of executing operational instructions of an algorithm to produce a data result. Such computing devices include, but are not limited to, cellular telephones, tablets, personal computers, laptop computers, cloud-based computers, servers, cloud-based servers, databases, and cloud-based databases.

The computing device 24 and/or the communication unit 12 process the collected (or gathered) data to track physical activity of a person, to track physical movement of a person, to track forces on the person's body, and/or to track physiological responses. The computing device 24 further interprets the collected data to make recommendations regarding rest, injury recovery, improving physical movement, improving athletic conditioning, improving athletic performance, fatigue levels, fatigue recovery, recommended physical activity intensity, weight loss, water weight loss during an event, calorie expenditures, etc.

For the computing device 24 to perform one or more of its desired functions, some physiological responses (e.g., heart rate, temperature, and/or respiration) are sensed 24/7 (twenty-four hours a day, 7 days per week) or as close to that as possible (e.g., 12 or more hours per day). Other physiological responses (e.g., perspiration, hydration, weight, neurological systems) can be monitored during activity of a person and/or periodically throughout a day. Of course, these later physiological responses could also be monitored up to a 24/7 if desired by the user of the body monitoring system.

In addition, the biomechanical expressions (e.g., movement of a body, the forces that put the body in motion, and/or other forces that act upon the body (e.g., hitting a golf ball)) are typically monitored while a person is in motion (e.g., running, walking, standing, playing a sport, etc.) but could also be monitored while the person is at rest. For example, body position and motion tracking could be used while a person is sleeping to record how the person tosses and turns during the night.

The personal monitoring system 10 provides a variety of benefits including, but not limited to, data accuracy, low power consumption, reliability, in-field use, ease of use, no wires to the sensors, durability, and/or a complete data set of personal data that provides a near endless opportunity for analysis a person's movement, physical performance, and/or health and for assisting the person in improving the person's movement, physical performance, and/or health.

As described below and as may be described in one or more of the parent patent applications, the biometric sensor 14, the foot force sensing units 18, and the personal coordinate unit 20 use a core drive-sense circuit that provides approximately 140 dB of signal to noise ratio (SNR). With such a high SNR, real-time and high resolution biomechanical expression data and/or physiological response data is collected and eliminates predictive algorithms that have to calculate a biomechanical expression or a physiological response to non-real-time data and/or low resolution data. As such, collected data and the various uses of it are much more accurate than is obtainable with predictive algorithms.

As a specific example, body movement over a distance with the personal monitoring system 10 has an error margin of about +/−0.1%. In contrast, predictive algorithms that use step count and/or arm movement have an error margin of about +/−10% or more. As another specific example, a heart rate biometric sensor senses the electrical signals of the heart (e.g., functions like an EKG and/or ECG) to determine heart rate with an error margin of about +/−0.1%. In contrast, an optical heart rate monitor, which uses photoplethysmography (PPG), measures the amount of light that is scattered by blood flow. In wearable devices, optical detection of heart rate has an error margin of about +/−5% or more.

With the use of passive technology in the biometric sensors, the foot force sensors, and the markers 22 for body position and motion, they rarely, if ever need to be charged. Thus, the user rarely, if every has to worry about charging the sensors. Further, the use of e-field signaling and/or RF signaling to convey sensed data, the biometric sensors, the foot force sensors, and the markers 22 have no connecting wires. This increases the durability and ease of use of the personal monitoring system 10.

Figure 2:
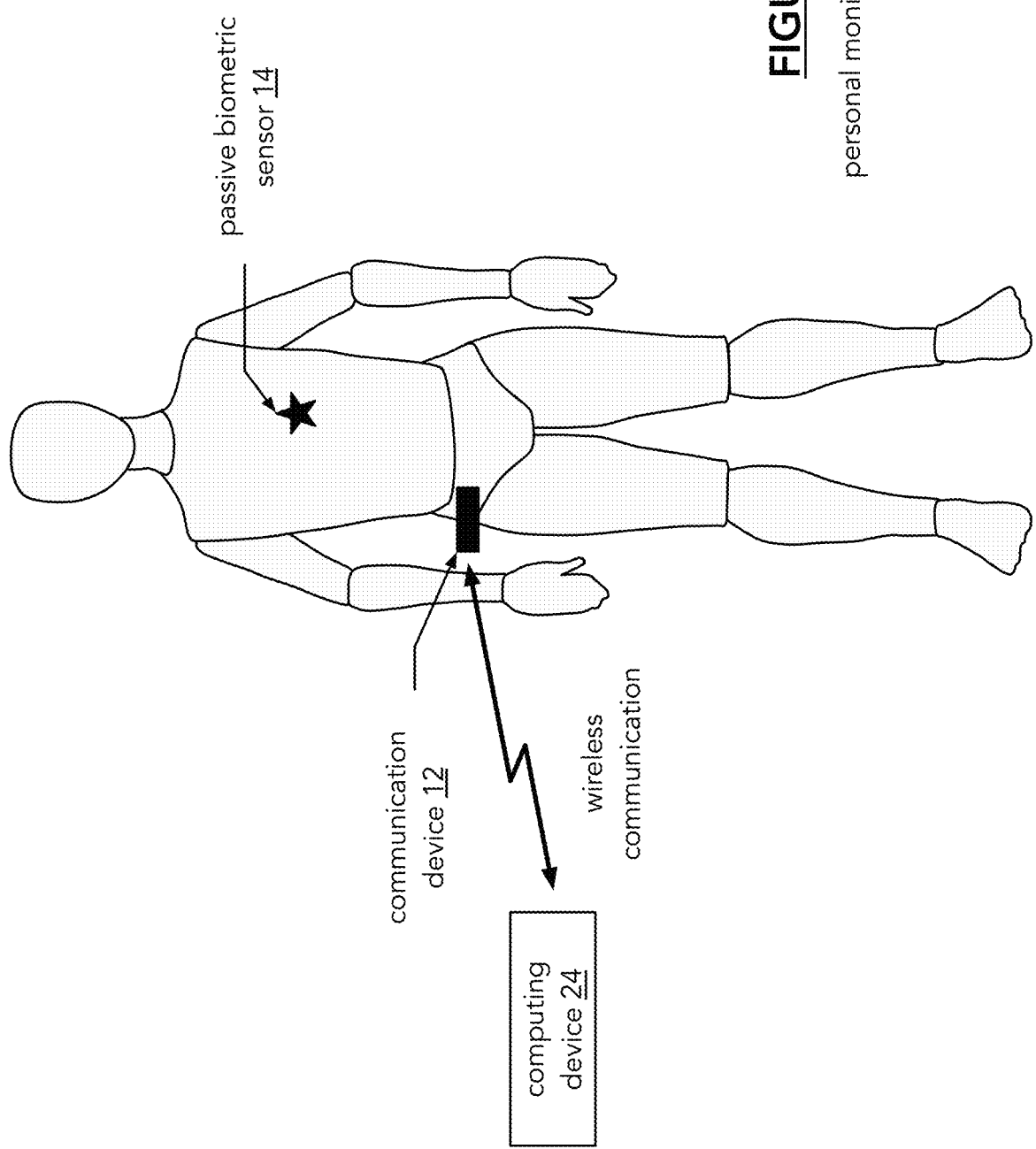
FIG. 2 is a schematic block diagram of another embodiment of a personal monitoring system.

FIG. 2 is a schematic block diagram of another embodiment of a personal monitoring system 10. In this embodiment, the personal monitoring system 10 includes one or more biometric sensors 14 and the communication device 12. In this embodiment, the personal monitoring system 10 measures one or more physiological responses (e.g., heart rate, respiration, perspiration, hydration, temperature, etc.) and sends the collected data to the computing 24.

Figure 3:
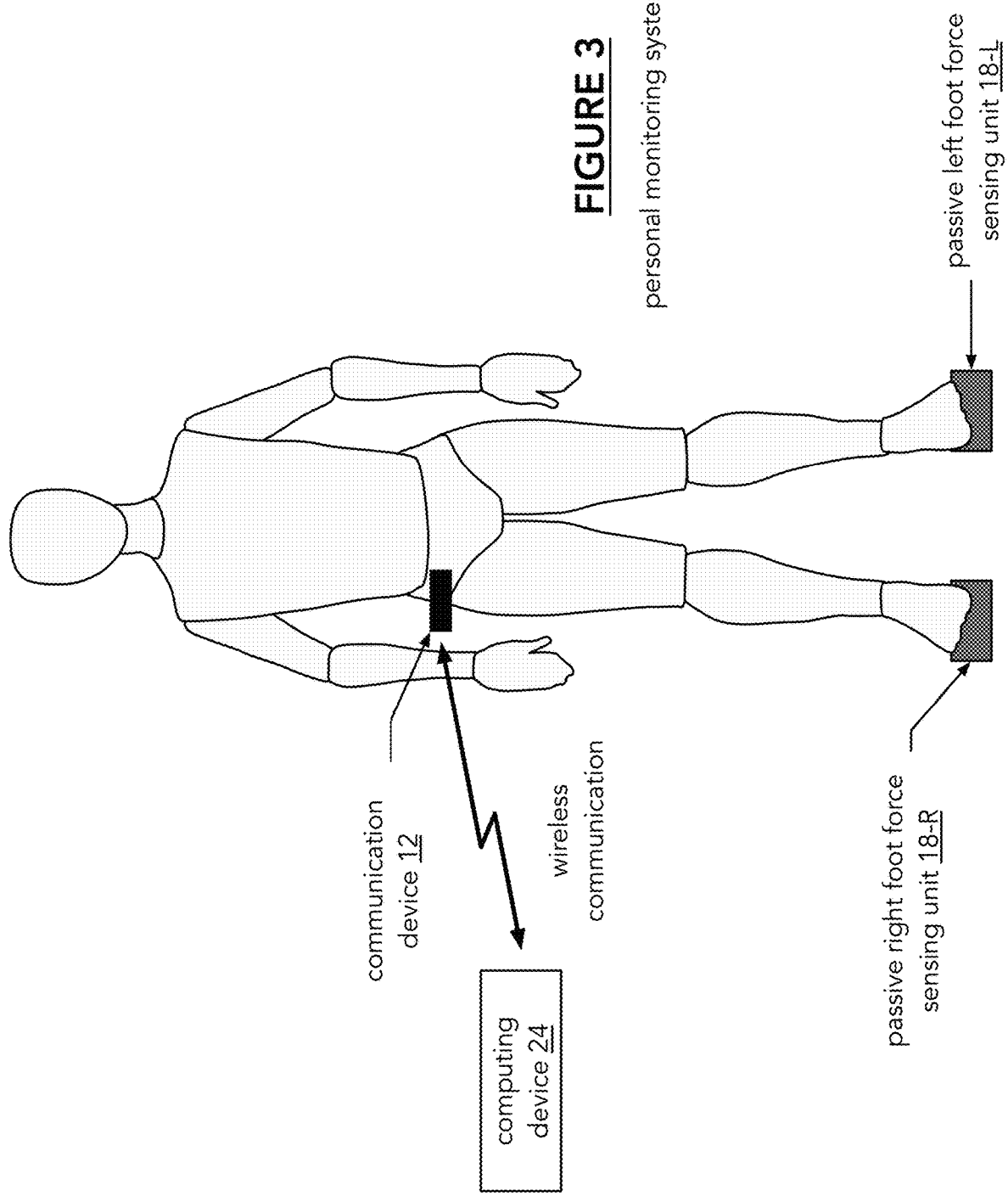
FIG. 3 is a schematic block diagram of another embodiment of a personal monitoring system.

FIG. 3 is a schematic block diagram of another embodiment of a personal monitoring system 10 that includes the left and right foot force sensing units 18-R & 18-L and the communication unit 12. In this embodiment, the personal monitoring system 10 measures the forces of the ground body connection, which include athletic force, ground reaction force, and forces traversing through the shoes.

Athletic force includes the weight of a person and force exerted as a result of muscle contraction (e.g., muscles contraction for a jump). The ground reaction force is the ground pushing back on the body in an equal and opposite direction of the force the ground receives. The shoe directs the force between the body and the ground and can do so in a constructive manner, a neutral manner, or a nonconstructive manner.

Figure 4:
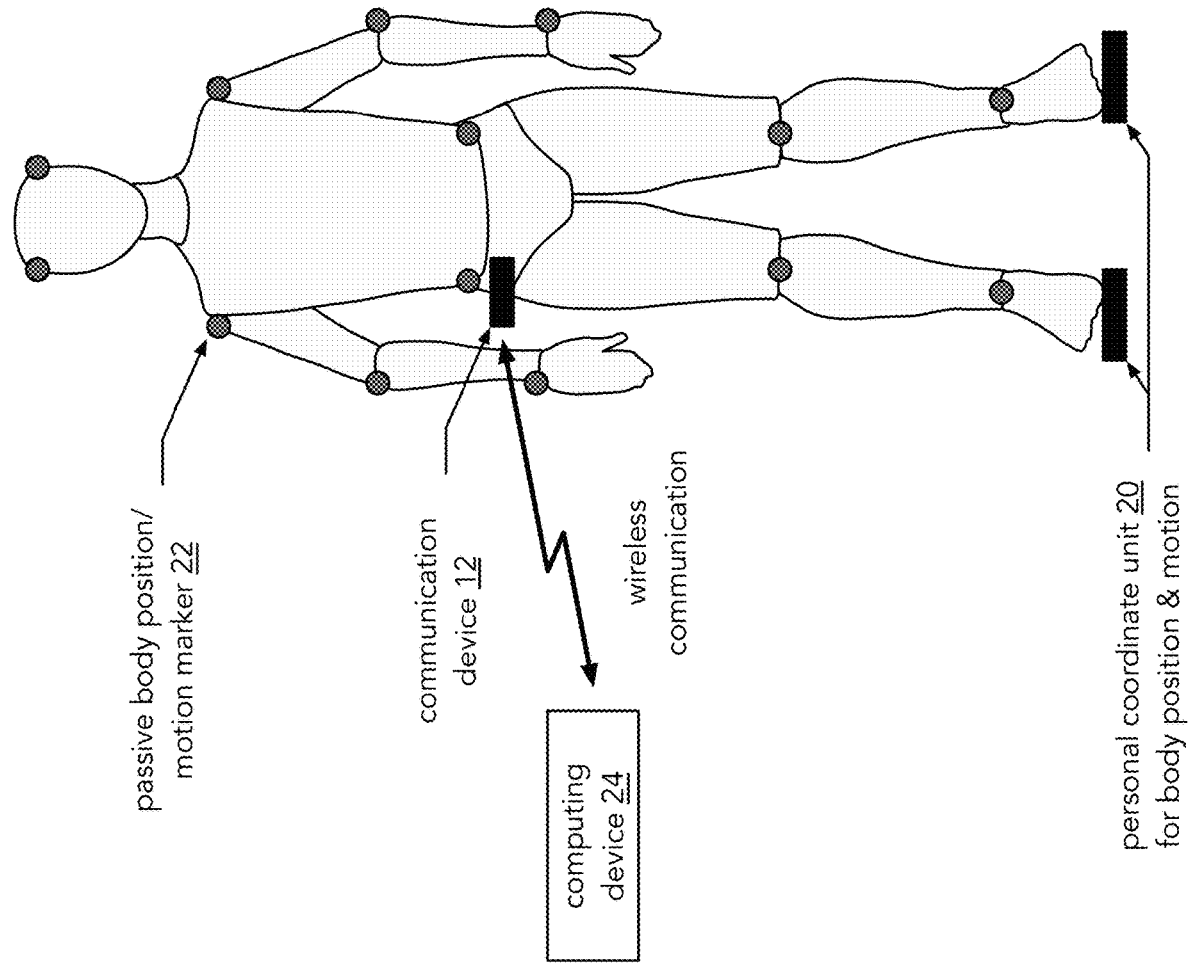
FIG. 4 is a schematic block diagram of another embodiment of a personal monitoring system.

FIG. 4 is a schematic block diagram of another embodiment of a personal monitoring system 10 that includes the personal coordinate unit 20, the passive body position/motion markers 22, and the communication device 12. In this embodiment, the personal coordinate unit 20 creates a coordinate system encompassing the user of the personal monitoring system 10. In an example, the coordinate system is a Cartesian coordinate system (e.g., x, y, and z axis).

The original of the coordinate system is tied to a point on the body and is fixed in x, y, and z directions with respect to the ground. For example, the z-direction is perpendicular to the ground; the x-direction is forward or backward for the person' and the y-direction is left or right for the person.

The personal coordinate unit 20 transmits an RF signal to a passive body position/movement marker 22. The RF signal includes an identification code (ID) for the personal monitoring system 10. The passive body position/movement marker 22 harvests power from the RF signal, measures the signal strength of the received RF signal, and transmits a response signal to the personal coordinate unit 20. The response signal includes the signal strength measurement and the ID.

The personal coordinate unit 20 determines the distance between the marker 22 and at least three transmitter positions based on an RF signal strength attenuation versus distance curve for the frequency of the RF signal. The personal coordinate unit 20 determines the position of the marker 22 based on the three distances and then maps the position of the marker 22 to the coordinate system.

Figure 5:
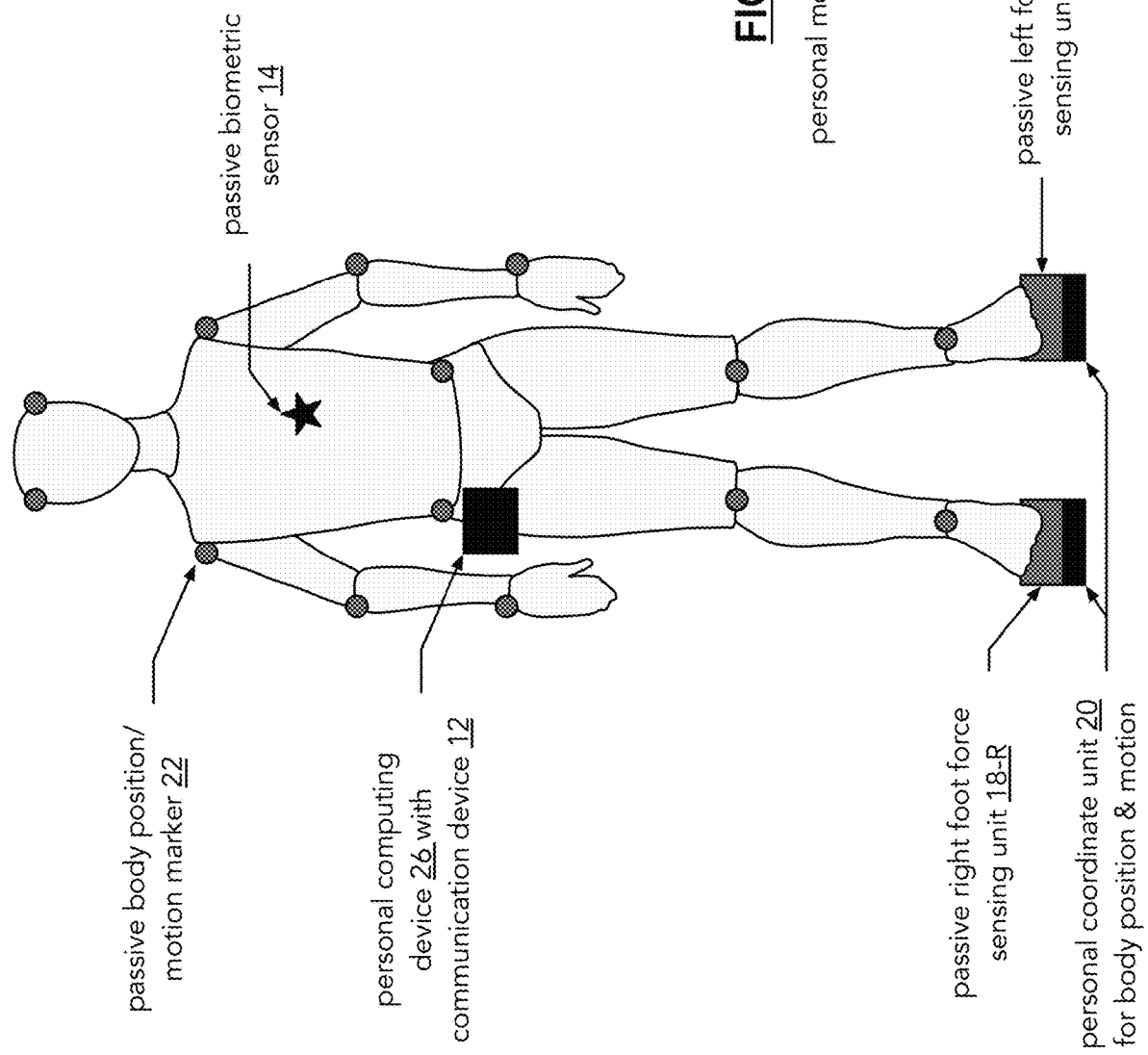
FIG. 5 is a schematic block diagram of another embodiment of a personal monitoring system.

FIG. 5 is a schematic block diagram of another embodiment of a personal monitoring system 10 that is similar to the embodiment of FIG. 1. In this embodiment, the communication device 12 is embedded in a personal computing device 26. The personal computing device 26 is a device that is readily wearable on the body such as a cell phone or smart watch. Alternative, the personal computing device 26 is a custom computing device for the personal monitoring system 10 that executes the desired data analysis algorithms and has wireless connectivity to another computing device and/or to the cloud.

Figure 6:
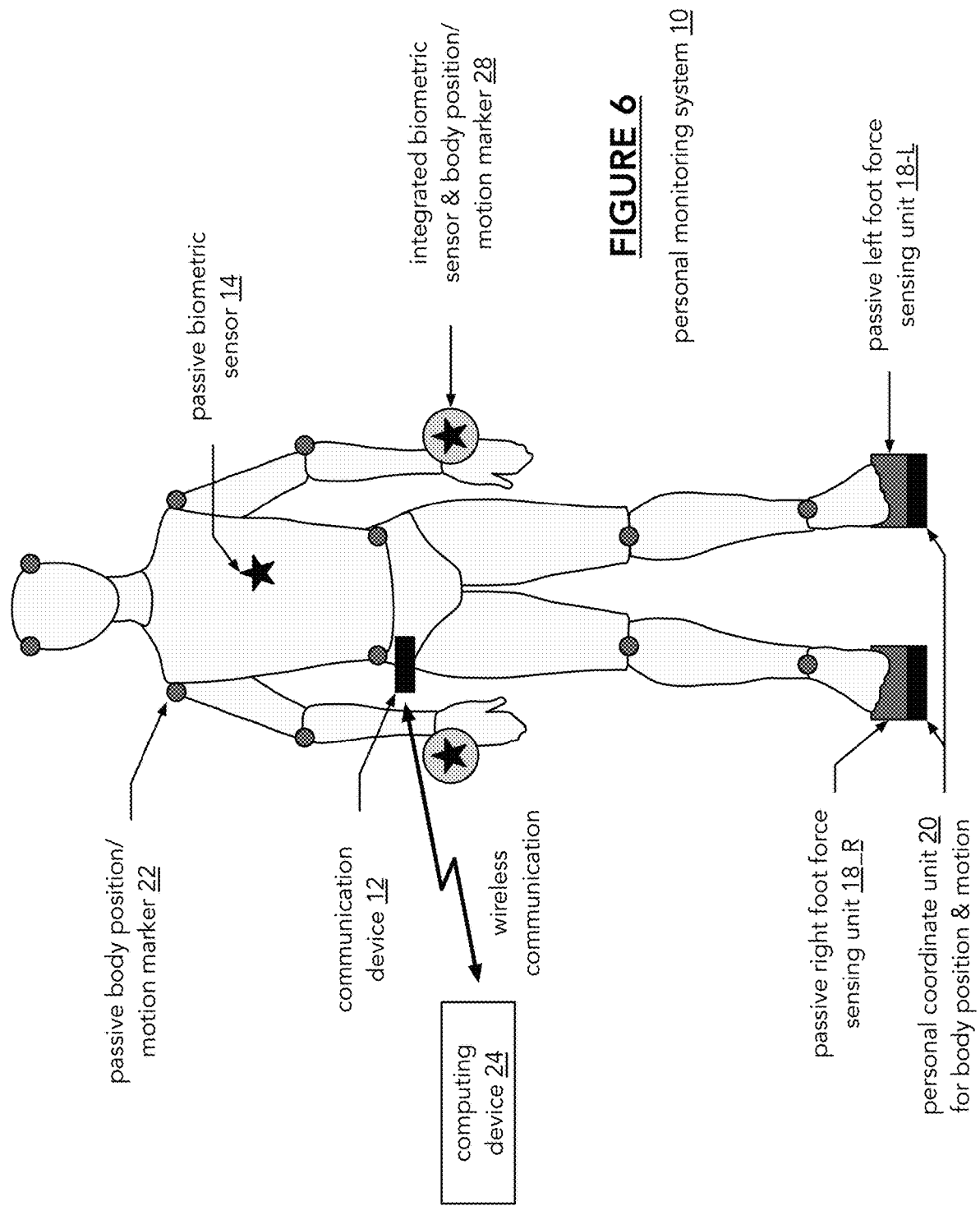
FIG. 6 is a schematic block diagram of another embodiment of a personal monitoring system.

FIG. 6 is a schematic block diagram of another embodiment of a personal monitoring system 10 is similar to the embodiment of FIG. 1 with the inclusion of one or more integrated biometric sensor & body position/motion marker 28. As the name implies, the integrated biometric sensor & body position/motion marker 28 provides a biometric sensing function and a body position/motion marker function.

Figure 7:
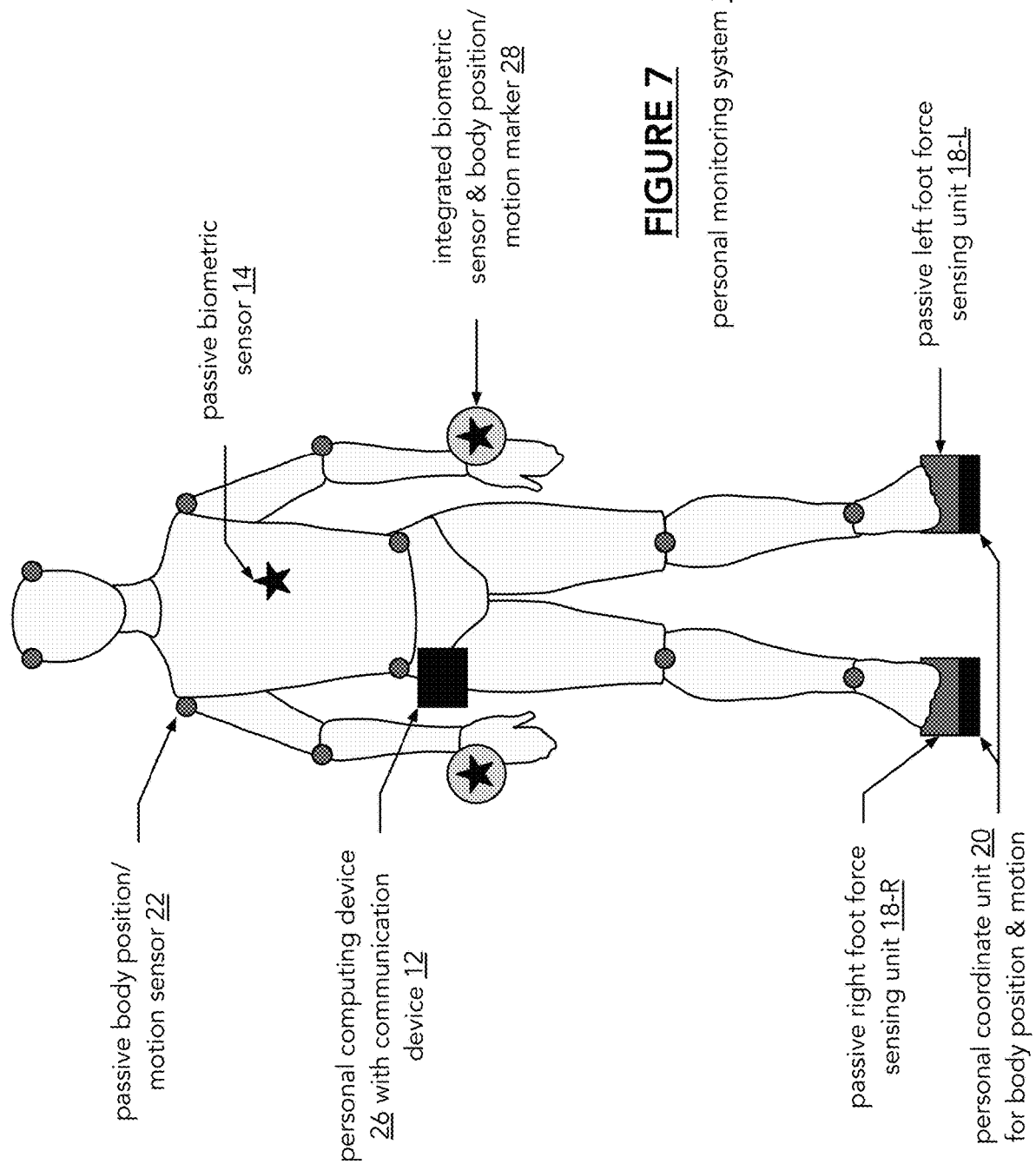
FIG. 7 is a schematic block diagram of another embodiment of a personal monitoring system.

FIG. 7 is a schematic block diagram of another embodiment of a personal monitoring system 10 is similar to the embodiment of FIG. 6 with the communication device 12 being embedded in the personal computing device 26.

Figure 8:
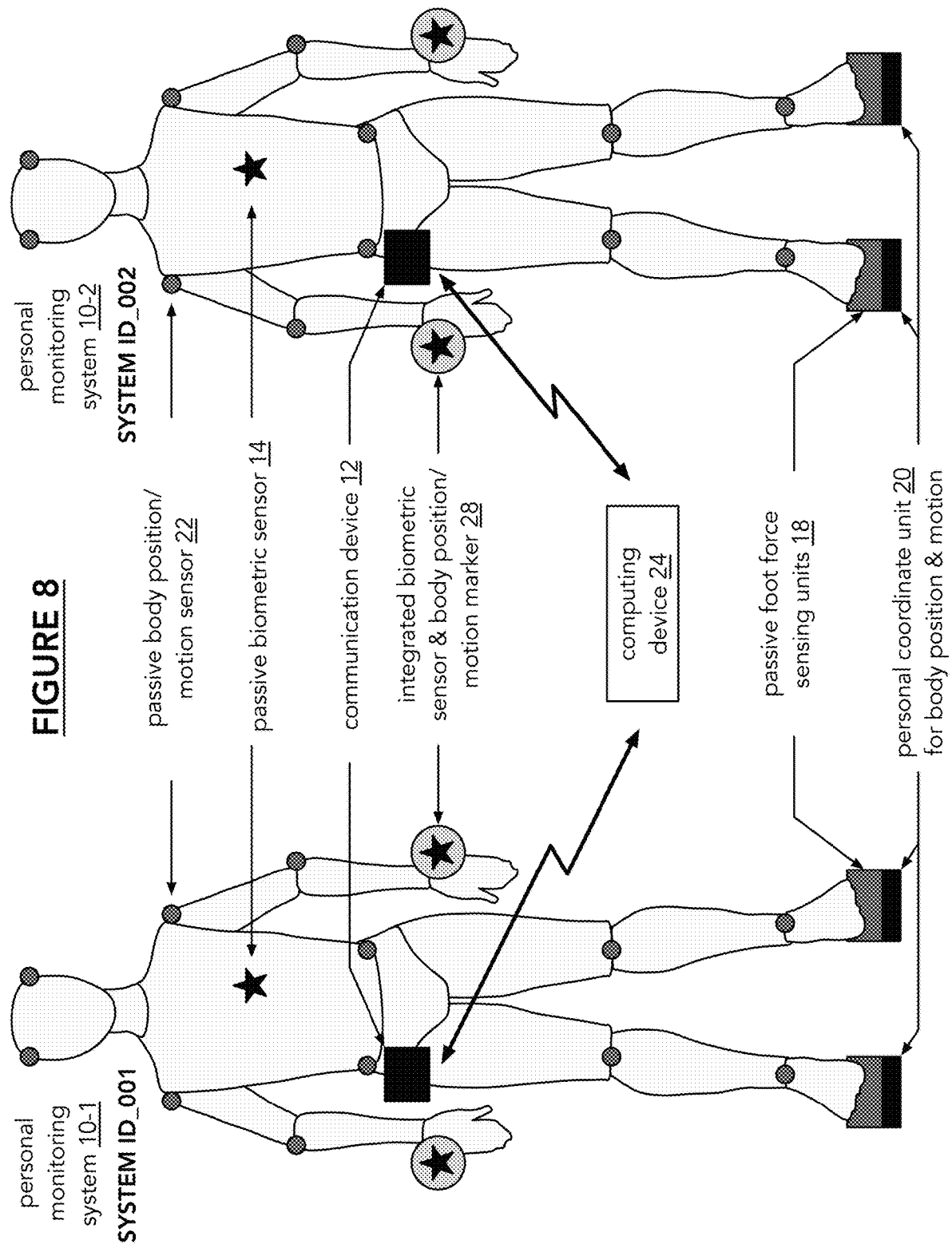
FIG. 8 is a schematic block diagram of another embodiment of a personal monitoring system.

FIG. 8 is a schematic block diagram of another embodiment of two personal monitoring systems 10-1 & 10-2 in close proximity. Each person monitoring system includes a communication device 12, one or more passive biometric sensors 14, a passive right foot force sensing unit 18-R, a passive left foot force sensing unit 18-L, a personal coordinate unit 20 for body position and motion, a plurality of passive body position/motion markers 22, and/or one or more integrated biometric sensor & body position/motion marker 28.

Each system functions independently and communicates with one or more computing devices 24. In one instance, both systems 10 communicate with the same computing device 24. In another instance, each system 10 communicates with its own computing device 24. For example, when the systems 10 are being used by players on a team, the systems 10 would communicate with the same computing device. As another example, when the systems are being used by runners in a race, the systems 10 would communicate with different computing devices 24.

To distinguish between the two systems 10, each system 10 is assigned a system ID. In this example, system 10-1 is assigned system ID 001 and system 10-2 is assigned system ID 002. The components of the systems 10 use the respective system IDs to confirm communications are for the respective system 10.

Figure 9:
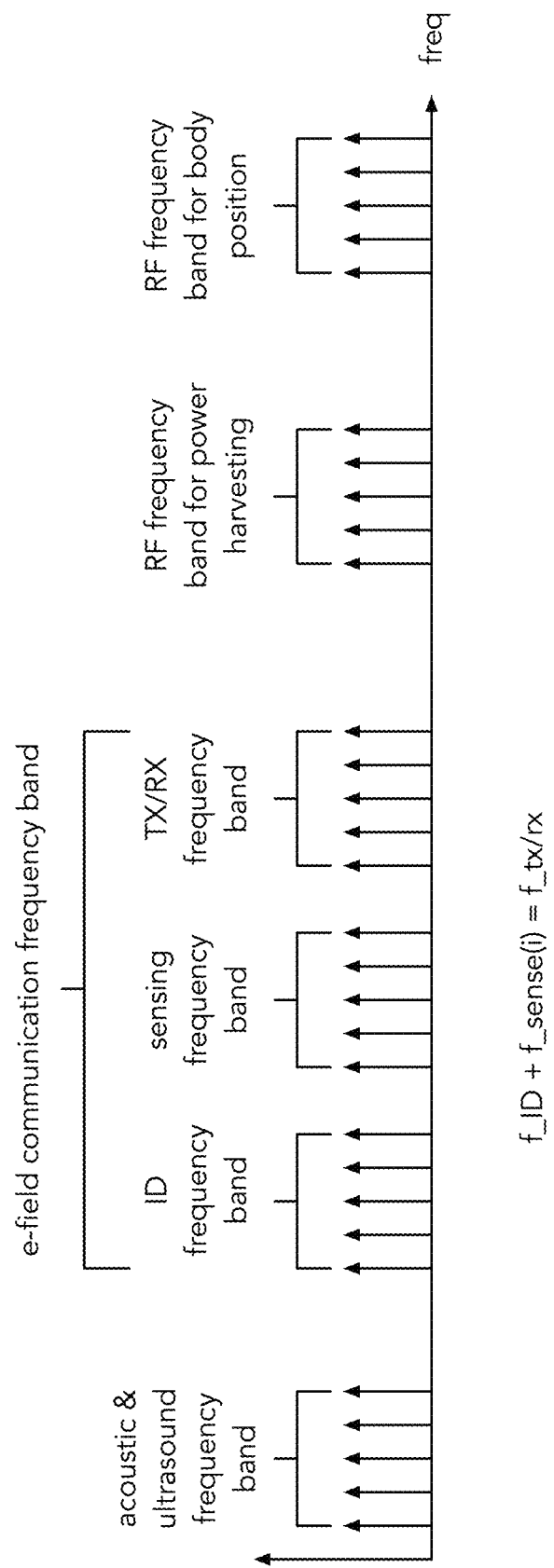
FIG. 9 is a diagram of an example of frequency band allocation for use within a personal monitoring system.

FIG. 9 is a diagram of an example of frequency band allocations for use within a personal monitoring system 10. In the system 10 of FIG. 1, there are four frequency bands. The first frequency band is for acoustic and/or ultrasound biometric sensing. The second frequency band is for e-field communication related sensing and communications. The third frequency band is for RF power harvesting. The fourth frequency band is for body position sensing.

The acoustic & ultrasound frequency band is used for transducer based sensors that are tuned for such frequencies. For example, a transducer generates an electrical signal corresponding to the acoustic vibration of a heartbeat. As another example, a transducer generates an electrical signal corresponding to the acoustic vibration of respiration.

The RF frequency band for power harvesting is in the range of 900 MHz to 6 GHz. These are frequencies used by cell phones, wi-fi enabled devices, RFID readers, and a plurality of other devices. In most geographic locations in a country, these frequencies are prevalent and transmitted with sufficient power to enable power harvesting thereof.

The RF frequency band for body position is above 20 GHz (e.g., 57-64 GHz). At such frequencies, the attenuation in air is significant over short distances (e.g., 10 or more dB per meter). As such, by determining the power loss of a transmitted signal, the distance between the transmitter and receiver can be determined. Further, since the signal only needs to readable for a short distance (e.g., about 3 meters), it can be transmitted at very low power levels (e.g., microwatts or more).

The e-field frequency band, which is in the range of tens of KHz to hundreds of MHz (avoiding the AM radio frequency band (535 KHz-1705 KHz) the FM radio frequency band (88 MHz to 108 MHz), and other licensed frequency bands), includes three sub-band sections: an ID frequency sub-band, a sensing frequency sub-band, and a TX/RX (transmit/receive) frequency sub-band. The ID frequency sub-band is allocated for system IDs; the sensing frequency sub-band is allocated for biometric sensing and/or force sensing; and the TX/RX frequency sub-band is allocated for e-field signaling communication between the communication device 12 and the components of the personal monitoring system 10.

In an embodiment, an allocated sensing frequency and an allocated TX/RX frequency are derived from a system ID frequency. For example, the sensing frequency equals the system ID frequency plus a sensing frequency offset. As another example, the TX/RX equals the system ID frequency plus a TX/RX frequency offset. As yet another example, the TX/RX equals the allocated sensing frequency plus a TX/RX frequency offset.

The following table is a simplified example of e-field frequency allocation.

| part | System ID | sense_offset | f_sense | tx/rx_offset | f_tx/rx |
|---|---|---|---|---|---|
| system 1 | 100 KHz | | | | |
| sensor 1 | | 100 KHz | 200 KHz | 200 KHz | 300 KHz |
| sensor 2 | | 110 KHz | 210 KHz | 210 KHz | 310 KHZ |
| System 2 | 105 KHz | | | | |
| sensor 1 | | 100 KHz | 205 KHz | 200 KHz | 305 KHz |
| sensor 2 | | 110 KHz | 215 KHz | 200 KHz | 315 KHZ |

As another example, in a personal monitoring system 10 that includes five biometric sensors, the personal coordinate system, and the foot force sensing units, the system 10 would have one system ID frequency (e.g., 100 KHz), five f_sense frequencies and five f_tx/rx frequencies for the five biometric sensors, one f_tx/rx frequency for the personal coordinate system, thirty f_sense frequencies for fifteen force sense cells in each shoe, and two f_tx/rx frequencies; one for each shoe. The tx/rx frequencies are used for e-field signaling and the f_sense frequencies are used for sensing.

Figure 10:
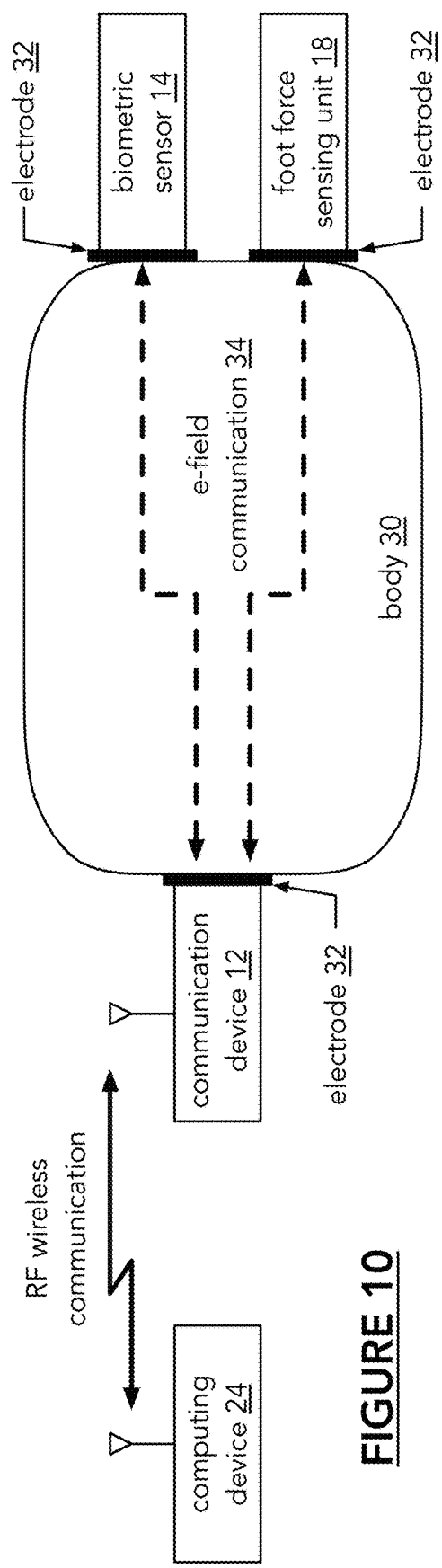
FIG. 10 is a schematic block diagram of an example of e-field signal communication within a personal monitoring system.

FIG. 10 is a schematic block diagram of an example of e-field signal communication within a personal monitoring system 10. In this example, a biometric sensor 14 is connected to a body 30 via an electrode 32. The biometric sensor 14 is electrically coupled to the electrode 32 and may be adhered to the body 30 in a desired position. For example, the biometric sensor 14 is an adhesive patch that sticks to the skin of the body.

The biometric sensor 14 uses an f_sense frequency to sense a physiological response (e.g., heart rate) and produces raw sensed data (e.g., the electrical effect on a drive signal as discussed below). The biometric sensor 14 sends the raw sensed data to the communication device 12 via the body using e-field signaling 34. This will be described in greater detail in subsequent figures.

This example further includes a foot force sensing unit 18 coupled to an electrode 32, which is in contact with the body. Depending on the number of foot force sensing cells in a shoe and on the number of capacitors in a sensing cell, a foot force sensing unit captures a plurality of raw foot force data (e.g., the electrical effect on a drive signal of each of the capacitors in a shoe). The foot force sensing unit sends to raw foot force data to the communication device 12 via e-field signaling 34.

The computing device 12 is coupled to an electrode 32, which is proximal (i.e., touching or nearly touching) to the body 30. Depending on the configuration of the computing device 12, it can handle the raw data it receives in a variety of ways. In a configuration, the communication device 12 forwards the raw data it receives to the computing device 24 in accordance with an RF communication protocol (e.g., Bluetooth, WLAN, cellular data conveyance, etc.).

In another configuration, the communication device 12 converts the raw data into sensed data. For example, the communication device 12 converts the raw data of a heart rate biometric sensor into a beats-per-minute value. In this configuration or another, the communication device 12 converts the raw data of a capacitance foot force sensor into a capacitor value. In an extension of this configuration or as another configuration, the communication device 12 converts the raw data of a capacitance foot force sensor into a capacitor value and then into a force value. After calculating the values, the communication device 12 sends the calculated values to the computing device 24.

Figure 11:
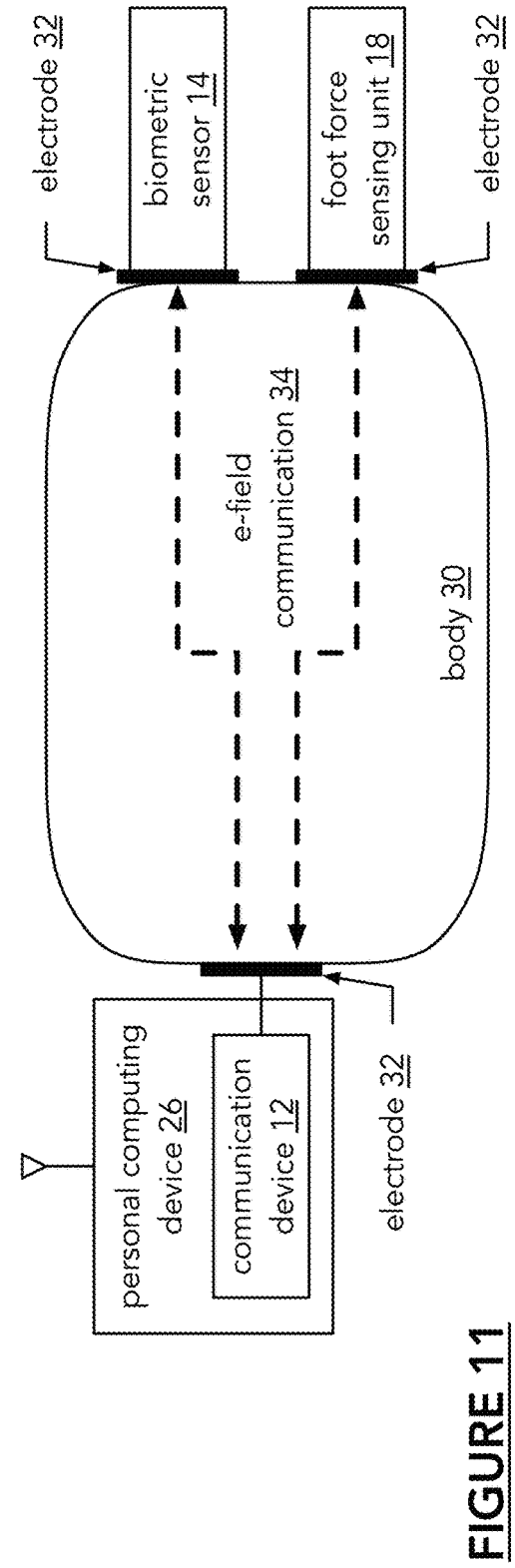
FIG. 11 is a schematic block diagram of another example of e-field signal communication within a personal monitoring system.

FIG. 11 is a schematic block diagram of another example of e-field signal communication within a personal monitoring system 10. This figure is similar to FIG. 10 with a difference being that the communication device 12 is part of the personal computing device 26. In this example, the communication device 12 receives the raw data from the sensors 14 and 18 and via an internal connection provides the raw data, or values calculated therefrom, to a processing module of the personal computing device 26 for further processing.

Figure 12:
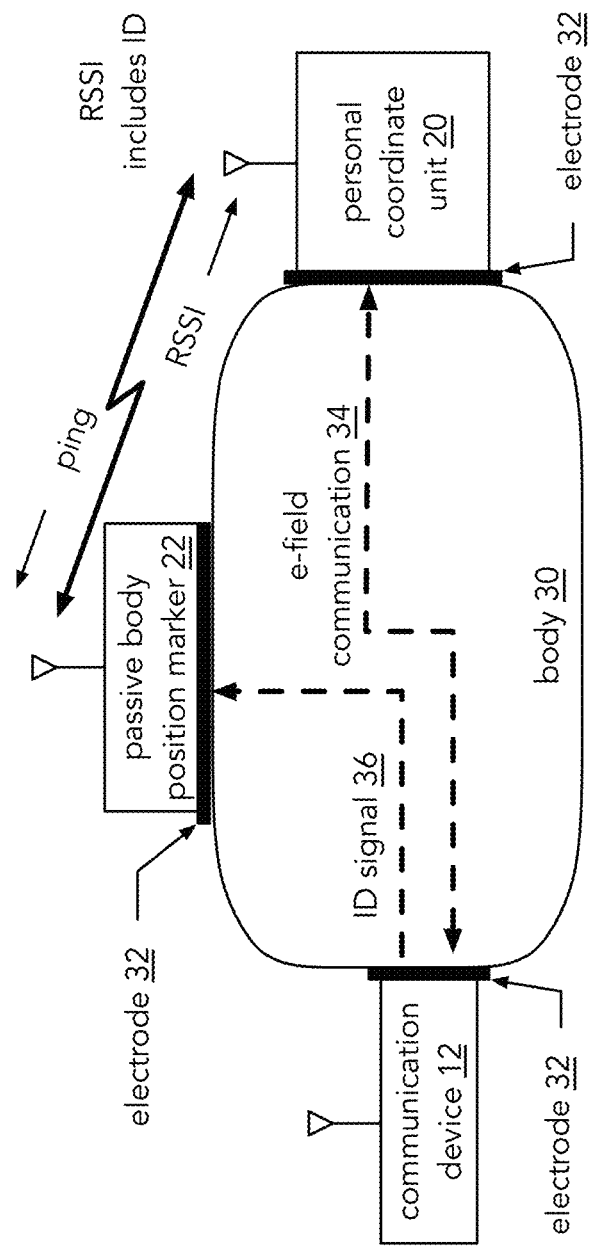
FIG. 12 is a schematic block diagram of an example of e-field signal communication and RF communication within a personal monitoring system.

FIG. 12 is a schematic block diagram of an example of e-field signal communication and RF communication within a personal monitoring system 10. In this example, the personal coordinate unit 20 is coupled to an electrode 32 and a passive body position marker 22 is coupled to an electrode 32. The personal coordinate unit 20 communicates with the communication device 12 via e-field communications 34 and communicates with a passive body position marker 22 via RF communications. The communication device 12 communicates, via e-fielding signaling, an ID signal 36 to the passive body position marker 22.

To determine a distance between the personal coordinate unit 20 and the passive body position marker 22, the personal coordinate unit 20 transmits an RF signal to marker 22. The RF signal is transmitted at a known power level. Upon receiving the RF signal, the marker 22 determines the received signal strength, which can be done via a conventional RSSI (received signal strength indication) circuit. The marker 22 then sends a response RF signal to the personal coordinate unit 20, the response signal includes the received signal strength and the system ID.

The personal coordinate unit 20 verifies the system ID to ensure that the response RF signal is from a marker associated with the personal monitoring system 10. When the marker is associated with the system 10, the personal coordinate unit 20 recovers the received signal strength measurement and compares it to the known transmit power level to determine an attenuation factor. Based on the frequency of the RF signal (e.g., 5 GHz, 28 GHz, 60 GHz, etc.), the personal coordinate unit 20 determines a distance based on the attenuation factor and an attenuation to distance curve for the corresponding frequency.

Using at least two differently positioned transmitters associated with the personal coordinate unit 20, the unit 20 repeats the process to get at three distances to the marker 22. From the at three distances, the personal coordinate unit 20, the communication device 12, and/or the computing device 24 or 26 determines the position of the marker 22 on the personal coordinate system based on the at least three distances.

Figure 13:
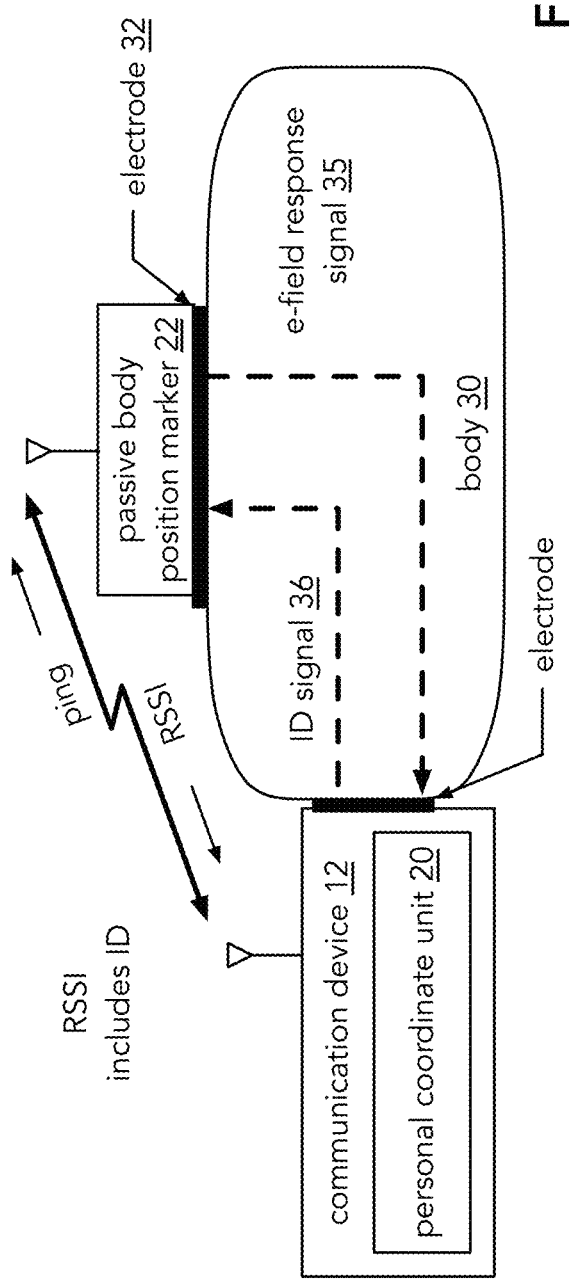
FIG. 13 is a schematic block diagram of another example of e-field signal communication and RF communication within a personal monitoring system.

FIG. 13 is a schematic block diagram of another example of e-field signal communication and RF communication within a personal monitoring system. This example is similar to the example of FIG. 12 with the exception that the personal coordinate unit 20 is part of the communication device 12. In this example, the passive body position marker 22 can respond with the RSSI and the system ID via a response RF signal and/or via a response e-field signal 35.

Figure 14:
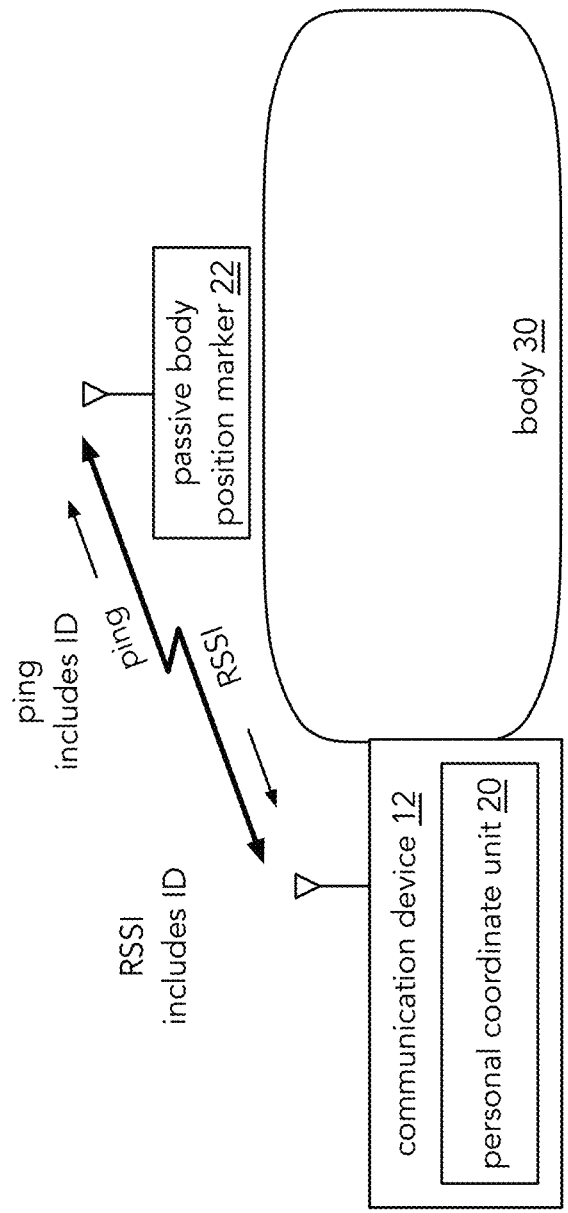
FIG. 14 is a schematic block diagram of an example of RF communication within a personal monitoring system.

FIG. 14 is a schematic block diagram of an example of RF communication within a personal monitoring system. This example is similar to the example of FIG. 13 with the exception that communication is only done via RF signals. In this example, the passive body position marker 22 responds with the RSSI and the system ID via a response RF signal.

Figure 15:
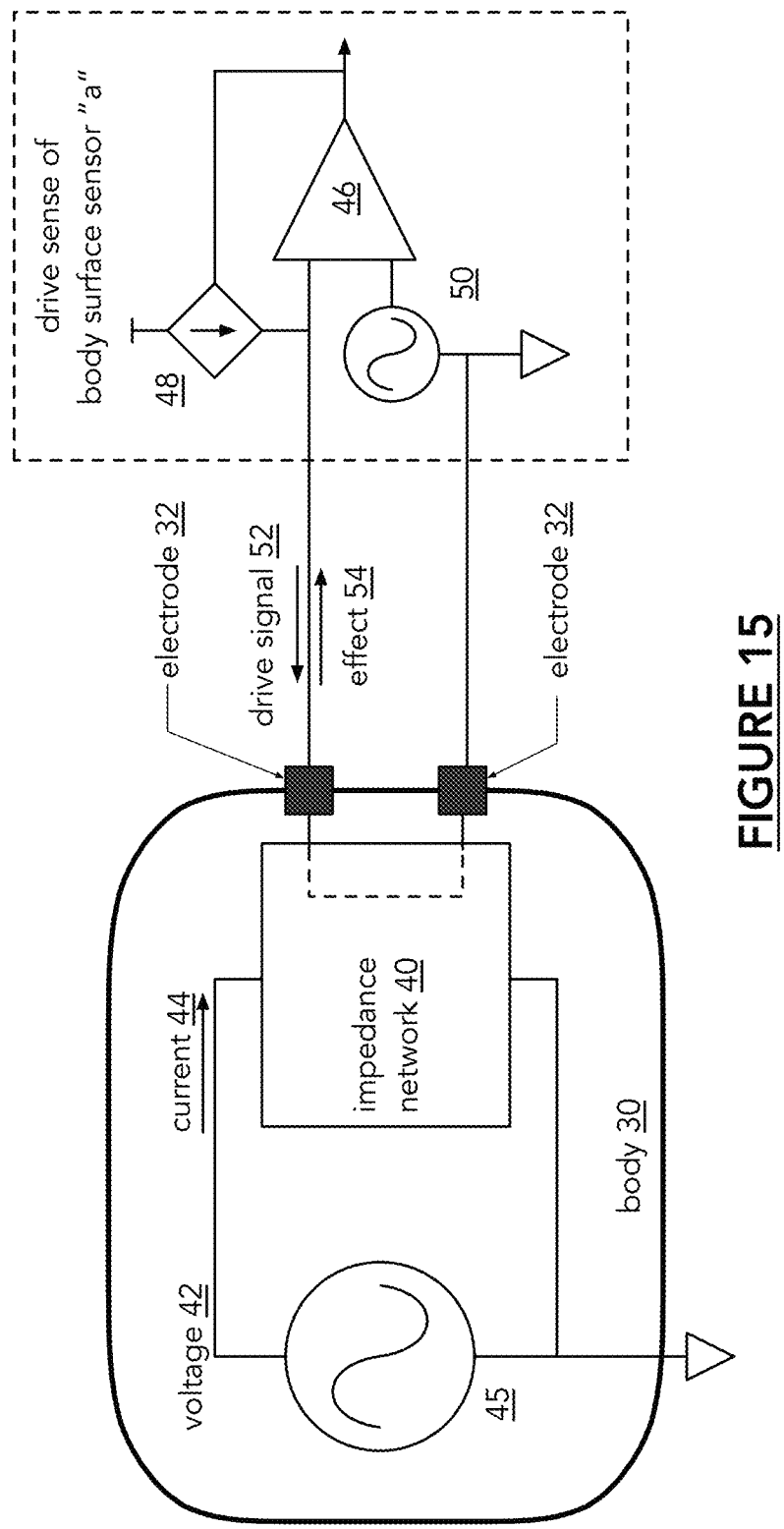
FIG. 15 is a schematic block diagram of an example of on body surface sensing within a personal monitoring system.

FIG. 15 is a schematic block diagram of an example of on body surface sensing within a personal monitoring system 10. As a simplified electrical diagram of a body 30, the body includes an AC voltage source 45 and an impedance network 40. The AC voltage source 45 represents the various electrochemical reactions of the body that produce a voltage 42 and a current 44 that stimulate muscle contraction, stimulate the nervous system, stimulate heart beats, stimulate brain activity, and so on.

The body impedance network 40 comprises the blood, bones, muscle, cells, etc. that make up the body and conduct current 44 produces by the voltage 42 of the electrochemical reactions of the body. In this simplified representation, the impendence network 40 of the body is a distributed RC (resistor-capacitor) network and, in the e-field frequency band, is primarily a capacitor network.

The drive sense circuit of a body surface sensor "a" includes a voltage reference generator 50, an operational amplifier 46, a dependent current source 48, and may further include a feedback circuit (not shown) coupled between the output of the op-am 46 and the input of the dependent current source 48. The voltage reference generator 50 generates an AC reference voltage (e.g., a sinusoid at a frequency within the sensing sub-band of the e-field frequency band).

The op-amp 46 functions to match the voltage on each of its inputs. As such, the voltage on both inputs is equal to the AC reference voltage of generator 50, which means that the voltage of the drive signal 52 equals the AC reference voltage. The drive sense circuit provides the drive signal 52 to a first electrode 32 that is positioned proximal to a surface of the body 30. For example, the first electrode 32 is touching or almost touching the skin of a person.

A second electrode 32 is also positioned proximal to the surface of the body 30 and a distance from the first electrode 32. Note that an electrode is comprised in an electrically conductive material (e.g., a copper strip) that is of a certain size (e.g., a few microns per side to one or more centimeters per side). The second electrode provides a return path for the drive sense circuit.

The dependent current source 48 generates a current based on the output of the op-amp 46 to keep the voltage of the drive signal 52 matching the reference voltage of generator 50. The current traverses through the electrodes 32 and a corresponding portion of the impedance network 40 of the body 30. In an instance, the corresponding portion of the impedance network 40 is essentially a capacitor, which has a particular impedance at the frequency of drive signal 52.

The output of the op-amp 46 represents the adjustments to the current of the drive signal 52 caused by the effect 54 of the body capacitance to keep the voltage of the drive signal 52 matching the voltage of the reference voltage. By knowing the current (I) and the voltage (V), and the particular impedance (Z) of the body capacitor (C) is readily determined (e.g., $Z=V/I$). Knowing the impedance (Z) and the frequency (f), the capacitance (C) can readily be determined (e.g., $C=1/(2*pi*f*Z)$).

If the body capacitance between the electrodes is affected by the voltage 42 and/or current 44 of the body, there will be effects 54 detectable by the drive sense circuit of the body surface sensor. For example, if the electrodes 32 are positioned near the chest in the heart area, the voltage 42 that triggers the beating of the heart will be coupled to the impedance network 40. The op-amp 46 continues to regulate the voltage of the drive signal 52 to match the reference voltage. As such, the current produced by the dependent current source 48 compensates for the impedance variations of the body capacitor due to the drive signal and due to the body voltage 42.

Accordingly, the output of the op-amp 46 will include a signal component for compensating for body impedance effects 54 on the drive signal 52 and a signal component for compensating for the body voltage 42 effects on the impedance, which effects 54 the drive signal. By processing the output of the op-amp 46, the capacitance of the body between the electrodes can be determined and the voltage 42 that stimulates the heart to beat can also be determined.

Figure 16:
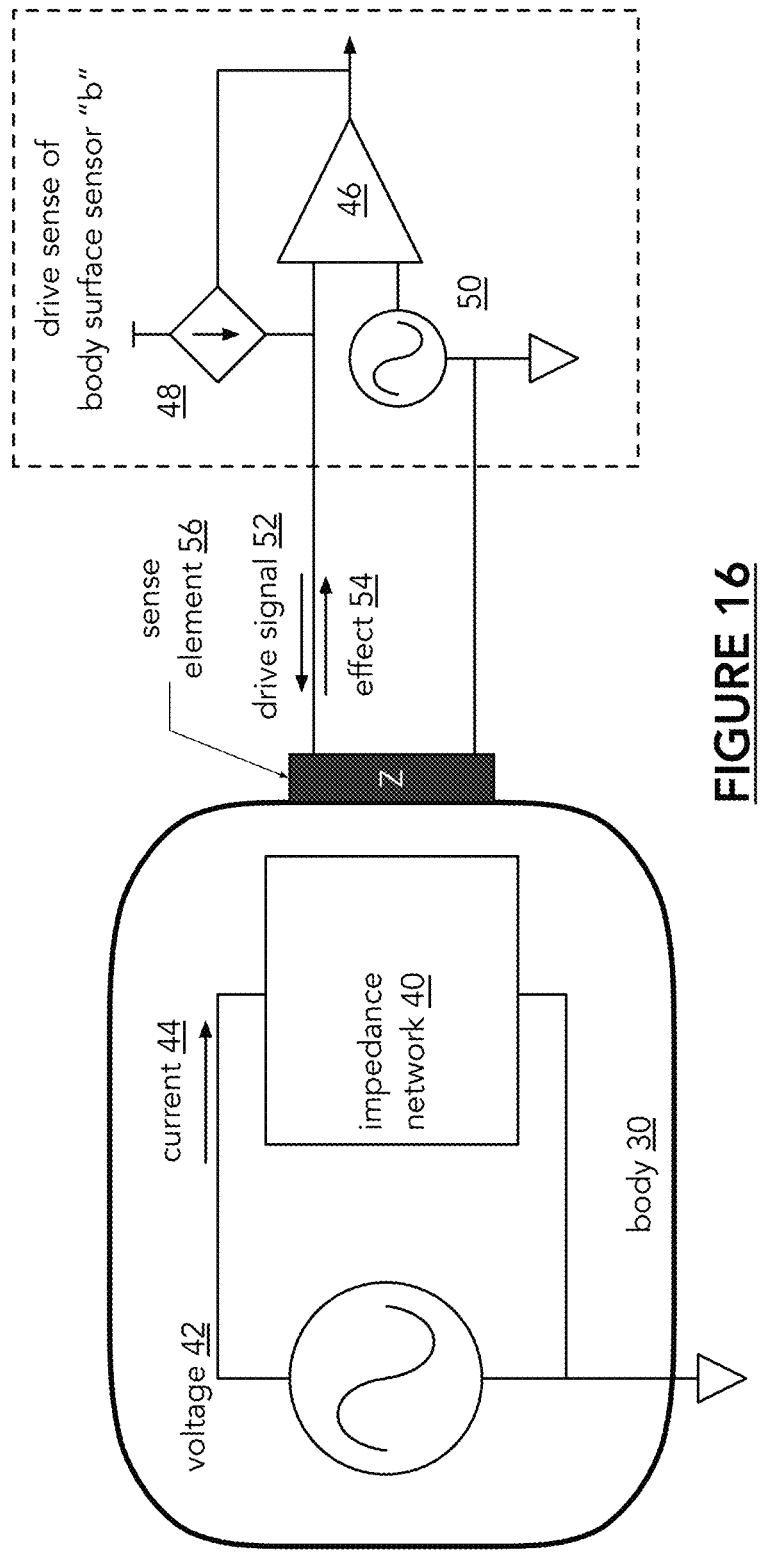
FIG. 16 is a schematic block diagram of an example of on body surface sensing via a sensing element within a personal monitoring system.

FIG. 16 is a schematic block diagram of an example of on body surface sensing via a sensing element within a personal monitoring system 10. In this example, a sense element 56 is placed on the surface of the body 30. The sense element 56 may be implemented in a variety of ways to sense a variety of conditions. For example, to measure temperature, the sense element 56 is a thermocouple. As another example, to measure moisture, the sense element 56 is a pad whose impedance varies based on the level of moisture it absorbs. As yet another example, the sense element 56 is a transducer whose electrical characteristics vary with vibration of the transducer to detect heart rate, respiration, etc. As yet another example, the sense element 56 is a variable impendence (e.g., a variable capacitor based on compression) whose impedance changes with expansion and contraction to measure heart rate, respiration, etc.

The drive sense circuit of a body surface sensor "a" includes the voltage generator 50, the op-amp 46, and the dependent current source 48 and may further includes the feedback circuit (not shown). The drive sense circuit operates as discussed with reference to FIG. 15. In this example, the drive sense circuit senses the impedance of the sensing element 56 and changes thereto as caused by the body. For example, the temperature of the body will change the impedance of a thermocouple. As another example, the expansion and contraction of the chest from a heartbeat and/or respiration will cause the capacitance of compression-based variable capacitor to change.

Figure 17:
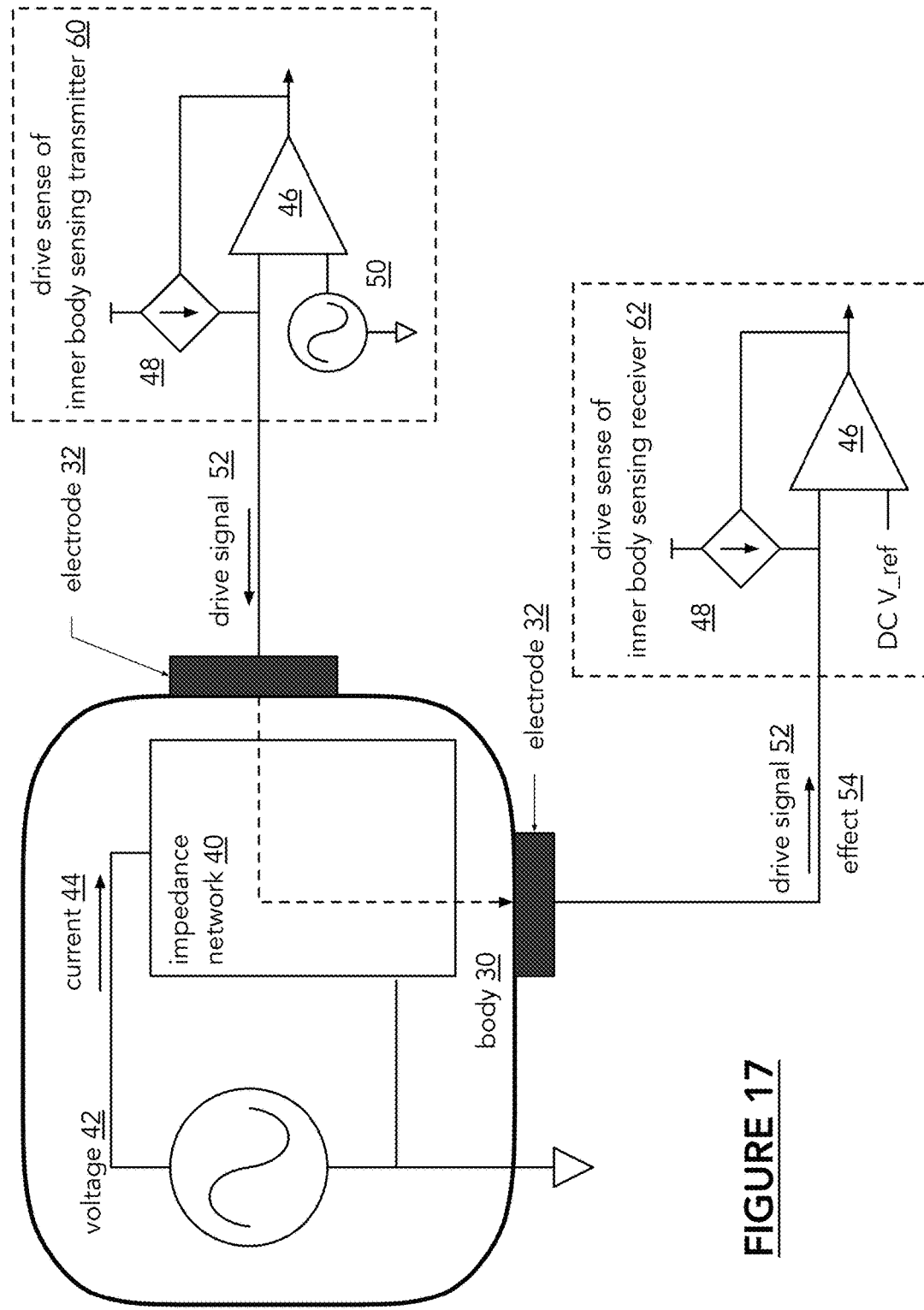
FIG. 17 is a schematic block diagram of an example of inner body sensing within a personal monitoring system.

FIG. 17 is a schematic block diagram of an example of inner body sensing within a personal monitoring system 10. In this example, an inner body sensing transmitter 60 sends a drive signal 52 through a portion of the body 30 to an inner body sensing receiver 62. The inner body sensing transmitter 60 includes a drive sense circuit of the op-amp 46, the dependent current source 48, and the voltage reference generator 50. The inner body sensing receiver 62 includes the op-amp 46, the dependent current source 48, and a DC voltage reference.

The inner body sensing transmitter 60 is coupled to a first electrode 32 that is in a first position on the body. The inner body sensing receiver 62 is coupled to a second electrode 32 that is in a second position on the body. The first and second electrodes 32 effectively form plates of a capacitor and the impedance network 40 of the body provides a dielectric of the capacitor.

The inner body sensing transmitter 60 provides drive signal 52 to the first electrode, which, in the body, creates an e-field between the first and second electrodes 32. With some bodily functions, the body voltage 42 and/or current 44 affect the e-field between the electrodes. The inner body sensing receiver 62 receives the drive signal 52 as a current signal and/or a voltage signal, and the effects 54 caused by the impedance network 40 of the body.

The drive sense circuit of the inner body sensing receiver 62 regulates the voltage at the inputs of the op-amp to be equal. Thus, the inputs are regulated to match the DC voltage reference. The op-amp 46 adjusts the dependent current source 48 to maintain the voltage on the inputs and compensate for the drive signal and the effect 54. The output of the op-amp is processed to determine the effect 54 and its corresponding measured body function.

The inner body sensing transmitter and receiver allow for deeper body sensing than surface sensing based on position of the electrodes 32. For example, if one electrode is positioned on one side of the wrist and the second electrode is positioned on the other side of the wrist, changes to the body's impedance 40, body voltages 42, and/or body currents 44 in the wrist can be accurately measured.

Figure 18:
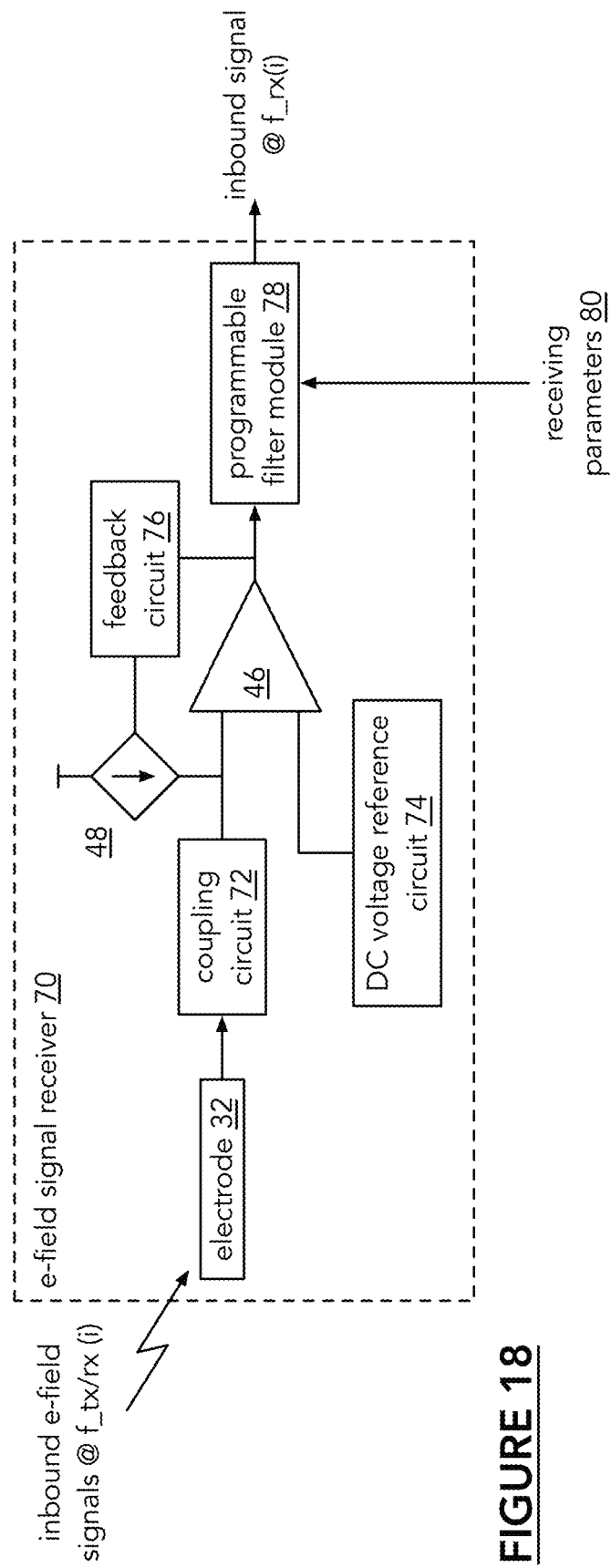
FIG. 18 is a schematic block diagram of an embodiment of an e-field signal receiver.

FIG. 18 is a schematic block diagram of an embodiment of an e-field signal receiver 70 that includes an electrode 32, a coupling circuit 72, a DC voltage reference circuit 74, the op-amp 46, the dependent current source 48, a feedback circuit 76, and a programmable filter module 78. The DC voltage reference circuit 74 generates a DC reference voltage. There is a variety of known techniques to implement a DC voltage reference circuit 74.

When the e-field signal receiver 70 is operational, the electrode 32 receives an inbound e-field signal at a particular tx/rx frequency (e.g., one of the tx/rx frequency sub-band). The electrode 32 will also likely receive other signals that are not of interest to the receiver 70. Some of these signals will be blocked by coupling circuit 72, example embodiments will be described with reference to FIGS. 19 and 20.

The op-amp 46 functions to match the voltage of its inputs. In this embodiment, the op-amp regulates the one input to match the DC voltage on the other. via the feedback circuit 76 and the dependent current source 48. The feedback circuit 76 may be configured to provide a variety of gain options. For example, the feedback circuit 76 is configured to provide a unity gain feedback. As another example, the feedback circuit 76 is configured to provide a gain greater than 1 (e.g., 1.5× to 10×). As another example, the feedback circuit 76 is configured to provide a pole at a particular frequency. As further example, the feedback circuit 76 is configured to provide a zero at a particular frequency.

As the op-amp forces its inputs to match, its output represents the AC signal components of the inbound e-field signal (e.g., the adjustments made to force the inputs to match). The AC signal component at frequency tx/rx_1 is of interest. The other AC signal components are not of interest. Accordingly, the programmable filter module 78 is configured via receiving parameters 80 to pass, substantially unattenuated, the AC signal component at frequency tx/rx_1 and to attenuate the other AC signal components.

The programmable filter module 78 may be implemented as an analog band pass filter or a digital band pass filter with an analog to digital converter front-end. The receiving parameters 80 includes one or more of: a center frequency (e.g., f_tx/rx (i)), a center frequency gain, a low cut-off frequency, a high cut-off frequency, selectivity, and order (e.g., rate of attenuation outside of band pass region). As an example, an analog band pass filter includes a high pass filter and a low pass filter, each implemented with an op-amp, resistors, and/or capacitors. The resistors and/or capacitors are variable to obtain different low and high cut-off frequencies, and gain. Additional resistors and/or capacitors can be switched into and out of the filters to change the order and/or selectivity.

A digital band pass filter can be implemented in a variety of ways. As an example, a digital filter is implemented as one or more infinite impulse response (IIR) filters. As another example, the digital filter is implemented as one or more finite impulse response (FIR) filers. As yet another example, the digital filter is implemented as one or more decimation filters. As a further example, the digital filter is implemented as one or more Fast Fourier Transform (FFT) filters. As a still further example, the digital filter is implemented as one or more Inverse Fast Fourier Transform (IFFT) filters.

Figure 19:
FIG. 19 is a schematic block diagram of an embodiment of a coupling circuit.

FIG. 19 is a schematic block diagram of an embodiment of a coupling circuit 72 that includes an AC coupling capacitor C1 and a low pass filter of resistor R1 and capacitor C2. The AC coupling capacitor is a low impedance at frequencies above 10 KHz, or other frequency, which allows signals with frequencies above the 10 KHz (or other frequency) to pass. The low pass filter allows signals with frequencies below a few hundred Mega-Hertz (or more, or less) to pass and to attenuate signals having higher frequencies.

Figure 20:
FIG. 20 is a schematic block diagram of another embodiment of a coupling circuit.

FIG. 20 is a schematic block diagram of another embodiment of a coupling circuit 72 that includes an AC coupling capacitor C1 and a high frequency blocking capacitor C2. The AC coupling capacitor is a low impedance at frequencies above 10 KHz, or other frequency, which allows signals with frequencies above the 10 KHz (or other frequency) to pass with negligible attenuation. The AC blocking capacitor C2 is a low impedance at frequencies above a few hundred Mega-Hertz (or more, or less), which shunts high frequency signals to ground.

Figure 21:
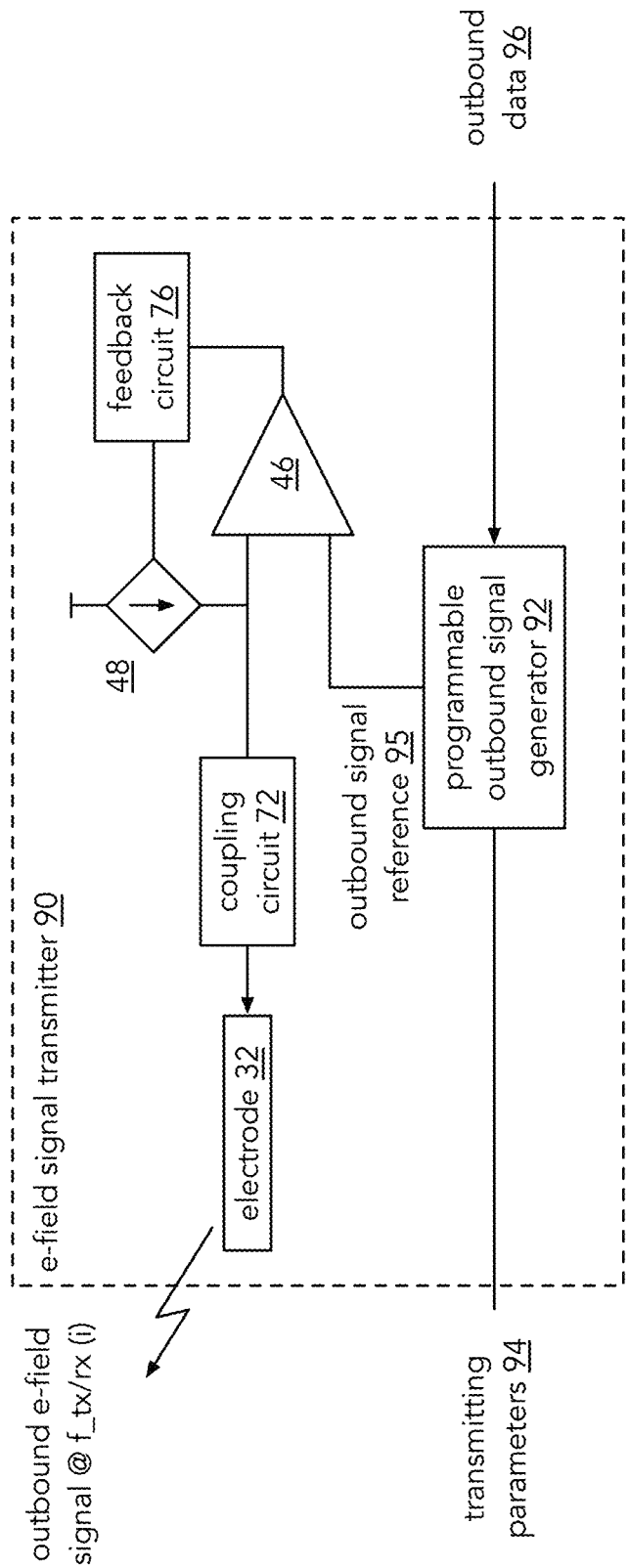
FIG. 21 is a schematic block diagram of an embodiment of an e-field signal transmitter.

FIG. 21 is a schematic block diagram of an embodiment of an e-field signal transmitter 90 that includes an electrode 32, a coupling circuit 72, the op-amp 46, the feedback circuit 76, the dependent current source 48, and a programmable outbound signal generator 92. The programmable outbound signal generator 92 generates an outbound signal reference 95 based on outbound data 96 and in accordance with transmitting parameters 94. The transmitting parameters 94 include one or more of, but not limited to: tx/rx frequency setting, an amplitude setting, an outbound data modulation scheme, the manner of producing the outbound signal reference 95, filtering parameters, transmit data formatting, and/or time-division multiplexing time allocations.

In an example, the programmable outbound signal generator 92 receives sensed data from a biometric sensor, a foot force sensor, and/or a marker 22 as outbound data 96. The sensed data is at a sense frequency (e.g., f_sense (i)). The programmable outbound signal generator 92 modifies the sensed data to produce the outbound signal reference at tx/rx frequency (e.g., f_tx/rx (i)). The programmable outbound signal generator 92 will be described in greater detail with reference to one or more of FIGS. 25-28.

The op-amp 46 functions to match the voltage on its inputs. As such, the outbound signal reference 95 is provided to the electrode 32 via the coupling circuit 72. The dependent current source 48 supplies current to the electrode 32 to maintain the voltage of the op-amp's input to match the outbound signal reference 95 based on the load of the electrode 32.

Figure 22:
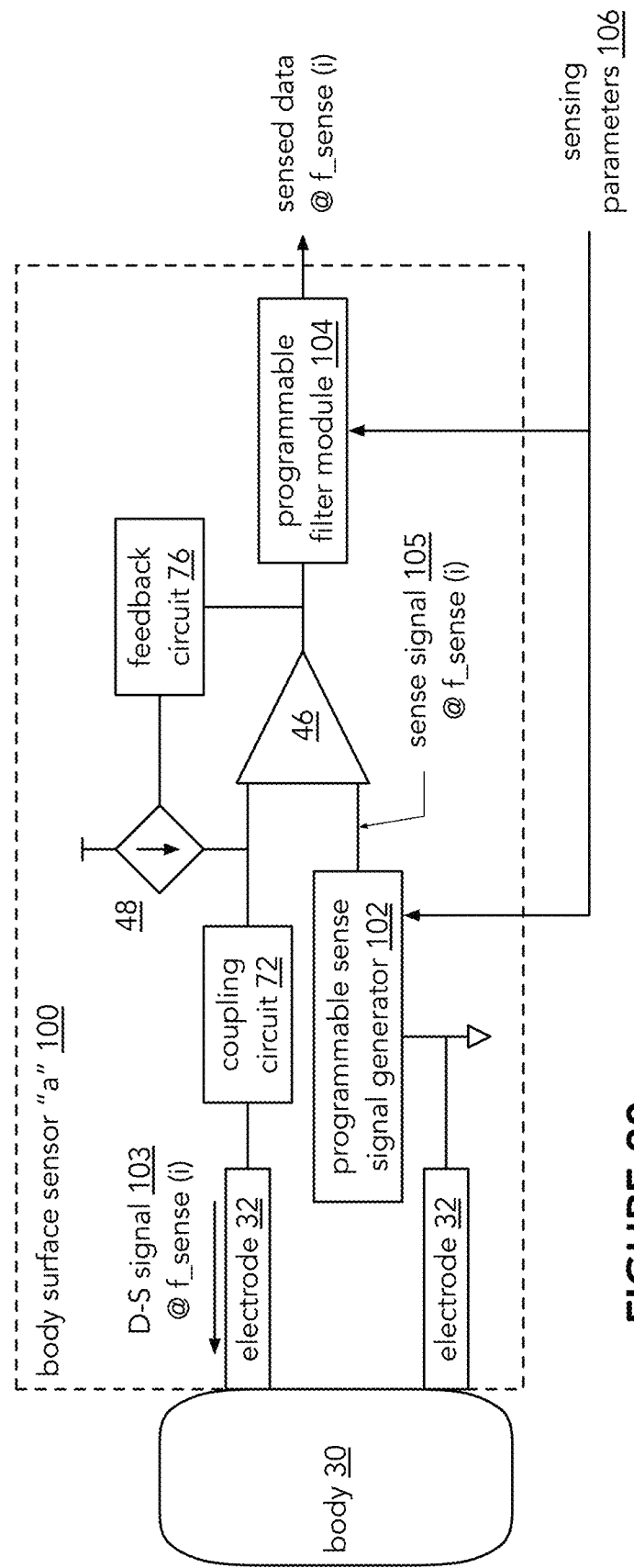
FIG. 22 is a schematic block diagram of an embodiment of body surface sensor.

FIG. 22 is a schematic block diagram of an embodiment of a body surface sensor 100 (type "a"). The body surface sensor 100 includes a pair of electrodes 32, a coupling circuit 72, a programmable sense signal generator 102, an op-amp 46, a feedback circuit 76, a dependent current source 48, and a programmable filter module 104. The programmable sense signal generator 102 and the programmable filter module 104 are programmed based on sensing parameters 106.

The sensing parameters 106 include filter settings and sense signal settings. The filter settings include a center frequency, a low frequency cut-off, a high frequency cut-off, a center frequency gain, selectivity, and/or order (e.g., rate of attenuation outside of band pass region). The sense signal settings include a frequency, a signal form (e.g., sine wave, square wave, etc.), magnitude, and/or phase shift.

Based on the sense signal settings, the programmable sense signal generator 102 generates a sense signal 105, which has a frequency at f_sense (i) in the e-field frequency band. The programmable sense signal generator 102 will be described in greater detail with reference to one or more of FIGS. 25 and 26.

The op-amp 46 functions to keep the voltage at its inputs matching. Accordingly, the voltage of the drive sense (D-S) signal substantially equals the voltage of the sense signal 105. The dependent current source 48 supplies a current that varies based on the output of the op-amp 46 and the feedback circuit 76 to keep the input voltages of the op-amp substantially matching. Via the coupling circuit 72 and the first electrode 32, the drive-sense signal is sourced to the body 30.

The current produced by the dependent current source 48 flows through a portion of the body's impedance network (the part between the electrodes 32). The portion of the body's impedance network affects the drive-sense signal 103. For example, the capacitance of the portion of the body's impedance network has an impedance at the sense frequency (f_sense (i)). Since I (current)=V (voltage)/Z (impedance), the current of drive signal is affected by the body's impedance. The effect of the body's impedance is regulated out of the voltage of the drive-sense voltage by the op-amp. The amount of regulation is reflected in the output of the op-amp 46. Thus, the output of the op-amp 46, via the regulated effect, represents a measure of the body's impedance.

As another example, the surface of the body between the electrodes 32 is affected by the impedance of the body and by an electrical signal of the body (e.g., the electric signal that causes the heart to beat). The electrical signal of the body is coupled into the capacitance of the body between the electrodes 32. The coupled electrical signal affects the impedance of the body's capacitance between the electrodes 32, which is sensed as discussed in the previous paragraph.

The output of the op-amp 46 is filtered by the programmable filter module 104, which outputs sensed data at the sense frequency, or frequencies). The programmable filter module 104 (which is a programmable analog bandpass filter and/or a programmable digital bandpass filter) is programmed to pass, substantially unattenuated, signals having a frequency approximate to the sense frequency and to attenuate signals having frequencies that do not approximate the sense frequency.

The programmable filter module 104 may further be programmed to have a second bandpass region. For example, if the body surface sensor 100 is sensed heart rate, the programmable filter module 104 is programmed with a second bandpass region of 200 Hz or less to pass the sensed electrical signal that triggers the heart to beat.

Figure 23:
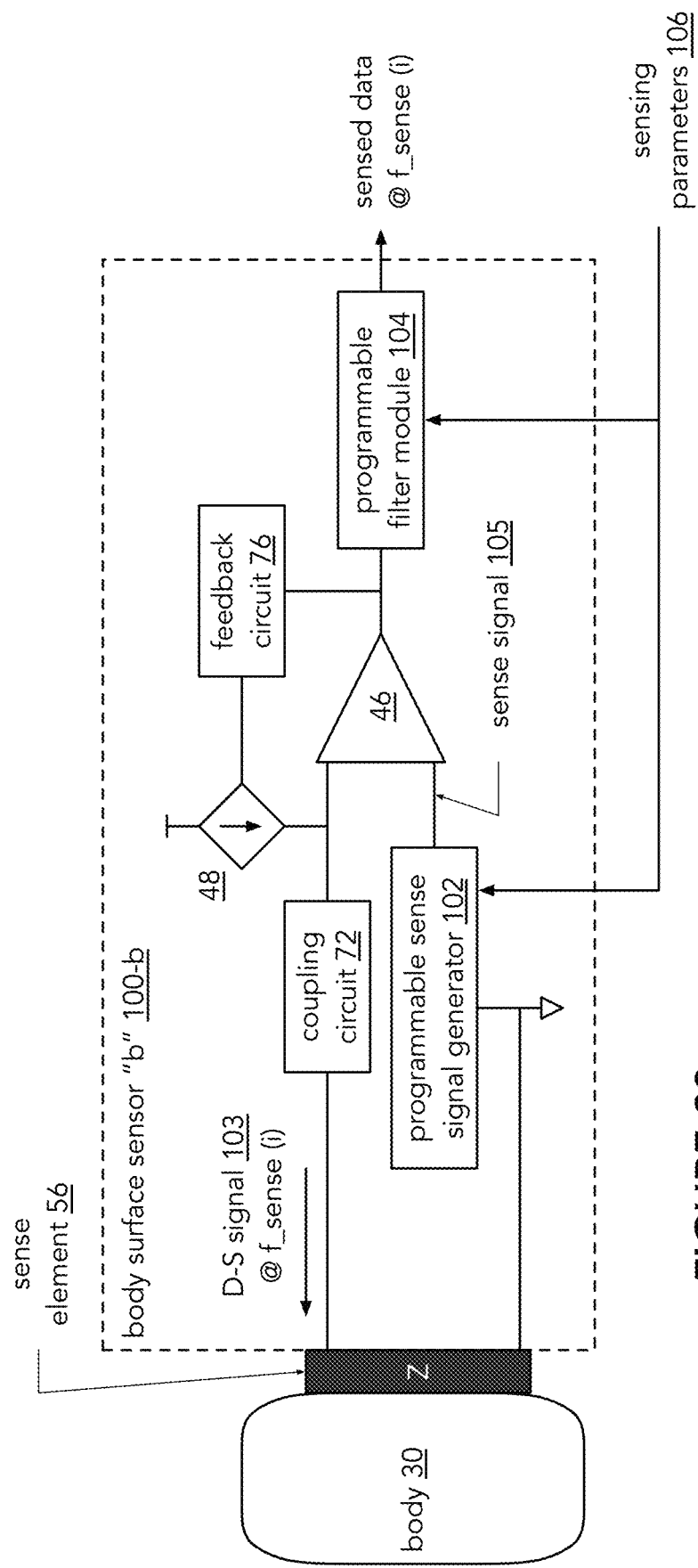
FIG. 23 is a schematic block diagram of an embodiment of body surface sensor that includes a sensing element.

FIG. 23 is a schematic block diagram of an embodiment of body surface sensor 100-*b* that includes or is coupled to a sensing element 56. The sensor 100-*b* is similar to the sensor 100-*a* of FIG. 22 with the exceptions that the present sensor does not include the electrodes 32 and it is sensing the sensing element 56, not the body. For example, the sensor 100-*b* senses the surface temperature of the body; moisture of the surface of the body; movements of the body; and/or other bodily condition.

A bodily condition (e.g., temperature) affects the impedance of the sense element 56. The sensor 100-*b* detects the effect of the impedance of the sense element via effects on the drive-sense signal 103. Such effects are reflected in the output of the op-amp 46 and subsequently filtered by the programmable filter module 104 to produce sensed data. Note that sensed data is an analog signal or a digital signal that is representative of the effect on the drive-sense signal 103, which is caused by a bodily condition.

Figure 24:
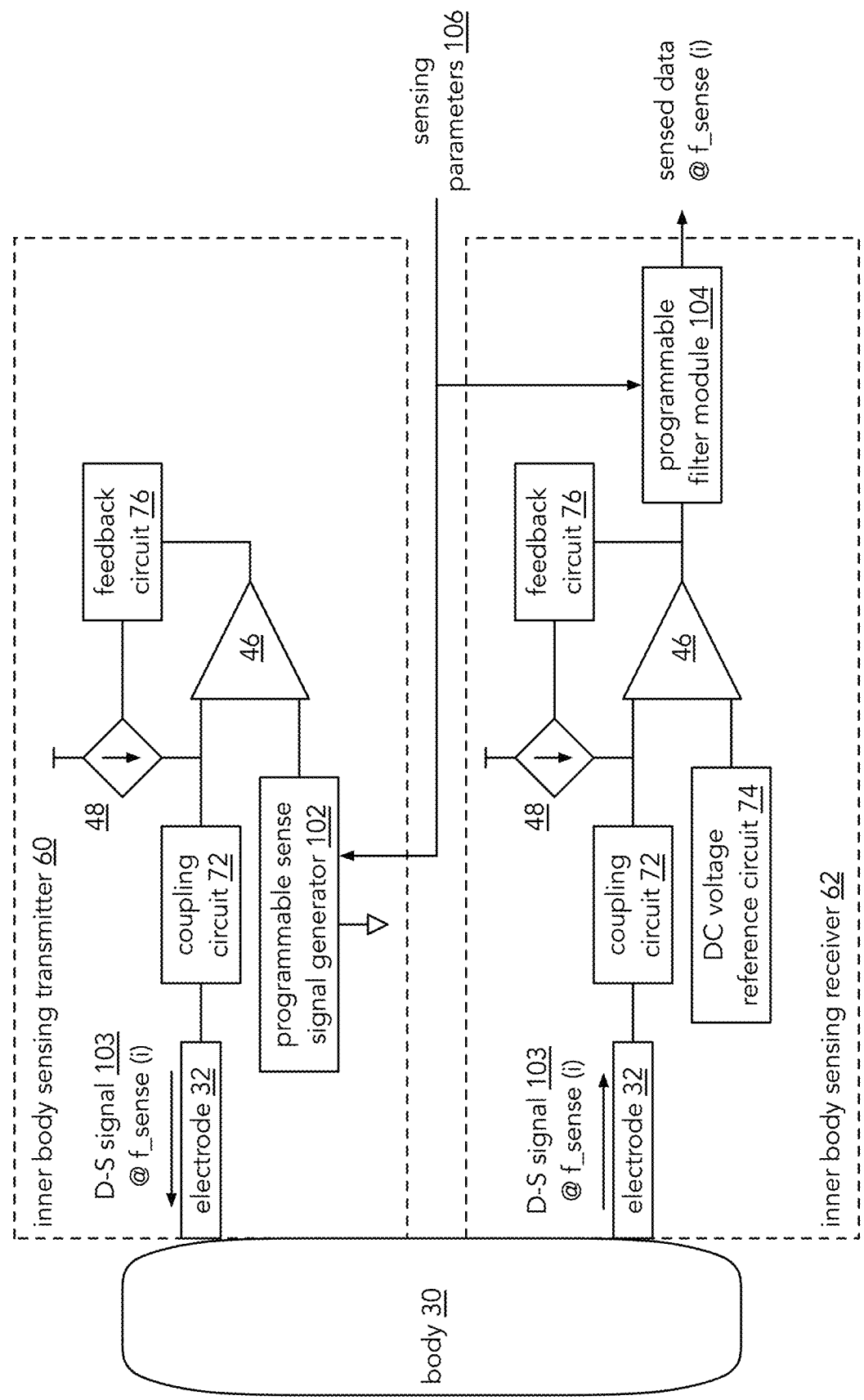
FIG. 24 is a schematic block diagram of an embodiment of an inner body surface sensor.

FIG. 24 is a schematic block diagram of an embodiment of an inner body surface sensor that includes an inner body sensing transmitter 60 and an inner body sensing receiver 60. The inner body sensor provides sense signals deeper into the body to measure a bodily condition within the body. Alternatively, or in addition, the inner body sensor senses a bodily condition on the surface of the body. In another embodiment, the inner body sensor includes one or more inner body sensing transmitters 60 and a plurality of inner body sensing receivers 62.

The inner body sensing transmitter 60 includes an electrode 32, a coupling circuit 72, a programmable sense signal generator 102 (which is configured in accordance with sensing parameters 106), an op-amp 46, a feedback circuit 76, and a dependent current source 48. These components operate as previously discussed to produce a drive-sense signal 103. In this sensor, the sensing of the effects on the drive-sense signal 103 is done by the inner body sensing receiver 62.

The inner body sensing receiver 62 includes an electrode 32, a coupling circuit 72, a DC voltage reference circuit 74, an op-amp 46, a feedback circuit 76, a dependent current source 48, and a programmable filter module 104 (which is configured in accordance with the sensing parameters). With a DC voltage reference, the AC components regulated out at the input of the op-amp correspond to the drive-sense signal 103 and the effects on it caused by the body 30. The effects caused by the body are reflected in the sensed data being outputted.

Figure 25:
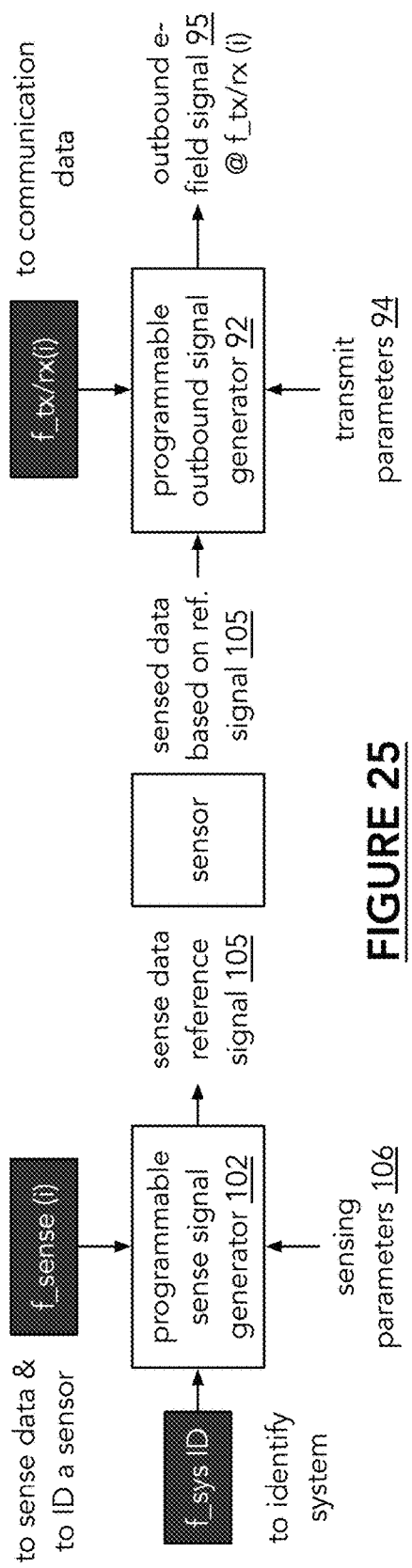
FIG. 25 is a schematic block diagram of an example of a relationship of ID, sensing, & e-field communication frequencies within a personal monitoring system.

FIG. 25 is a schematic block diagram of an example of a relationship between ID frequencies, sensing frequencies, & e-field communication frequencies within a personal monitoring system. As mentioned, each personal monitoring system is assigned a system ID frequency (e.g., f_sys ID).

In an embodiment, the system ID frequency is permanently assigned to a personal monitoring system. Note that, with a limited number of available system ID frequencies, some personal monitoring systems will be assigned the same system ID frequency. As long as the users of personal monitoring systems with the same system ID frequency are not in a physically close proximity in which the users may physically touch each other, then having the same system ID frequency will not be an issue.

Recall that, in an embodiment, the communication device generates a system ID signal using the system ID frequency and transmits the system ID signal through the body to sensors associated with the body. The sensors incorporate a representation of the system ID signal in their responses such that the communication device knows the sensors are associated with the body and the present personal monitoring system.

In another embodiment, the computing device randomly assigns the system ID frequency to the personal monitoring. For example, when a plurality of users are in a confined physical area (e.g., a football field, a basketball court, a starting position for a running race, a workout class, etc.), there is a probability that the users will touch. When two users physically touch, or are close to touching (e.g., within 10 centimeters or more), the e-field signals of one body may be received by the other body, and vice versa. If the system ID frequencies are the same, the personal monitoring systems cannot tell which body the signals are from.

To overcome this potential issue, the computing device allocates the personal monitoring systems in the confined physical area a unique system ID frequencies. For example, for a basketball game, each player's personal monitoring system would be allocated a unique system ID frequency for the game. As another example, for a marathon, or half-marathon, race, each participant is the race is assigned a unique system ID frequency for the race.

In furtherance of the present embodiment, once the game or race is over, the personal monitoring system retains the assigned system ID frequency unit the next use of the system in a confined physical area. Alternatively, once the game or race is over, the personal monitoring system is assigned a new system ID frequency.

In yet another embodiment, the computing device temporarily assigns a system ID frequency to the personal monitoring for a particular use. For example, a personal monitoring system has a permanently assigned system ID frequency but, for particular situations, it assigned a temporary system ID frequency. As a specific example, for the basketball game or the marathon race, a user's personal monitoring system is assigned a unique temporary system ID frequency (which may correspond to its permanent system ID frequency) to use for the duration of the game and/or race. Once the game or race is over, the personal monitoring system resumes use of its permanently assigned system ID frequency.

As further shown in FIG. 25, the programmable sense signal generator 102 uses the system ID frequency in accordance with the sensing parameters 106 to produce a sensing signal at a particular sensing frequency. Within a personal monitoring system, sensors are assigned unique sensing frequencies, which are used to identify the sensors and to enable concurrent sensing of the body.

Figure 26A:
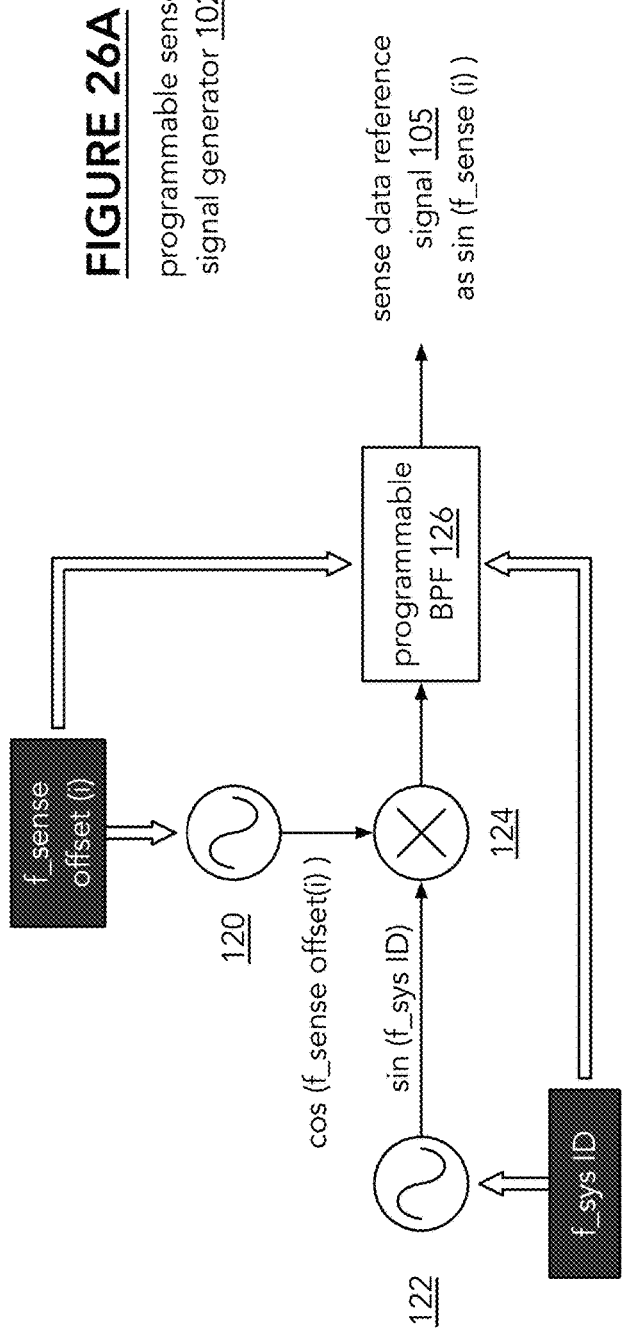
FIGS. 26A-26C are schematic block diagrams of embodiments of a programmable sense signal generator.

FIG. 26A is a schematic block diagram of an embodiment of a programmable sense signal generator 102 that includes a system ID signal source 122, a sense offset signal source 120, a multiplier 124, and a programmable bandpass filter 126. The system ID signal source 122 generates a system ID sinusoidal signal having a frequency of the system ID frequency, which can be done in a variety of ways.

For example, the system ID signal source 122 is a bandpass filter centered at the system ID frequency and recovers the system ID signal from an e-field transmission by the communication device through the body. As another example, the system ID signal source 122 is a crystal oscillator that is configured to generate the system ID signal. In this example the system ID frequency is stored as a digital value in memory of the sensor. As yet another example, the system ID signal source 122 is a digital frequency synthesizer that is programmed to generate the system ID signal having the system ID frequency.

The sense offset signal source 120 generates an offset sinusoidal signal having an offset frequency. The sense offset signal source 120 may be implemented in a similar manner as the system ID signal source 122.

The sinusoidal system ID signal (e.g., sin (f_sys ID)t) is multiplied with the sinusoidal offset signal (e.g., cos (f_offset (i))t) to produce a mixed signal (e.g., ½ sin (f_sys ID−f_offset (i))t+½ sin (f_sys ID+f_offset (i))t). The programmable bandpass filter (BPF) 126 is programmed to pass, substantially unattenuated, the sum of the frequencies signal component (e.g., ½ sin (f_sys ID+f_offset (i))t) or the difference of the frequencies signal component (½ sin (f_sys ID−f_offset (i))t) and to attenuate signals having frequencies outside of the bandpass region. The output of the programmable bandpass filter 126 is a sense data reference signal 105, which is used by a sensor to sense data and/or to identify the sensor.

Figure 26B:
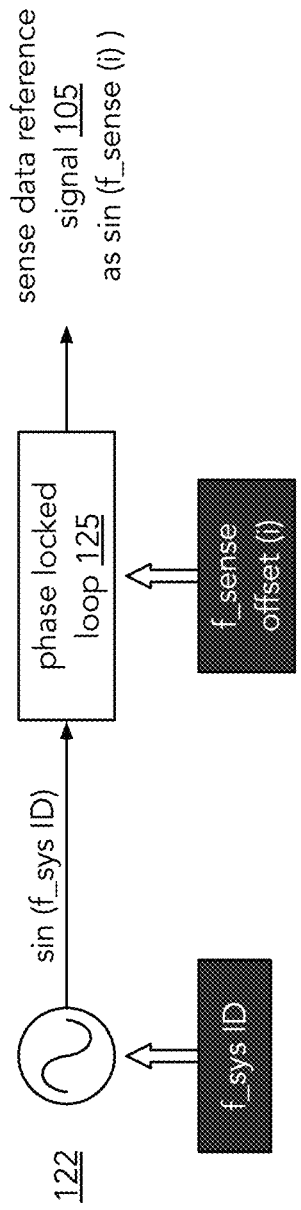

FIG. 26B is a schematic block diagram of another embodiment of a programmable sense signal generator 102 that includes the system ID signal source 122 and a phase locked loop 125. The system ID signal source 122 generates a sinusoidal system ID signal (e.g., sin (f_sys ID)t), which is inputted to the phase locked loop 125. Based on the desired sense frequency (e.g., the system ID frequency+the sense offset frequency), the phase locked loop 125 generates the sense data reference signal 105.

Figure 26C:
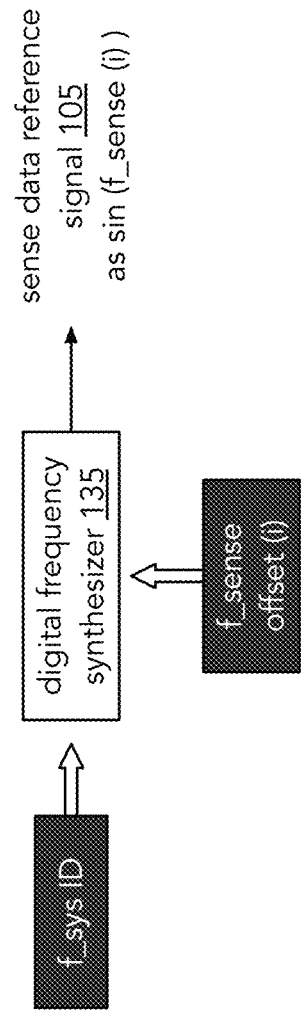

FIG. 26C is a schematic block diagram of another embodiment of a programmable sense signal generator 102 that includes a digital frequency synthesizer 135. Based on the input of the system ID frequency and the sense offset frequency, the digital frequency synthesizer 135 generates the sense data reference signal 105.

Returning to the discussion of FIG. 25, the programmable outbound signal generator 92 generates an outbound e-field signal 95 based on the sense data and the transmit parameters 94. The outbound e-field signal 95 has a sinusoidal signal component a tx/rx frequency (e.g., f_tx/rx (i)).

Figure 27A:
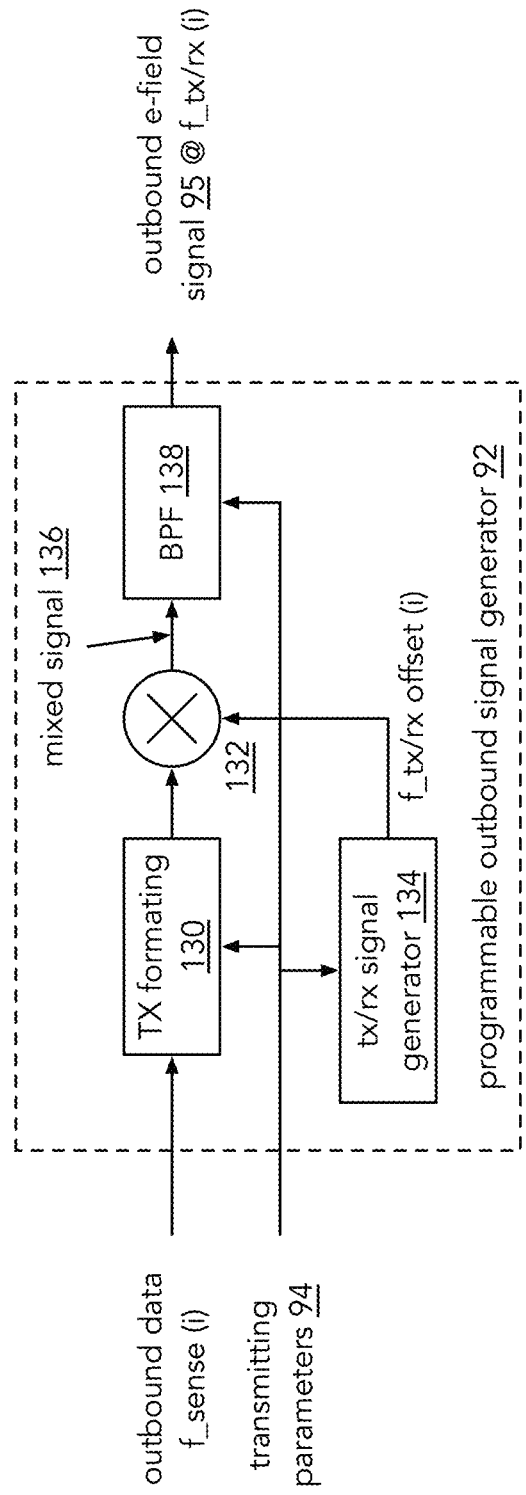
FIG. 27A is a schematic block diagram of an embodiment of a programmable outbound signal generator.

FIG. 27A is a schematic block diagram of an embodiment of a programmable outbound signal generator 92 comprises a transmit (TX) formatting module 130, a tx/rx signal generator 134, a multiplier 132, and a band pass filter 138. The TX formatting module 130 receives an outbound data signal from a sensor, from a marker, and/or from the communication device. The outbound data signal is sensed data, information (e.g., set up information, a command, the system ID, etc.) from the communication device to a sensor, an information response from a sensor to the communication device, and/or other data sent via the body within the person monitoring system. In this example, the outbound data is sensed data at a frequency of f_sense (i).

The TX formatting module 130 adjusts, in accordance with the transmitting parameters 94, the outbound data signal for multiplying it with the tx/rx offset signal at f_tx/rx offset (i) by multiplier 132. The adjusting of the outbound data signal includes one or more of: converting the outbound data signal into a digital signal; adjusting the amplitude of the signal; adjusting the phase of the signal; modulating the data via a modulation protocol (e.g., AM (amplitude modulation), ASK (amplitude shift keying), and/or PSK (phase shift keying)), and/or time shifting the signal.

Figure 27B:
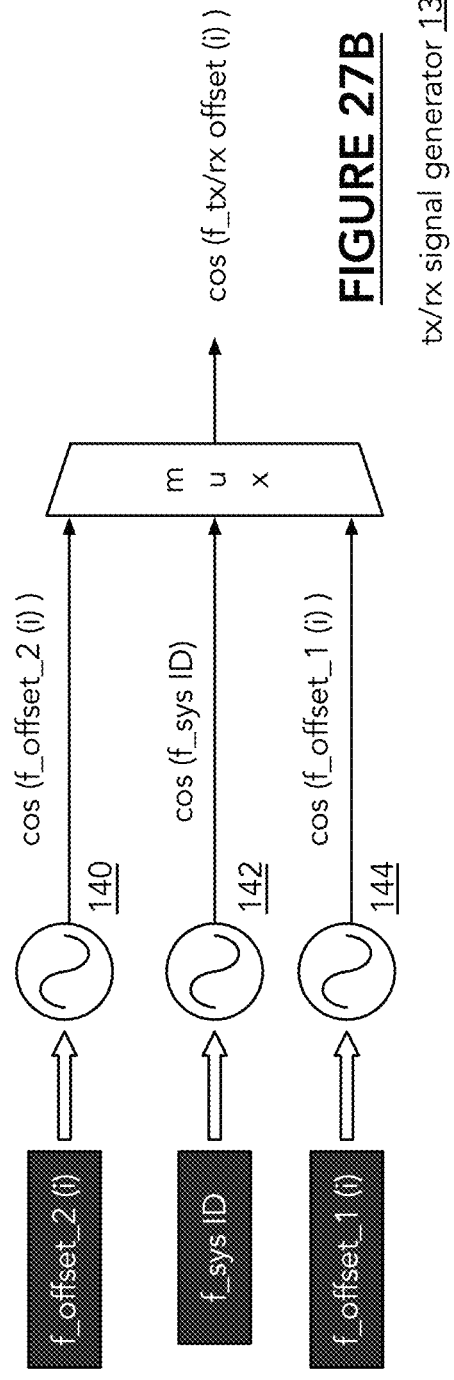
FIG. 27B is a schematic block diagram of an embodiment of a programmable tx/rx signal generator.

The tx/rx signal generator 134 generates, in accordance with the transmitting parameters 94, a tx/rx offset signal at a frequency of f_tx/rx offset (i). FIG. 27B is a schematic block diagram of an embodiment of a programmable tx/rx signal generator 134 that includes a first signal source 140, a second signal source 142, a third signal source 144, and a multiplexer (mux).

The first signal source 140 generates a second offset signal (e.g., cos (f_offset_2 (i)t) based on a second offset frequency setting. The second signal source 142 generates the system ID signal (e.g., cos (f_sys ID (i)t) based on a system ID frequency setting. The third signal source 144 generates a first offset signal (e.g., cos (f_offset_1 (i)t, i.e., the offset used to produce the sense frequency) based on a first offset frequency setting. The multiplexor selects one of the signals to function as the tx/rx offset signal.

Alternatively, the tx/rx signal generator 134 includes one signal source that is programmable to produce one of the three signals as the tx/rx offset signal. For example, the signal source is programmed to produce the second offset signal (e.g., cos (f_offset_2 (i)t). As another example, the signal source is programmed to produce the system ID signal (e.g., cos (f_sys ID (i)t). As yet another example, the signal source is programmed to produce the first offset signal (e.g., cos (f_offset_1 (i)t. The signal source(s) of FIG. 27B may be implemented in a similar manner as the system ID signal source 122 of FIG. 26B.

Returning to the discussion of FIG. 27A, the multiplier 132 multiples the outbound data signal (e.g., sin (f_sense (i)t) and the tx/rx offset signal (e.g., cos (f_tx/rx offset (i)t) to produce a mixed signal 136. The mixed signal 136 includes a sum of the frequencies component (e.g., ½ sin (f_sense (i)+f_tx/rx offset (i)t) and a difference of the frequencies component (e.g., ½ sin (f_sense (i)−f_tx/rx offset (i)t).

The bandpass filter 138 is programmed based on the transmitting parameters to pass the sum of the frequencies component (e.g., ½ sin (f_sense (i)+f_tx/rx offset (i)t) or the difference of the frequencies component (e.g., ½ sin (f_sense (i)−f_tx/rx offset (i)t) as the outbound e-field signal 95. The outbound e-field signal 95 is transmitted via the body and received by the desired destination (e.g., a sensor, a market, and/or the communication device).

Figure 28A:
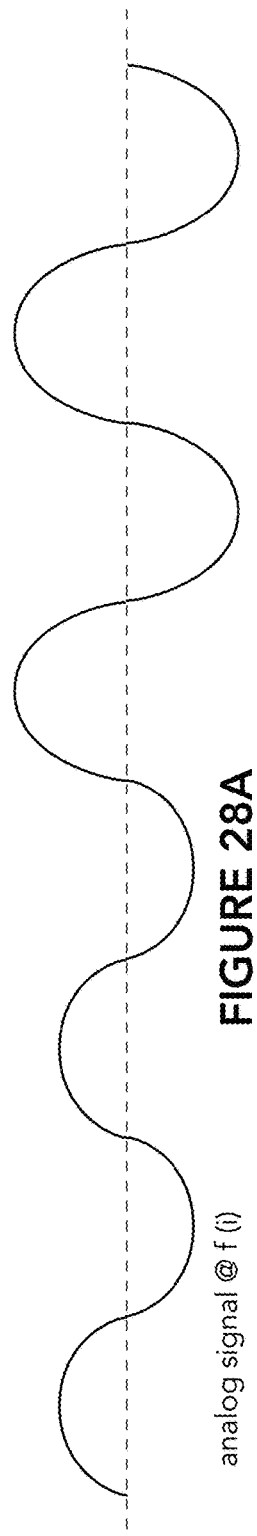
FIGS. 28A-28D are diagrams of example signals within the personal monitoring system.
Figure 28B:
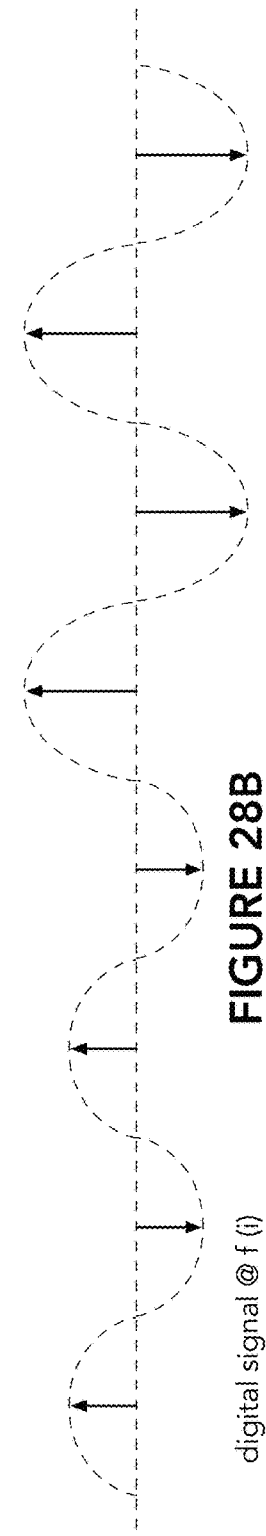
Figure 28C:
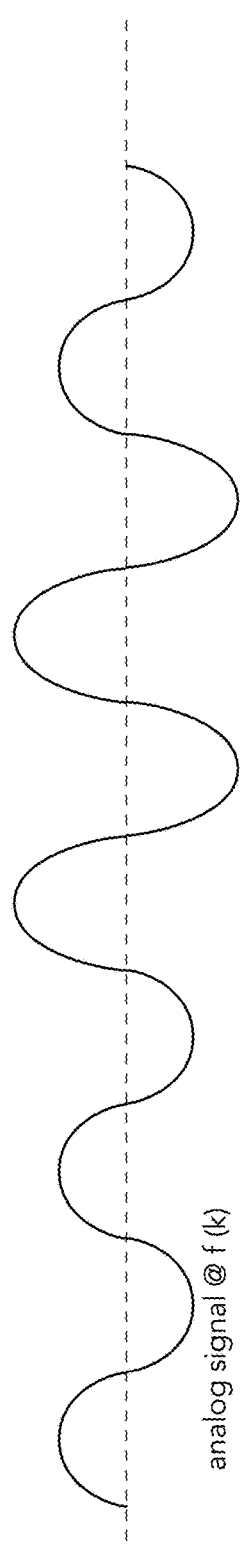

FIGS. 28A-28D are diagrams of example signals within the personal monitoring system 10. When the personal monitoring system 10 is coupled to a body, signaling via the body is done using e-field analog signals; examples of which are shown in FIGS. 28A and 28C. The example analog signals have a frequency that identifies the source of the signal. The data being conveyed via the analog signal is contained in the amplitude of the signal (e.g., AM, ASK, etc.) and/or in the phase shifting of the signal (e.g., PSK).

Figure 28D:
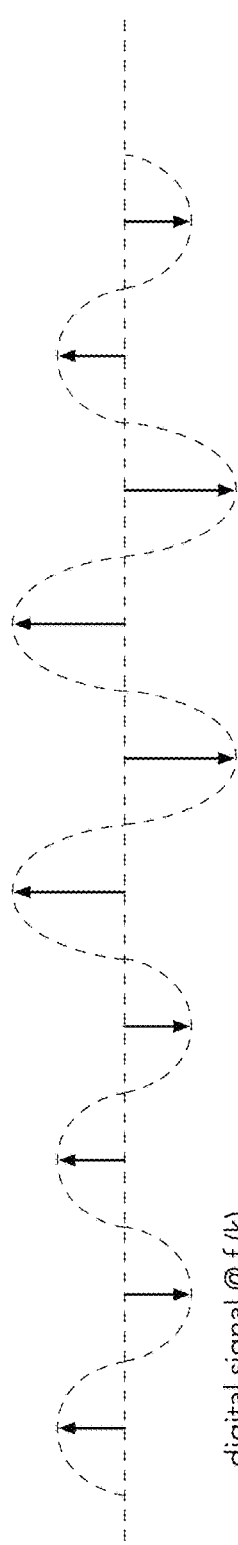

FIGS. 28B and 28D illustrate digital representations of the analog signals of FIGS. 28A and 28C, respectively. The circuitry of the personal monitoring system 10 is implemented in the analog domain to process the analog signals of FIGS. 28A and 28C and/or is implemented in the digital domain to process the digital signals of FIGS. 28B and 28D.

Figure 29:
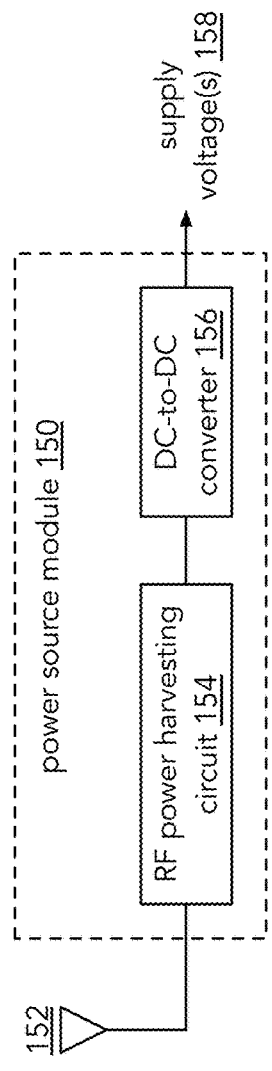
FIG. 29 is a schematic block diagram of an embodiment of a power source module.

FIG. 29 is a schematic block diagram of an embodiment of a fully passive power source module 150 that includes an RF power harvesting circuit 154 and a DC-to-DC converter 156. The RF power harvesting circuit 154 is coupled to an antenna 152 and receives RF signals therefrom. The RF power harvesting circuit 154, using a conventional implementation, converts the received RF signals into an unregulated DC voltage.

The DC-to-DC converter 156 converts the unregulated DC voltage of the power harvesting circuit 154 into one or more regulated supply voltages 158. The DC-to-DC converter 156 is implemented as a linear regulation, as a buck-converter, as a boost-converter, and/or other DC-to-DC converter topologies.

The power source module 150 may further include one or more other power harvesting circuits. For example, the power source module 150 includes a pressure-based power harvesting circuit where varying pressure is converted into a voltage. As another example, the power source module 150 includes a light harvesting power module (e.g., one or more solar cells). As yet another example, the power source module 150 includes a heat-based harvesting module where heat of the user of the personal monitoring system is converted into a voltage. The output of an additional power harvesting circuit is coupled to the input of the DC-to-DC converter 156.

Figure 30:
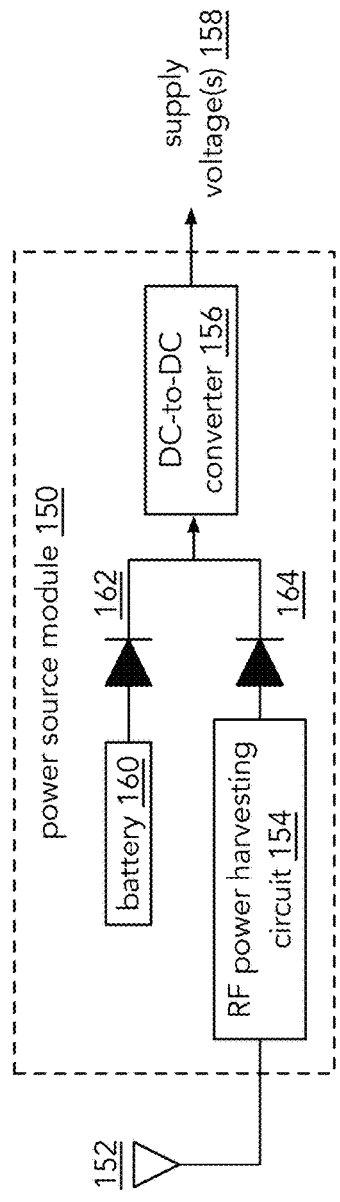
FIG. 30 is a schematic block diagram of another embodiment of a power source module.

FIG. 30 is a schematic block diagram of another embodiment of a passive assist power source module 150 that includes the RF power harvesting circuit 154, the DC-to-DC converter 156, a battery 160, and blocking diodes 162 and 164. The RF power harvesting module 154 is coupled to antenna 154. The blocking diodes 162 and 164, which may be Schottky diodes or other one-direction current flow circuit, decouple the battery and the RF power harvesting circuit and allow the one generating the higher voltage to supply the DC-to-DC converter, which produces one or more supply voltages 158.

Figure 31:
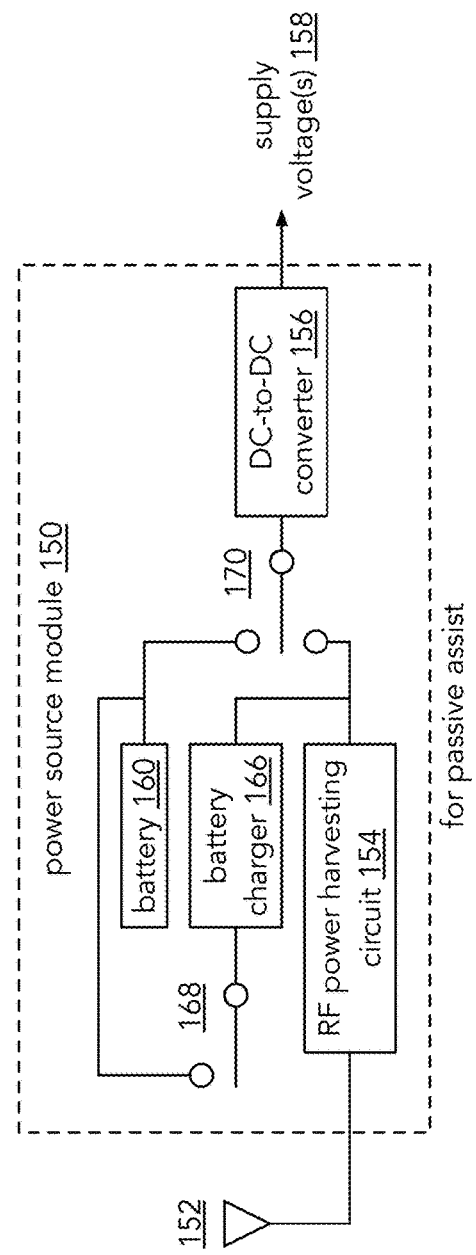
FIG. 31 is a schematic block diagram of another embodiment of a power source module.

FIG. 31 is a schematic block diagram of another embodiment of a passive assist power source module 150 that includes the RF power harvesting circuit 154, the DC-to-DC converter 156, a battery 160, a battery charger 166, a first switch 168, and a second switch 170. With this embodiment of a power source module 150, power is being supplied by the RF power harvesting circuit 154 or by the battery 160. When the battery 160 is supplying the power, switch 168 is open and switch 170 couples the battery to the DC-to-DC converter 156.

When the RF power harvesting circuit 154 is supplying the power, switch 170 couples the RF power harvesting module 154 to the DC-to-DC converter 156. In addition, switch 168 may be closed to enable charging of the battery 160 by the battery charger 166. In another mode, switch 170 is open (i.e., no input to the DC-to-DC converter 156) and switch 168 is closed to allow charging of the battery when the power source module 150 is producing the one or more supply voltages 158.

Figure 32:
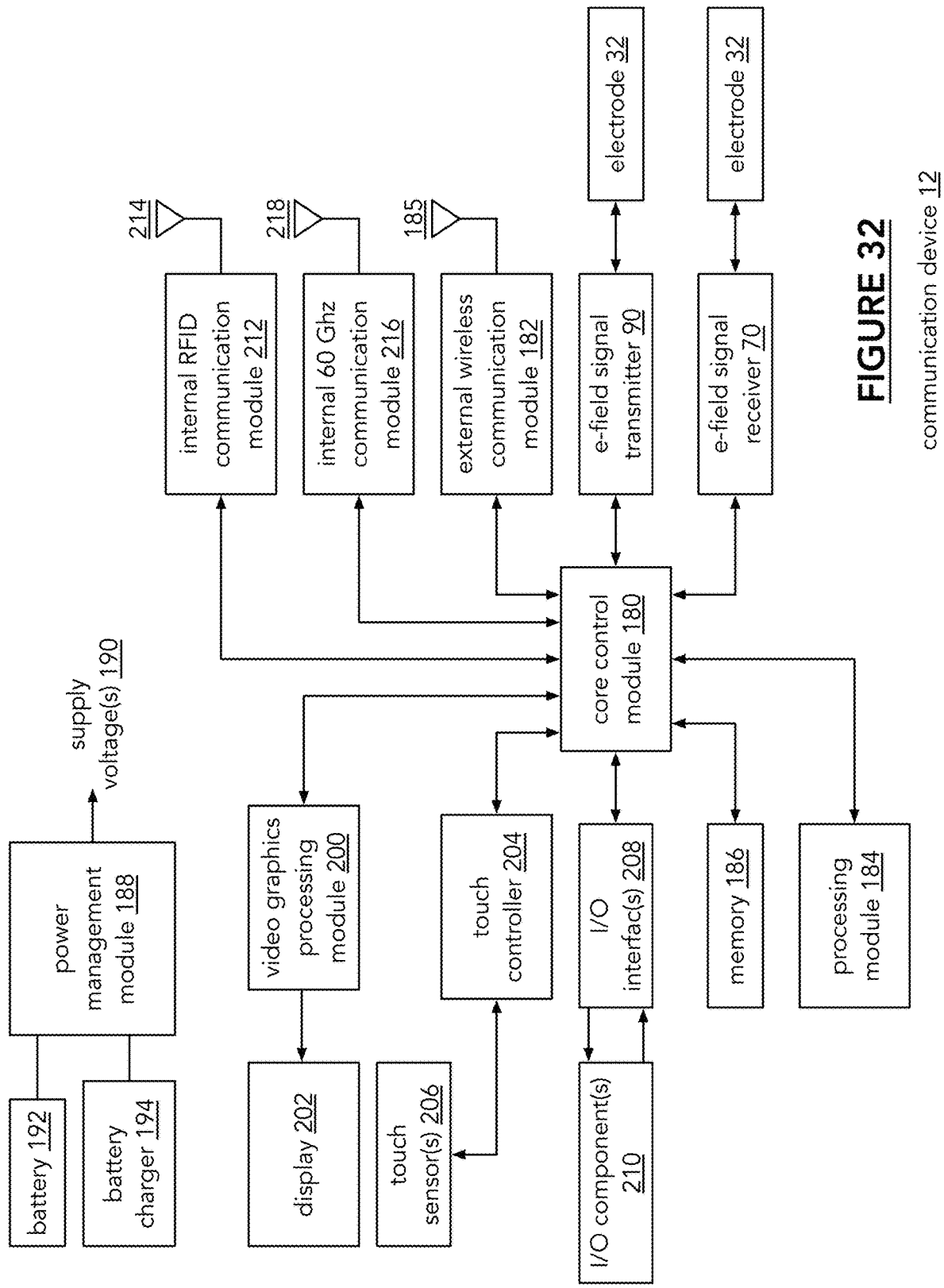
FIG. 32 is a schematic block diagram of an embodiment of a communication device.

FIG. 32 is a schematic block diagram of an embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, a display 202, a touch controller 204, one or more touch sensors 206, one or more Input/Output (I/O) interfaces 208, one or more input and/or output components 210, an internal RFID communication module 212 (which is coupled to antenna 214), and an internal 60 GHz communication module 216 (which is coupled to antenna 218). The core control module 180, the processing module 184, the video graphics processing module 200, the display 202, the touch controller 204, the touch sensor(s) 206, the I/O interface(s) 208, and the I/O component(s) 210 function as described in one or more of the parent patent applications.

The memory 186 includes one or more of: main memory, a read only memory (ROM) for a boot up sequence, cache memory 47, tier three memory, and/or cloud memory. The main memory includes one or more Random Access Memory (RAM) integrated circuits, or chips. For example, a main memory includes four DDR4 ($4^{th}$ generation of double data rate) RAM chips, each running at a rate of 2,400 MHz. The tier three memory includes one or more hard drives, one or more solid state memory chips, and/or one or more other large capacity storage devices that, in comparison to cache memory and main memory devices, is/are relatively inexpensive with respect to cost per amount of data stored.

The e-field transmitter 90, which is coupled to an electrode 32, allows the communication device 12 to transmit e-field signals to the biometric sensors 14, a foot force sensing unit 18, a personal coordinate unit 20, and/or a body position/motion marker 22. For example, the communication device 12 transmits a system ID signal as an e-field signal. As another example, the communication device 12 transmits a set up signal, as an e-field signal, to one or more sensors 14, to one or more foot force sensors 18, to the personal coordinate system 20, and/or to one or more markers 22. As a further example, the communication device 12 transmits data and/or information regarding the system, its operation, formatting of data, etc., as an e-field signal to one or more components (e.g., 14, 18, 20, and/or 22) of the system 10.

The e-field signal receiver 70, which is coupled to an electrode 32, allows the communication device 12 to receive data from a biometric sensor 14, a foot force sensing unit 18, a personal coordinate unit 20, and/or a body position/motion marker 22. For example, a biometric sensor 14 sends sensed data (e.g., an analog signal represented a sample of a heartbeat, of a breath, of temperature, etc.) as an e-field signal to the communication device 12. As another example, a foot force sensing unit 18 sends foot force data (e.g., an analog signal representing a capacitance and/or a pressure value corresponding to the capacitance) as an e-field signal to the communication device 12. As yet another example, the personal coordinate unit 20 sends body position data (e.g., an analog signal regarding a position of a marker within a personal coordinate system, or the distances to it) as an e-field signal to the communication device 12.

The external wireless communication module 182 is of a known design to provide Bluetooth communication, ZigBee communication, WLAN communication, cellular data communication, and/or other standardized wireless communication. Accordingly, the external wireless communication module 182 enables the communication device 12 to communicate with the computing device 24. In an example, the communication device 12 sends the data it receives from the biometric sensors 14, the foot force sensing units 18, and/or the personal coordinate unit 20 to the computing device for processing. In another example, the communication device 12 receives set up information from the computing device 24.

The 60 GHz communication module 216 is a transceiver that allows the communication device 12 to communicate in the 28 GHz band and/or the 60 GHz band with components of the system 10 (e.g., the biometric sensors 14, the foot force units 18, the personal coordinate unit 20, and/or the markers 22). For example, the communication device 12 facilitates body position and/or body motion data gathering from the markers 22.

The internal RFID communication module 212 is implemented as an RFID reader. This enables the communication device 12 to communicate with the biometric sensors 14, the foot force units 18, the personal coordinate unit 20, and/or the markers 22, provided they include an RFID transceiver.

The power management unit 188 includes one or more DC-to-DC converters, a battery monitoring circuit, a voltage surge protection circuit, an over current protection circuit, and/or a power coupling circuit. The power management unit 188 generates one or more supply voltages 190 from a battery voltage and/or from an input voltage (e.g., a USB input supply voltage). The power management unit 188 individually provides one or more of the supply voltages 190 to various components of the communication device as needed to converse power.

Figure 33:
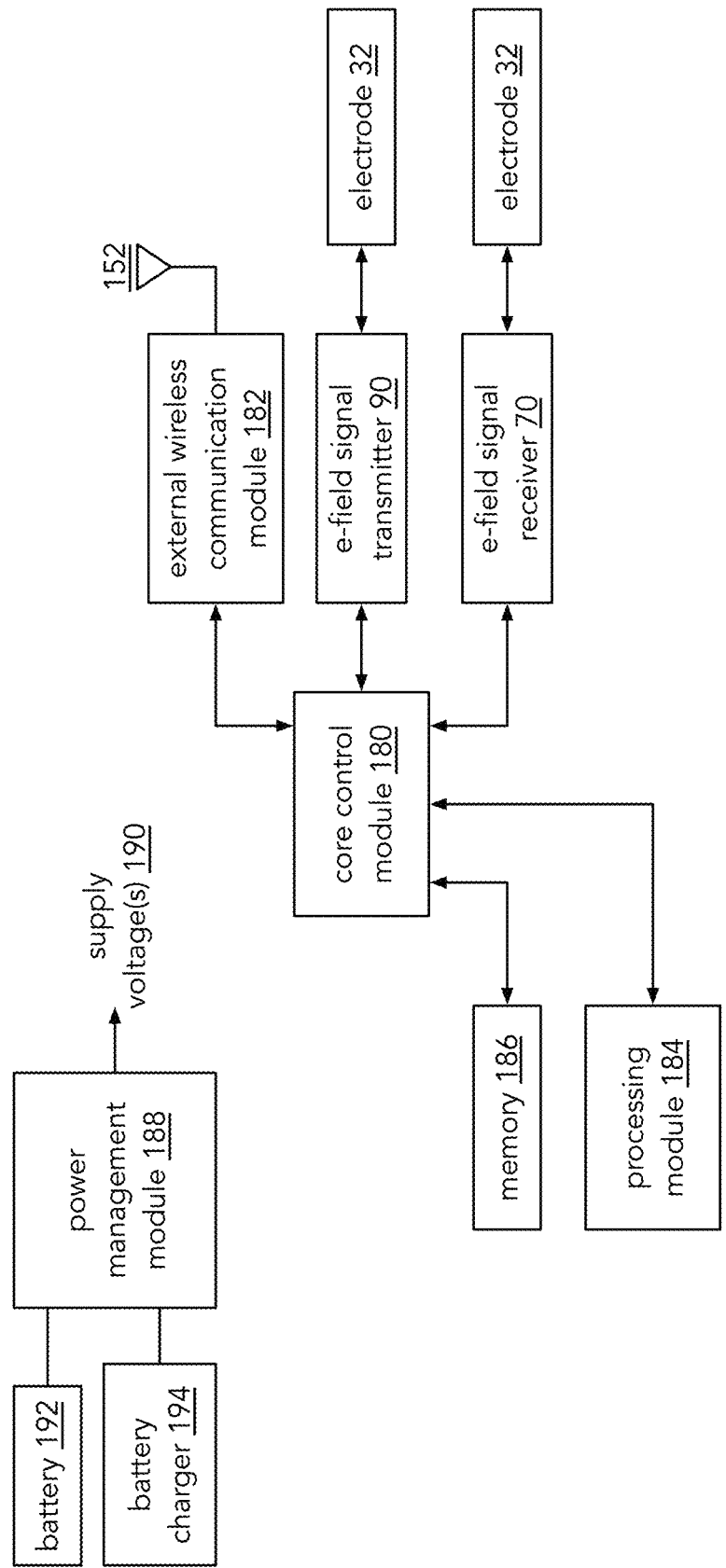
FIG. 33 is a schematic block diagram of another embodiment of a communication device.

FIG. 33 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, and a power management module 188. These components function as described with reference to FIG. 32.

Figure 34:
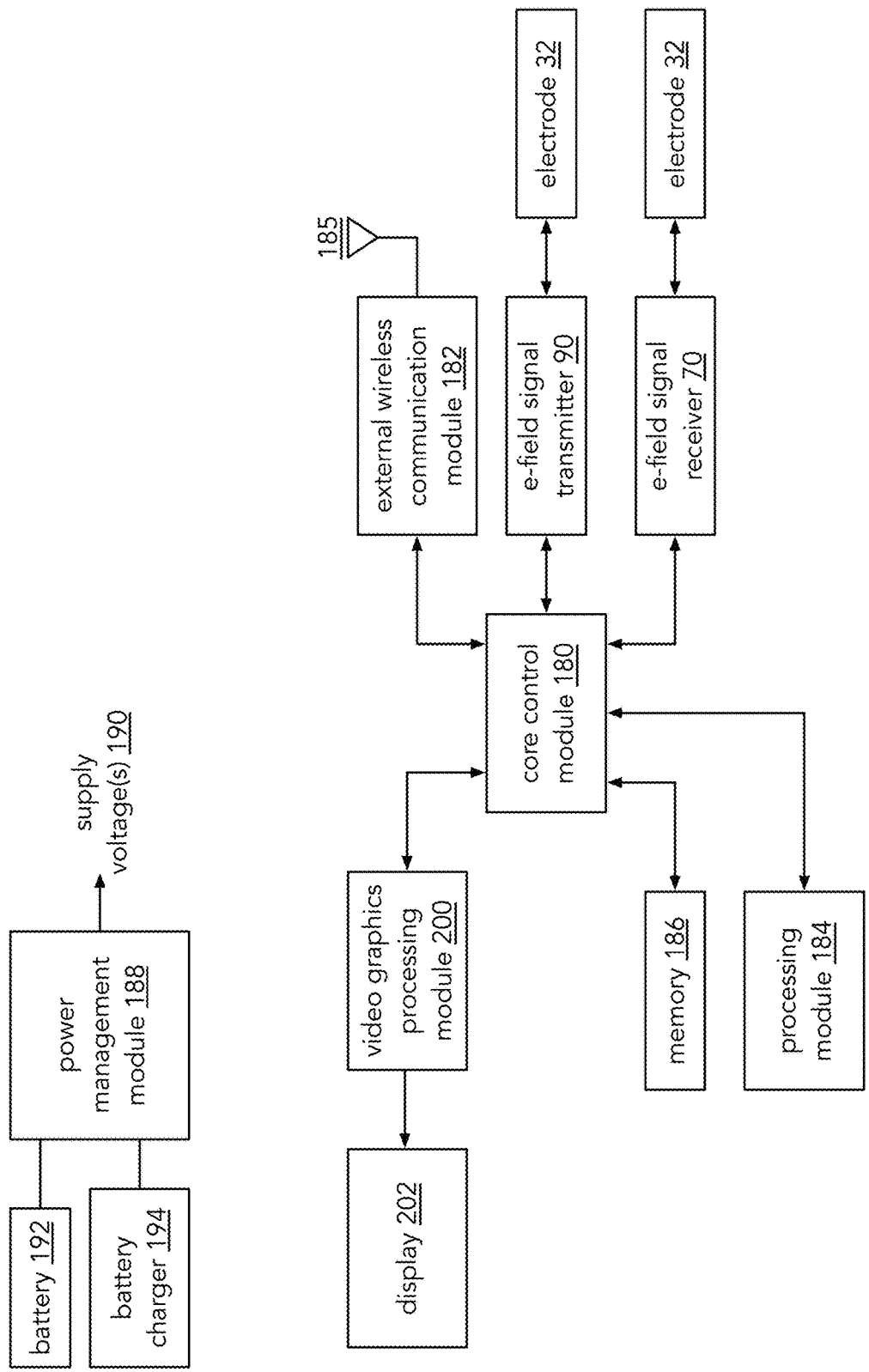
FIG. 34 is a schematic block diagram of another embodiment of a communication device.

FIG. 34 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, and a display 202. These components function as described with reference to FIG. 32.

Figure 35:
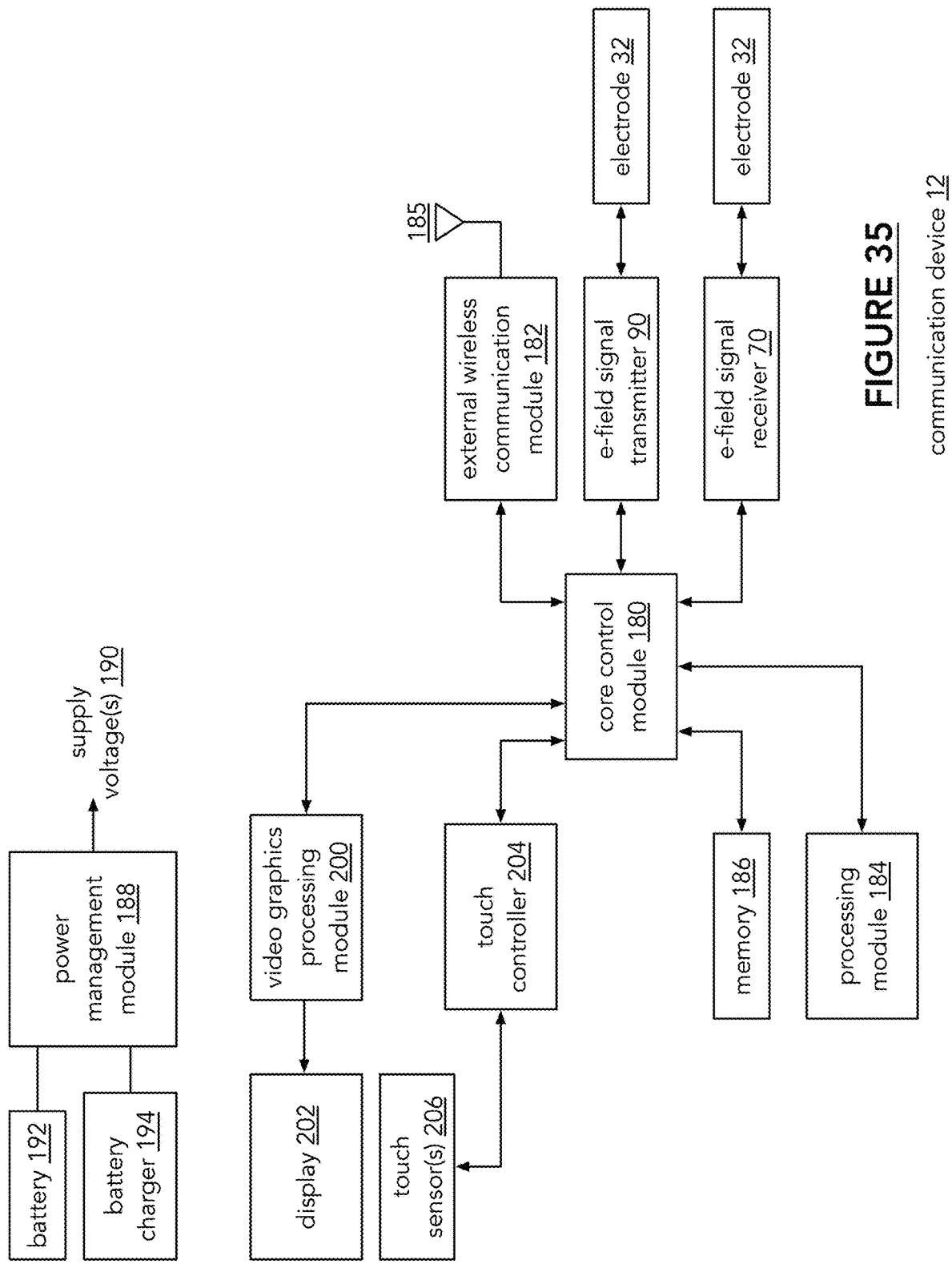
FIG. 35 is a schematic block diagram of another embodiment of a communication device.

FIG. 35 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, a display 202, a touch controller 204, and one or more touch sensors 206. These components function as described with reference to FIG. 32.

Figure 36:
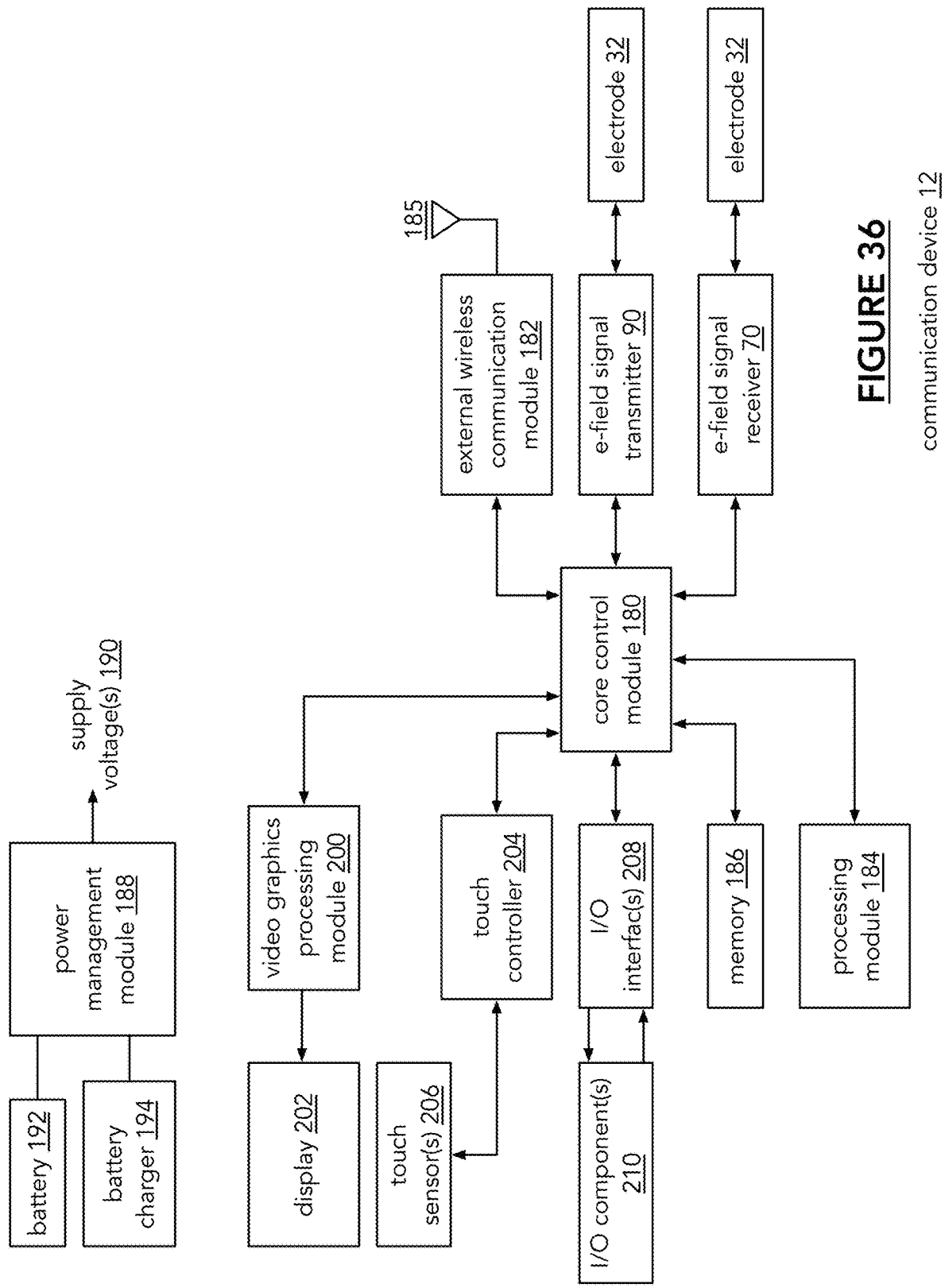
FIG. 36 is a schematic block diagram of another embodiment of a communication device.

FIG. 36 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, a display 202, a touch controller 204, one or more touch sensors 206, one or more Input/Output (I/O) interfaces 208, and one or more input and/or output components 210. These components function as described with reference to FIG. 32.

Figure 37:
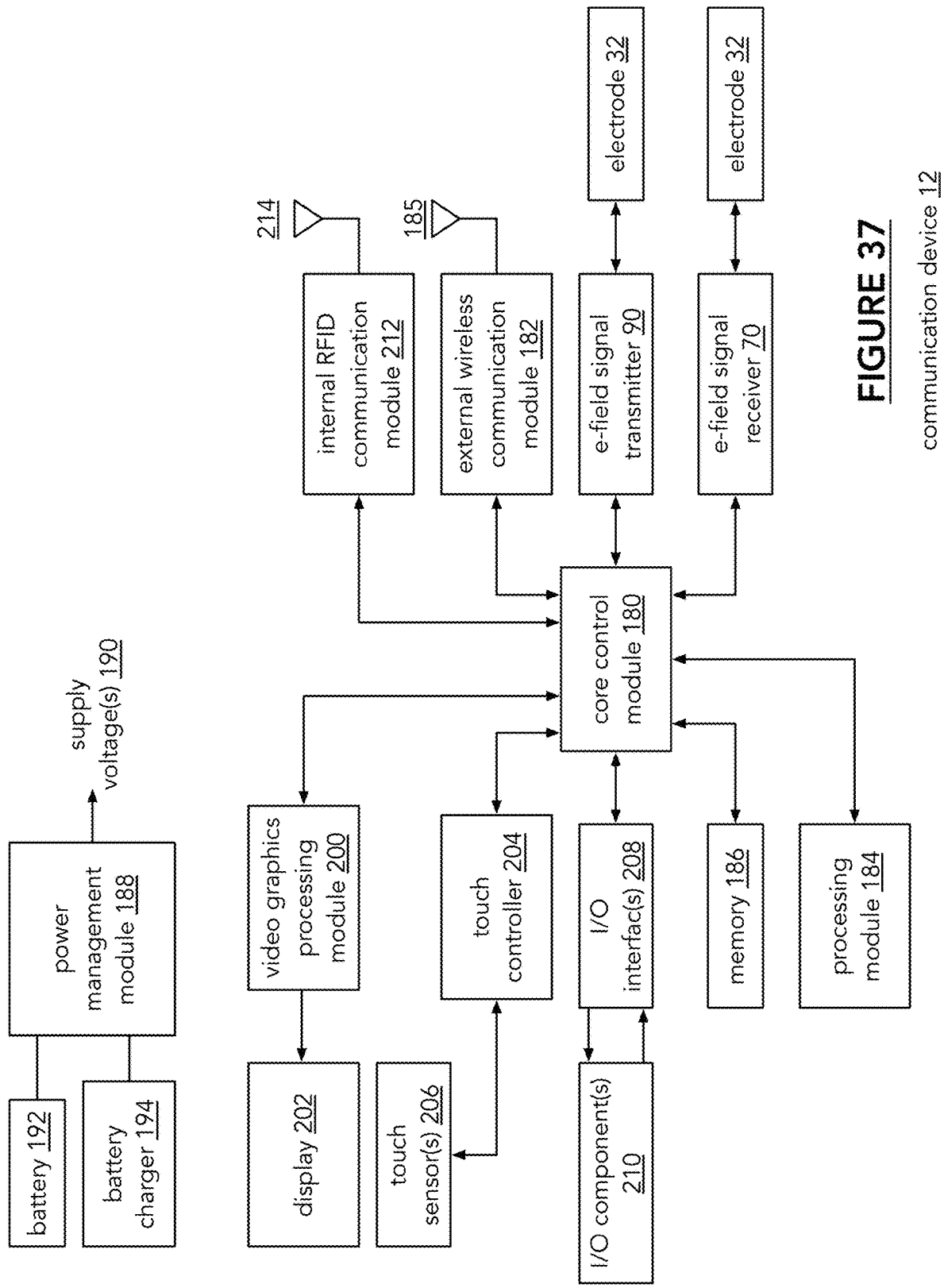
FIG. 37 is a schematic block diagram of another embodiment of a communication device.

FIG. 37 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, a display 202, a touch controller 204, one or more touch sensors 206, one or more Input/Output (I/O) interfaces 208, one or more input and/or output components 210, and an internal RFID communication module 212 (which is coupled to antenna 214). These components function as described with reference to FIG. 32.

Figure 38:
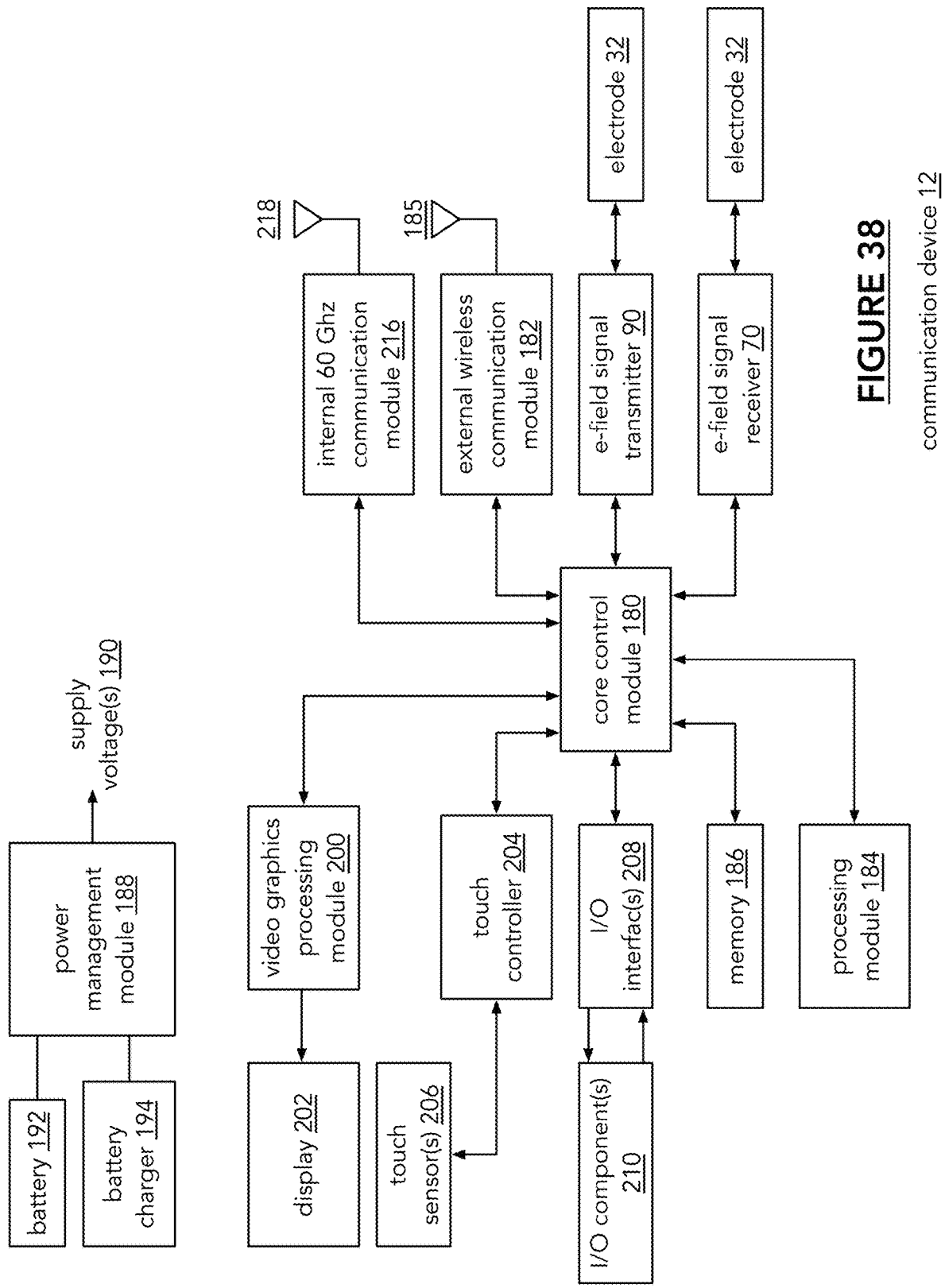
FIG. 38 is a schematic block diagram of another embodiment of a communication device.

FIG. 38 is a schematic block diagram of another embodiment of a communication device 12 that includes a core control module 180, an external wireless communication module 182 (which is coupled to an antenna 152), a processing module 184, memory 186, an e-field signal transmitter 90, an e-field signal receiver 70, electrodes 32, a battery 192, a battery charger 194, a power management module 188, a video graphics processing module 200, a display 202, a touch controller 204, one or more touch sensors 206, one or more Input/Output (I/O) interfaces 208, one or more input and/or output components 210, and an internal 60 GHz communication module 216 (which is coupled to antenna 218). These components function as described with reference to FIG. 32.

Figure 39:
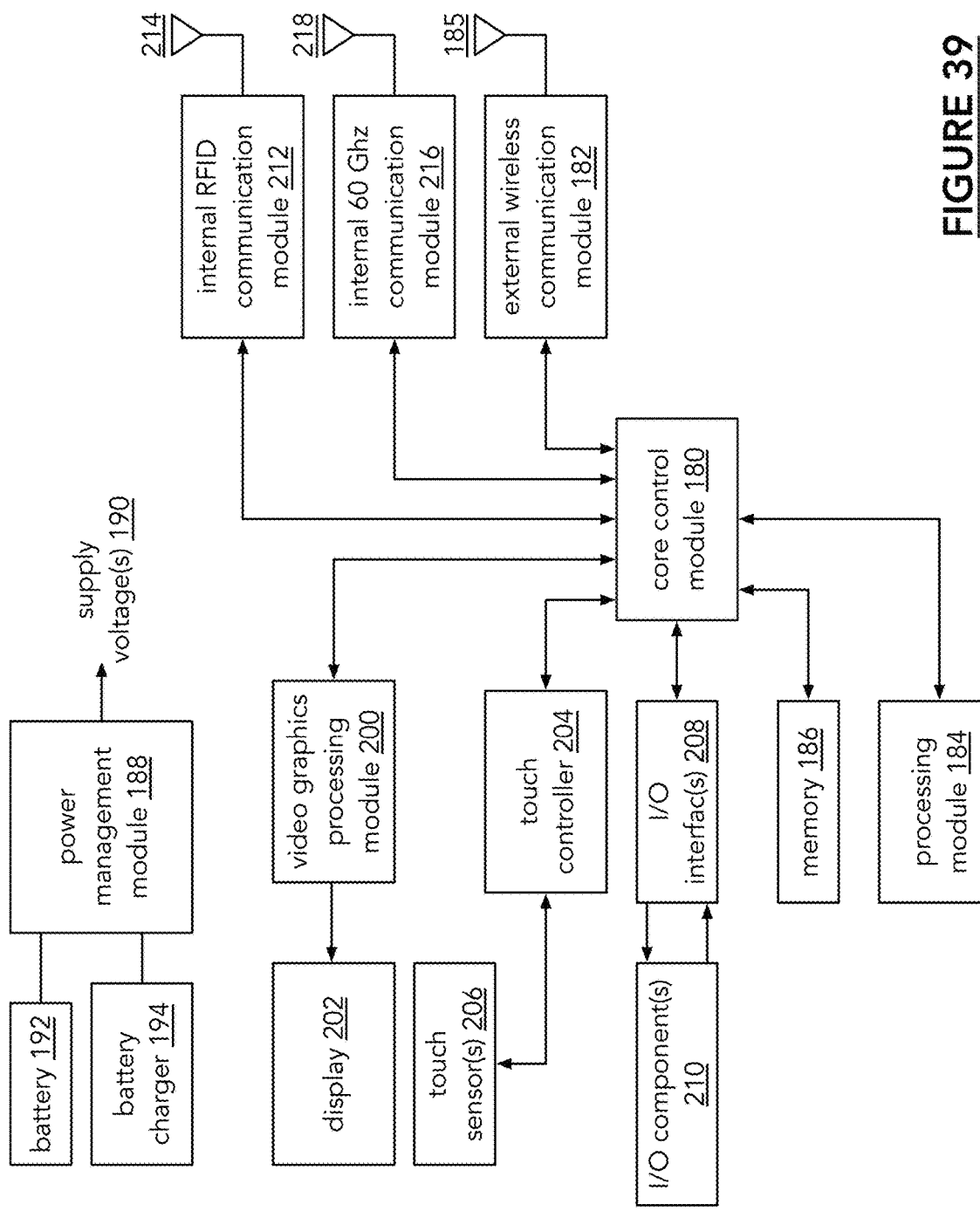
FIG. 39 is a schematic block diagram of another embodiment of a communication device.

FIG. 39 is a schematic block diagram of another embodiment of a communication device 12 that includes a core control module 180, an external wireless communication module 182 (which is coupled to an antenna 152), a processing module 184, memory 186, a battery 192, a battery charger 194, a power management module 188, a video graphics processing module 200, a display 202, a touch controller 204, one or more touch sensors 206, one or more Input/Output (I/O) interfaces 208, one or more input and/or output components 210, an internal RFID communication module 212 (which is coupled to antenna 214), and an internal 60 GHz communication module 216 (which is coupled to antenna 218). These components function as described with reference to FIG. 32.

Figure 40:
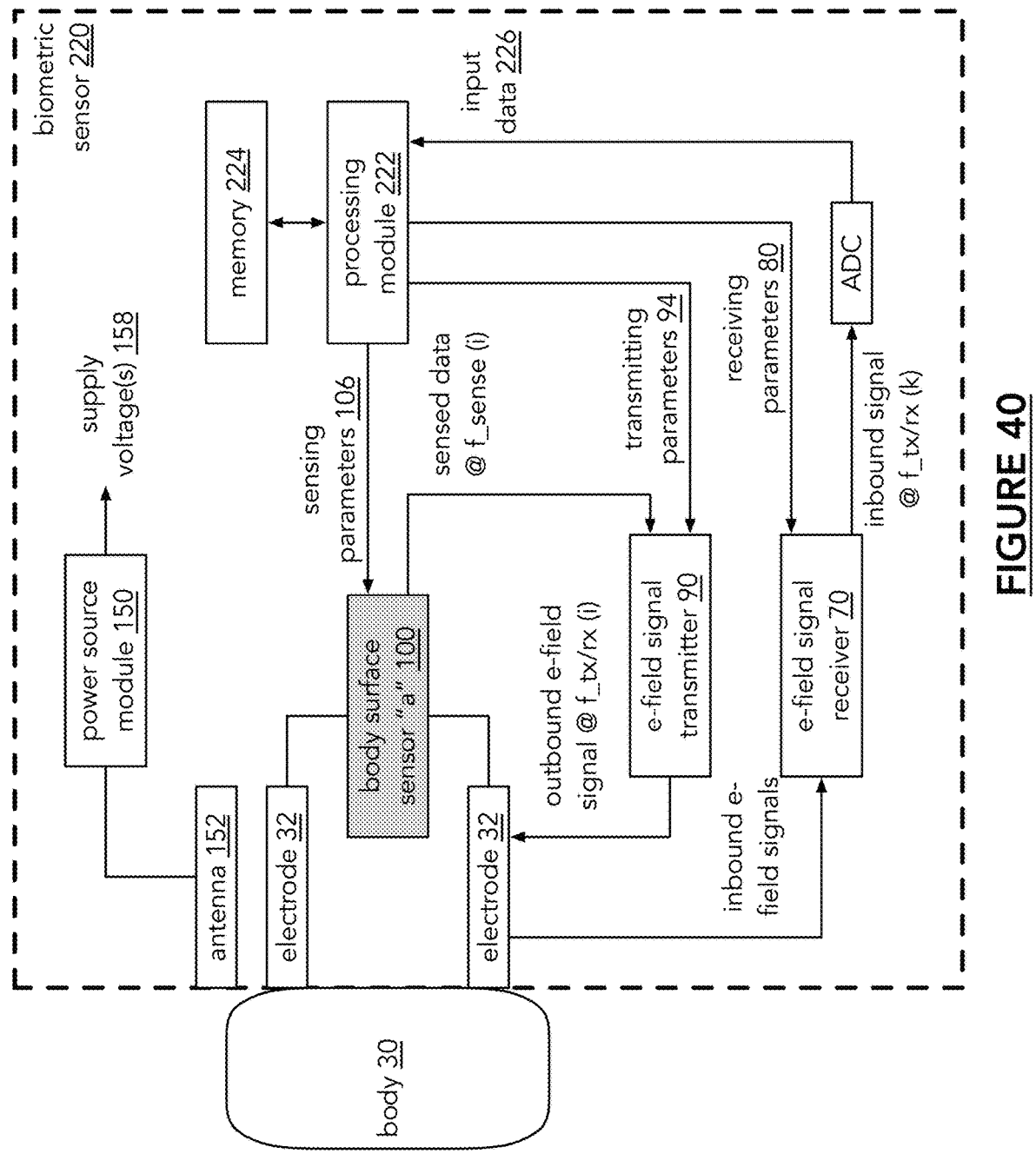
FIG. 40 is a schematic block diagram of an embodiment of a biometric sensor.

FIG. 40 is a schematic block diagram of an embodiment of a biometric sensor 220 that includes a power source module 120, an antenna 152, one or more electrodes 32, a body surface sensor 100-a, a processing module 222, memory 224, an e-field signal transmitter 90, an e-field signal receiver 70, and an analog to digital converter (ADC). The biometric sensor 220 may be implemented in a variety of ways. For example, the body surface sensor 100-a, the processing module 222, the memory 224, the e-field signal transmitter 90, the e-field signal receiver 70, and the ADC are implemented on an integrated circuit (IC). The IC, the electrodes 32, and the antenna 152 are mounted on one or more flexible PCBs (e.g., cloth, plastic, etc. printed circuit board) that includes an adhesive for adhering to the body 30.

In an embodiment, the antenna 152 and an electrode 32 are combined to into an antenna/electrode unit, which will be discussed in greater detail with reference to one or more of FIGS. 51-58E. In the embodiment and/or another embodiment, the biometric sensor includes more or less than two electrodes. For example, the biometric sensor 220 includes four electrodes; two for the body surface sensor 100, one for the e-field signal transmitter 90, and one for the e-field signal receiver 70. As another example, the biometric sensor 220 includes three electrodes; two for the body surface sensor 100 and one for the e-field signal transmitter 90 and the e-field signal receiver 70.

In an example of operation, the power harvesting module 150 functions to produce one or more supply voltages 158 as previously discussed. When the supply voltage(s) 158 is/are available, the other circuitry of the biometric sensor 220 is active.

With available power, the e-field signal receiver 70 receives inbound e-field signals from the body via an electrode. The inbound e-field signals are transmitted by the communication device 12 and are regarding system set up, a request for data, a change in the system set up, a request for a diagnostic analysis, and/or a request for diagnostic information. For example, during set up, the inbound data includes the system ID frequency (f_sys ID). The inbound data further includes one or more sensing frequencies (or one or more offset frequencies to determine the one or more sensing frequencies) for use by the body surface sensor. The inbound data still further includes one or more e-field transmit frequencies (or one or more transmit offset frequencies to determine the one or more e-field transmit frequencies) for use by the e-field signal transmitter 90.

The e-field signal receiver 70, which is configured in accordance with receiving parameters 80, converts the inbound e-field signals into one or more inbound signals at a tx/rx frequency as previously discussed. The ADC converts the one or more inbound signals into digital input data 226 and provides it to the processing module 222. The processing module 222 processes the input data 226 to produce the sensing parameters 106, the transmitting parameters 94, and the receiving parameters 80. Note that, the processing module 222 generates default receiving parameters 80 to receive initial set up information.

The body surface sensor 100 is configured in accordance with the sensing parameters 106 to sense a condition of the body 30. As previously discussed, the body surface sensor 100 generates sensed data at the one or more sense frequencies (f_sense (i)). The e-field signal transmitter 90 receives the sensed data as outbound data, converts it into an outbound e-field signal at one or more transmit frequencies (f_tx/rx (i)), and transmits the outbound e-field signal to the communication device 12 via an electrode 32 and the body 30.

Figure 41:
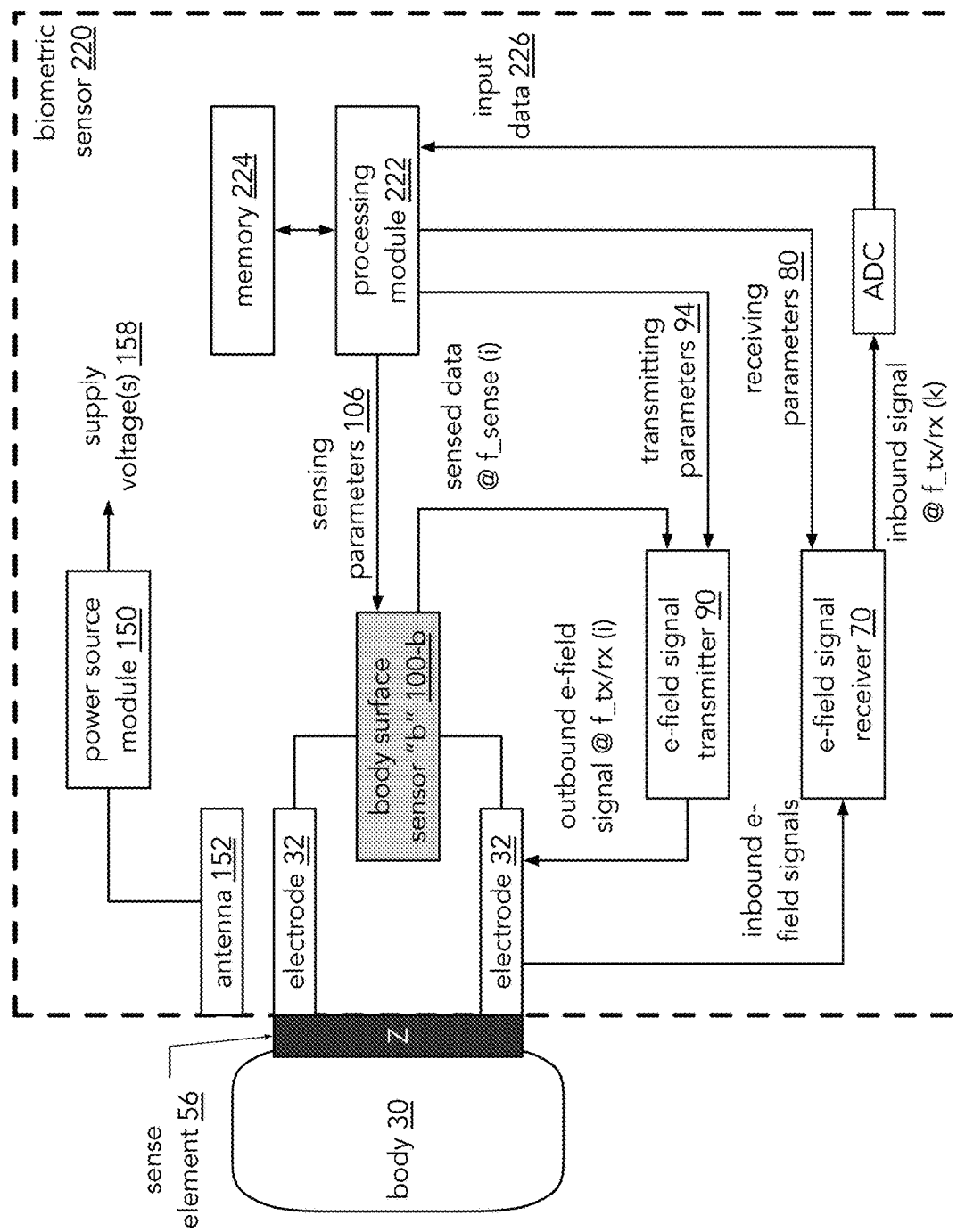
FIG. 41 is a schematic block diagram of another embodiment of a biometric sensor.

FIG. 41 is a schematic block diagram of another embodiment of a biometric sensor; 220 that is similar to the biometric sensor 220 of FIG. 40 with the differences of this embodiment includes body surface sensor "b" 100-b, which is coupled to a sensing element 56 via the electrodes 32. The body surface sensor "b" 100-b functions as previously discussed to produce sensed data based on the response of the sense element 56 to a condition of the body (e.g., temperature). The sensed data of the sensor element 56 is conveyed to the communication device 12 via the e-field transmitter 90, an electrode 32, and the body 30.

Figure 42:
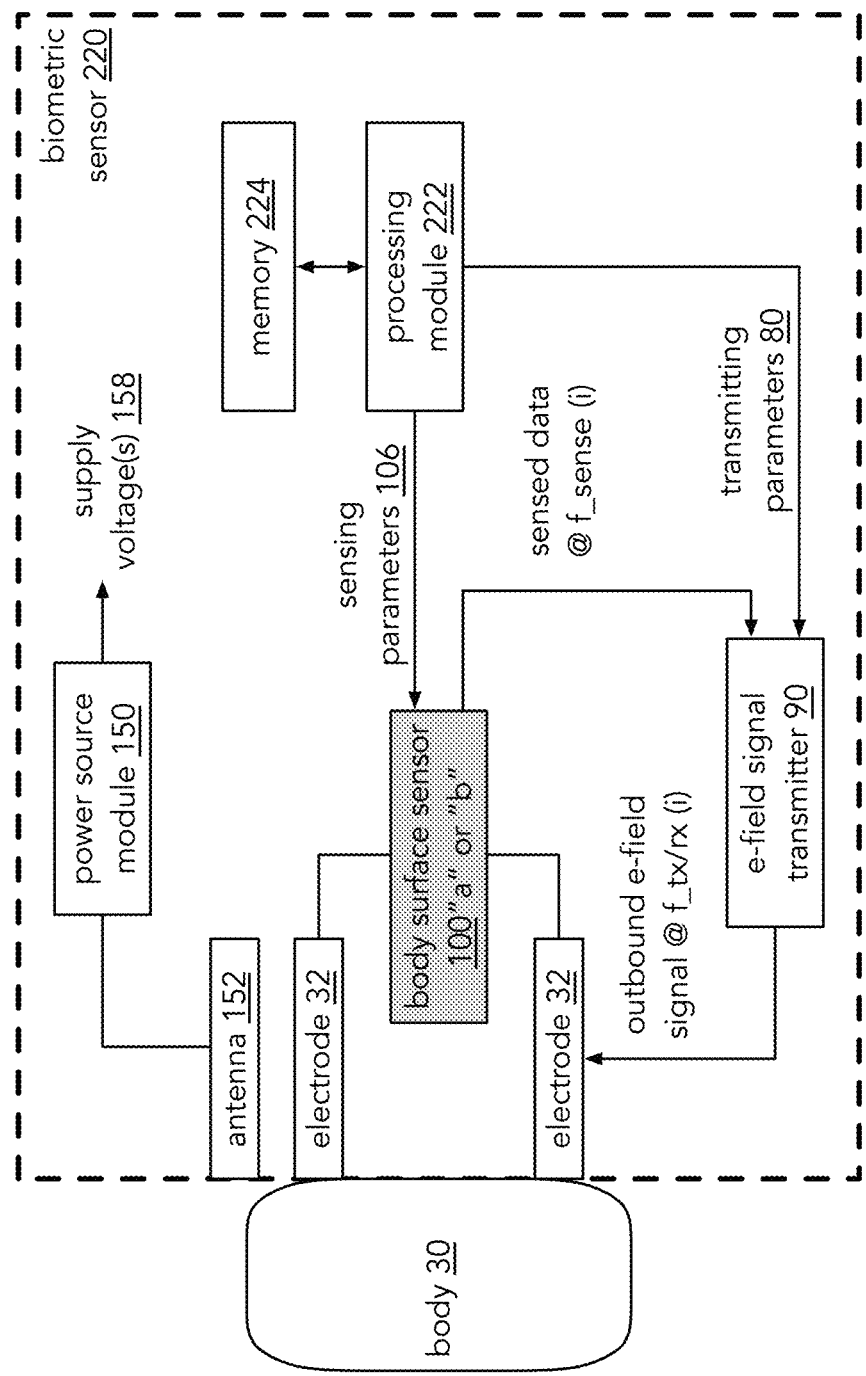
FIG. 42 is a schematic block diagram of another embodiment of a biometric sensor.

FIG. 42 is a schematic block diagram of another embodiment of a biometric sensor 220 that is similar to the biometric sensor of FIGS. 40 and/or 41. In this embodiment, the biometric sensor 220 does not include an e-filed receiver 70. Further, the input data is programmed into the processing module 222 and/or stored in memory 224 at some point prior to incorporation of the sensor 220 into a personal monitoring system. In an alliterative embodiment, sensors of the personal monitoring system use the same sense frequency and the same e-field transmit frequency, where the sensors are enabled in a time division multiplexed access (TDMA) manner.

Figure 43:
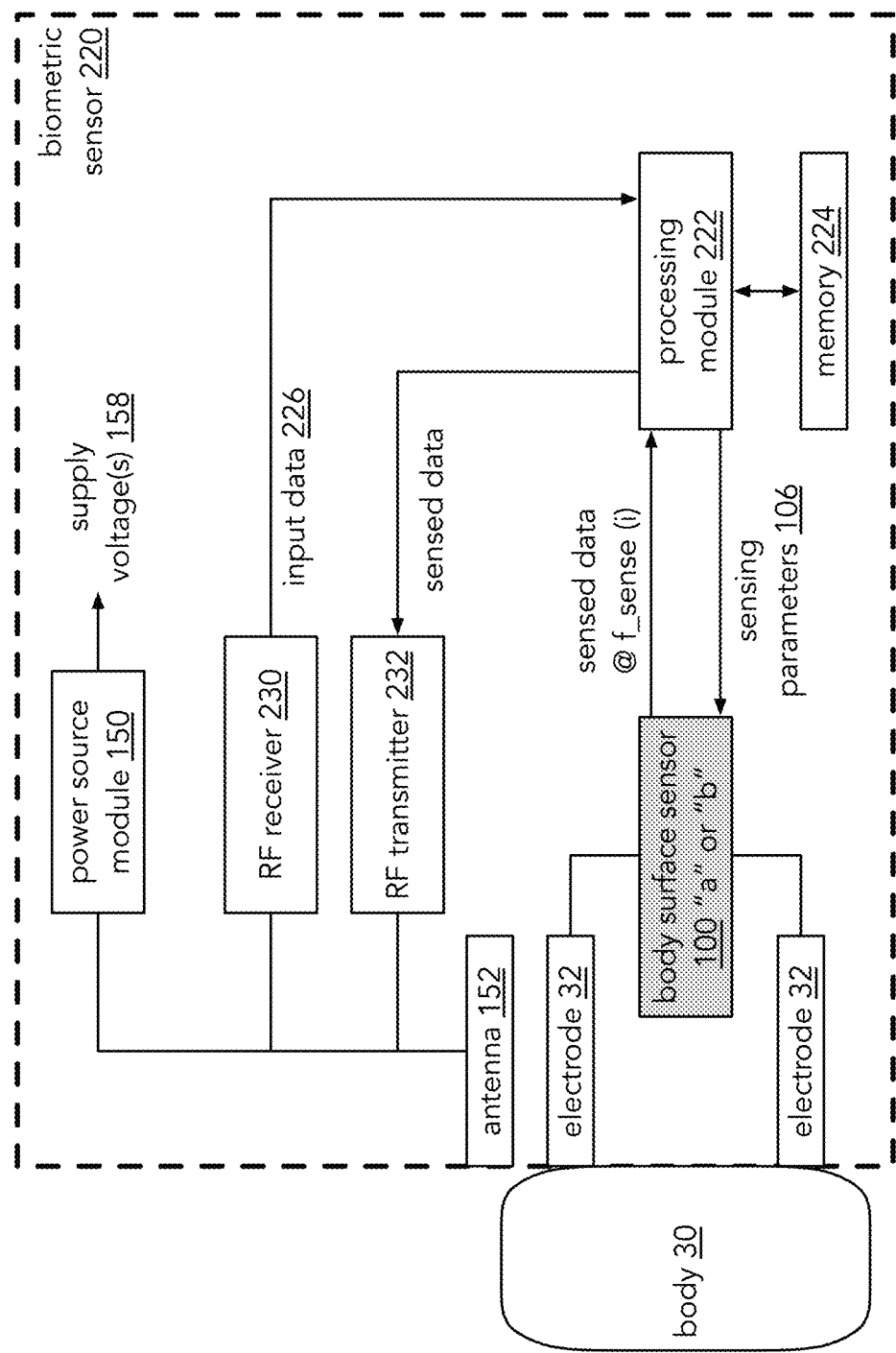
FIG. 43 is a schematic block diagram of another embodiment of a biometric sensor.

FIG. 43 is a schematic block diagram of another embodiment of a biometric sensor 220 that includes a body surface sensor "a" and/or "b" 100, electrodes 32, the power source module 150, the antenna 152, the processing module 222, the memory 224, an RF receiver 230, and an RF transmitter 232. In an embodiment, the RF receiver 230 and the RF transmitter 232 are configured to communicate with the communication device 12 in accordance with an RFID communication protocol. As such, the biometric sensor 220 is the equivalent of an RFID tag and the communication device is the equivalent of an RFID reader within the personal monitoring system. In an alternate embodiment, the RF receiver 230 and the RF transmitter 232 are configured to communicate with the communication device 12 in accordance with a 60 GHz personal area network communication protocol.

In either embodiment, the RF receiver 230 functions to receive the input data 226 for the biometric sensor 220 and provides it to the processing module 222. The RF transmitter 232 functions to transmit the sensed data to the communication device 12.

Figure 44:
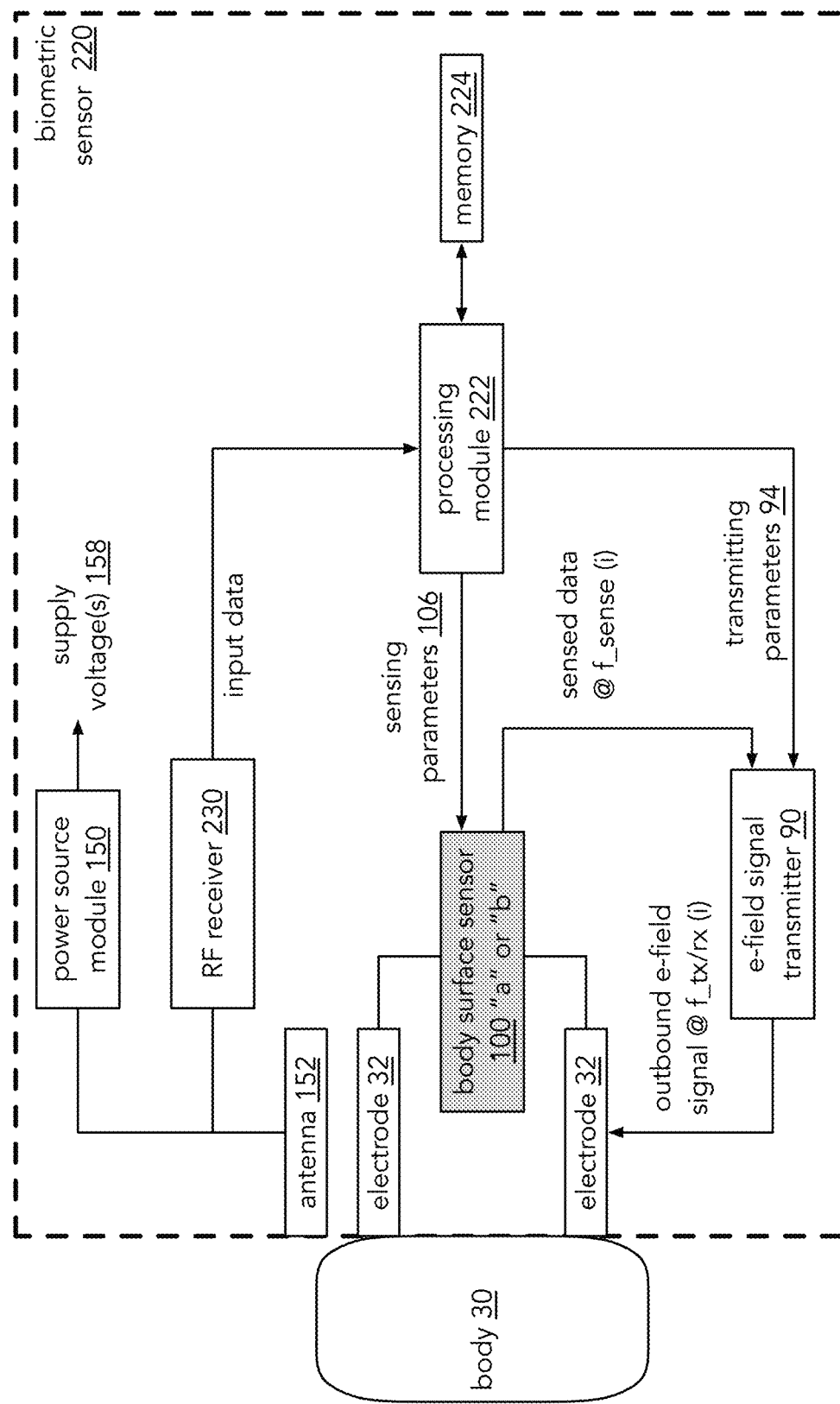
FIG. 44 is a schematic block diagram of another embodiment of a biometric sensor.

FIG. 44 is a schematic block diagram of another embodiment of a biometric sensor 220 that includes a body surface sensor "a" and/or "b" 100, electrodes 32, the power source module 150, the antenna 152, the processing module 222, the memory 224, an RF receiver 230, and an e-field signal transmitter 90. In this embodiment, the RF receiver 230 functions to receive the input data 226 for the biometric sensor 220 and provides it to the processing module 222. The e-field signal transmitter 90 functions to transmit the sensed data to the communication device 12.

Figure 45:
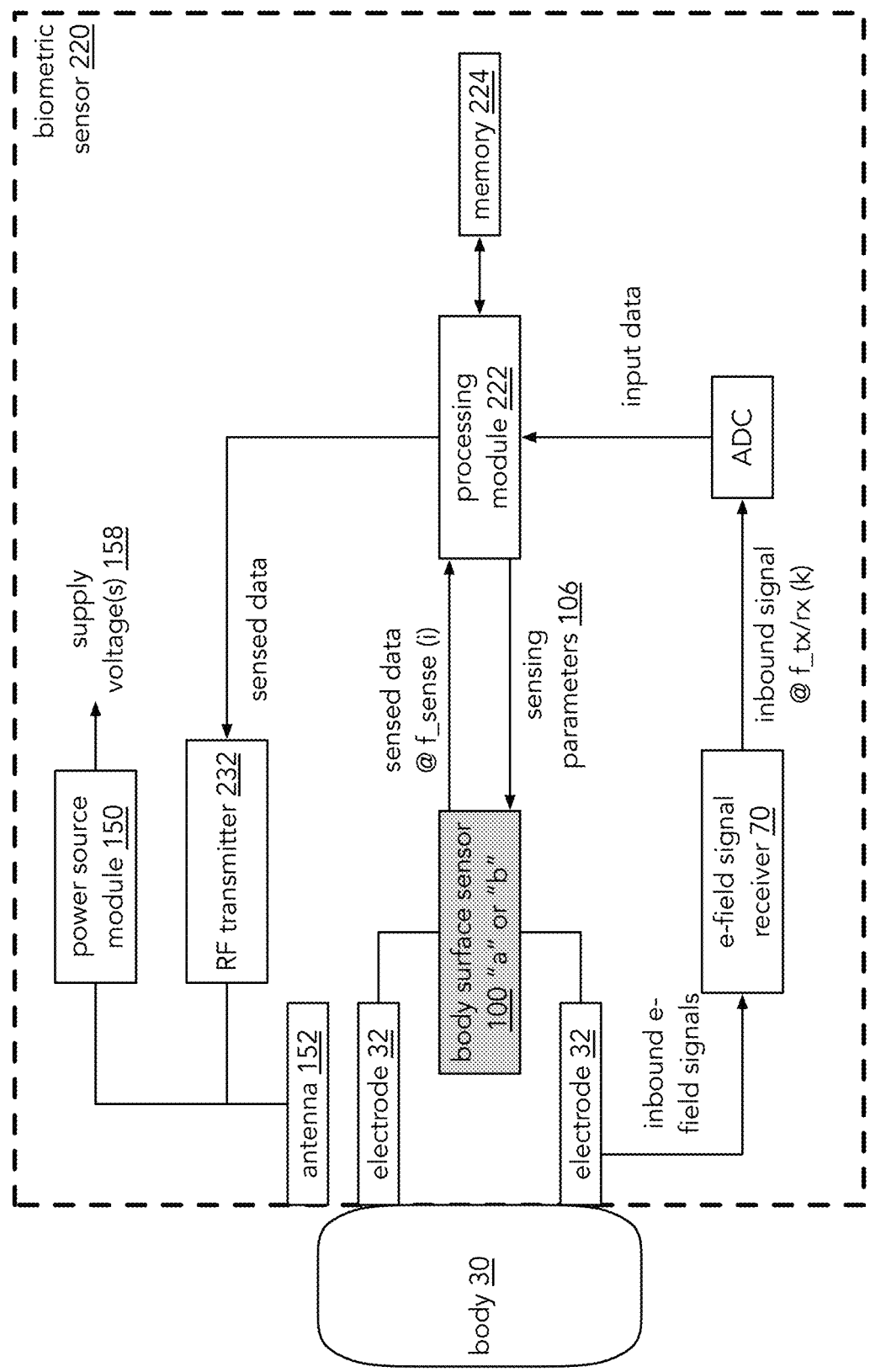
FIG. 45 is a schematic block diagram of another embodiment of a biometric sensor.

FIG. 45 is a schematic block diagram of another embodiment of a biometric sensor 220 that includes a body surface sensor "a" and/or "b" 100, electrodes 32, the power source module 150, the antenna 152, the processing module 222, the memory 224, an e-field signal receiver 70, and an RF transmitter 232. In this embodiment, the e-field signal receiver 70 functions to receive the input data 226 for the biometric sensor 220 and provides it to the processing module 222. The RF transmitter 232 functions to transmit the sensed data to the communication device 12.

Figure 46:
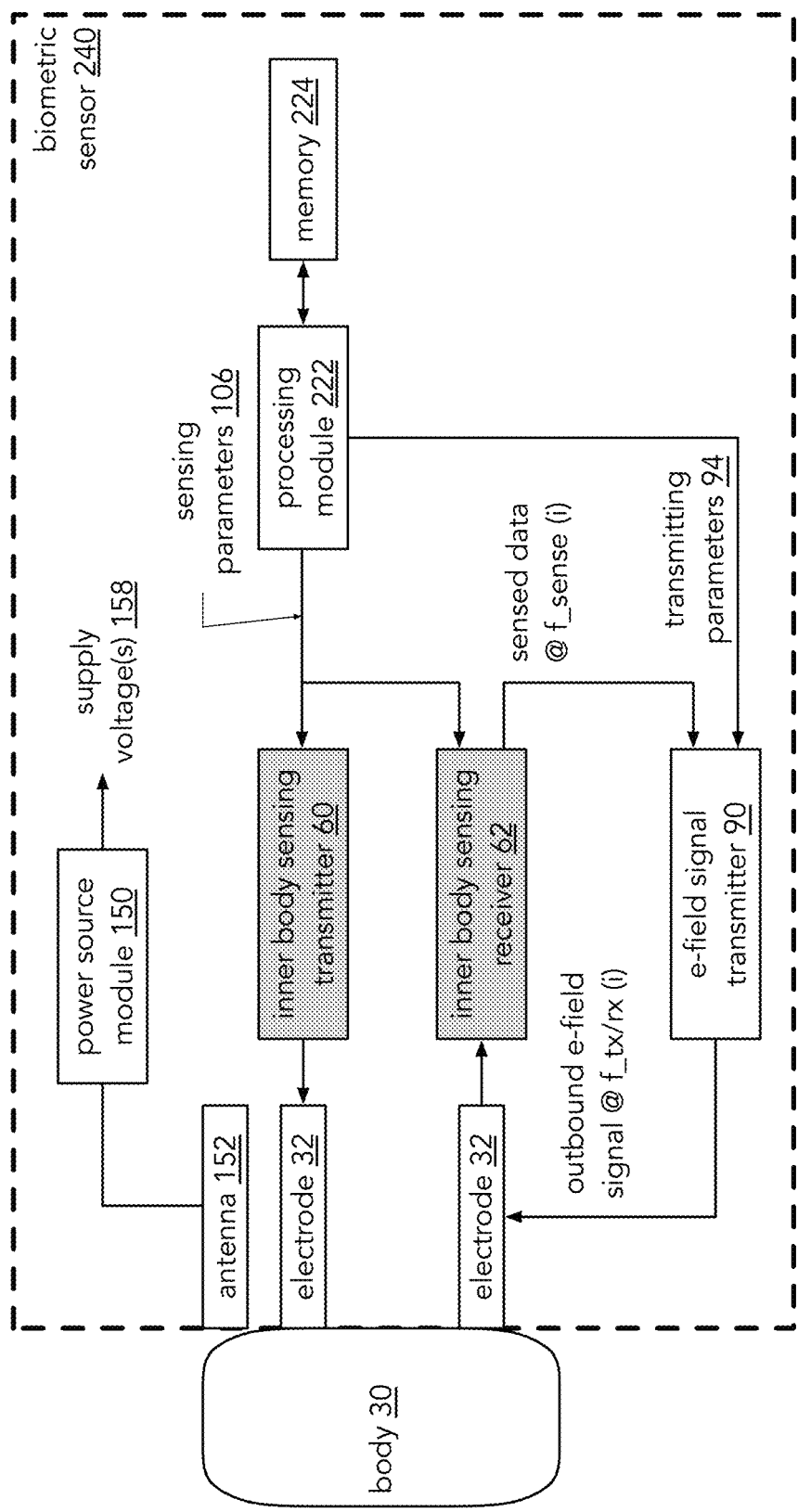
FIG. 46 is a schematic block diagram of another embodiment of a biometric sensor.

FIG. 46 is a schematic block diagram of another embodiment of a biometric sensor 240 that includes electrodes 32, an inner body sensing transmitter 60, an inner body sensing receiver 62, an e-field signal transmitter 90, a power source module 150, a processing module 222, and memory 224.

The processing module 222 and/or the memory 224 obtain the sensing parameters 106 and the transmitting parameters 94 via programming prior to the biometric sensor 240 becoming part of a personal monitoring system. For instance, biometric sensors are programmed to use the same sensing frequency and the same e-field transmitting frequency where the personal monitoring system enables the sensors of the system in a TDMA manner.

When the inner body sensing transmitter 60 transmits a sense signal at a sensing frequency (e.g., f_sense (i)) via an electrode 32, the sense signal is transmitted via the body to the inner body sensing receiver 62. The inner body sensing receiver 62 generates sensed data as previously discussed and provides it to the e-field signal transmitter 90. The e-field signal transmitter 90 converts the sensed data into an outbound e-field signal at a transmit frequency (e.g., f_tx/rx (i)) that it transmits to the communication device 12 via the body 30.

Figure 47:
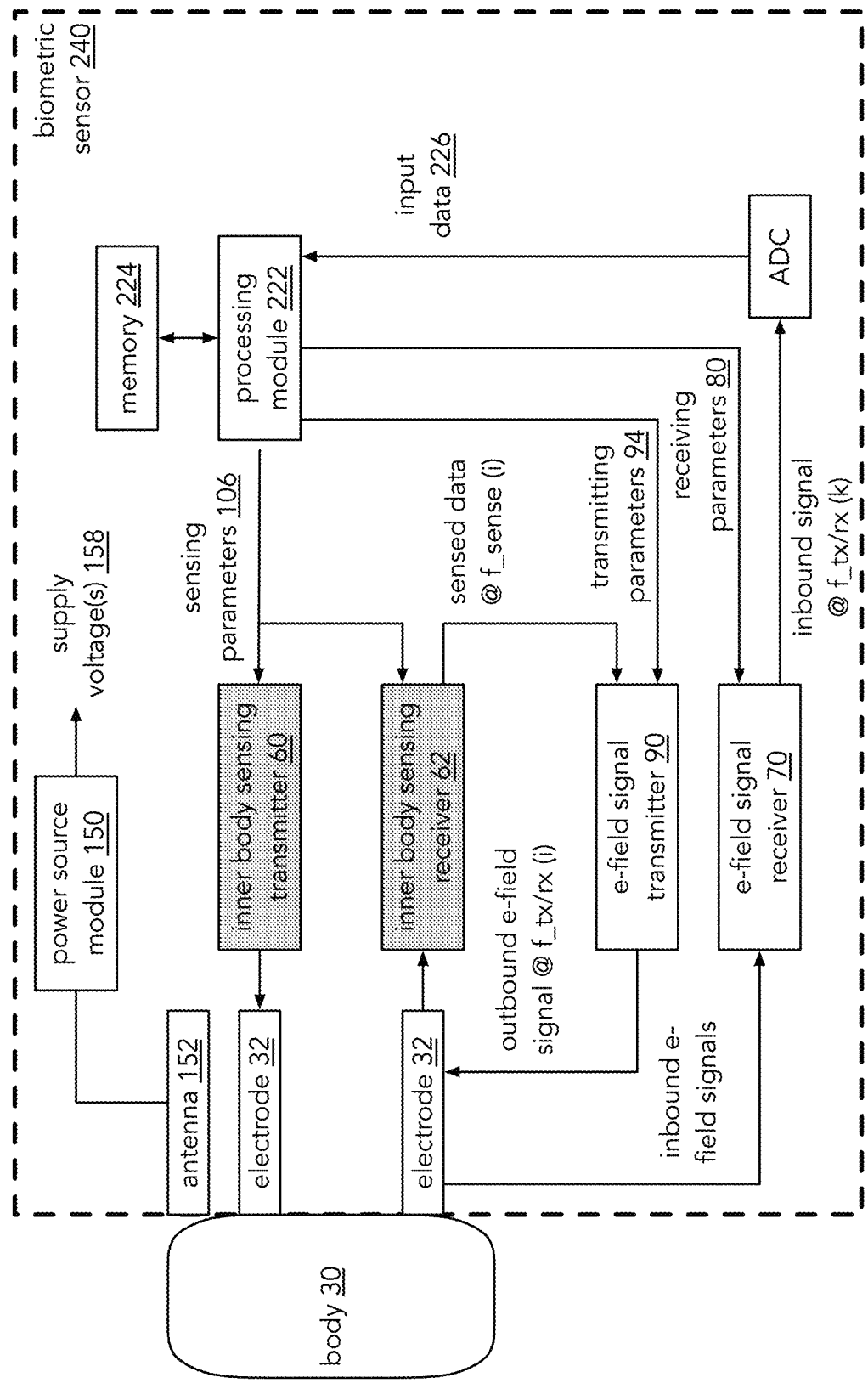
FIG. 47 is a schematic block diagram of another embodiment of a biometric sensor.

FIG. 47 is a schematic block diagram of another embodiment of a biometric sensor 240 that is similar to the biometric sensor of FIG. 46. In this embodiment, the biometric sensor includes an e-field signal receiver 70 and an ADC to receive inbound e-field signals from the communication device 12 and to produce, therefrom, input data 226. The processing module 222 generates the sensing parameters 106, the transmitting parameters 94, and/or the receiving parameters 80 from the input data 226 as previously discussed.

Figure 48:
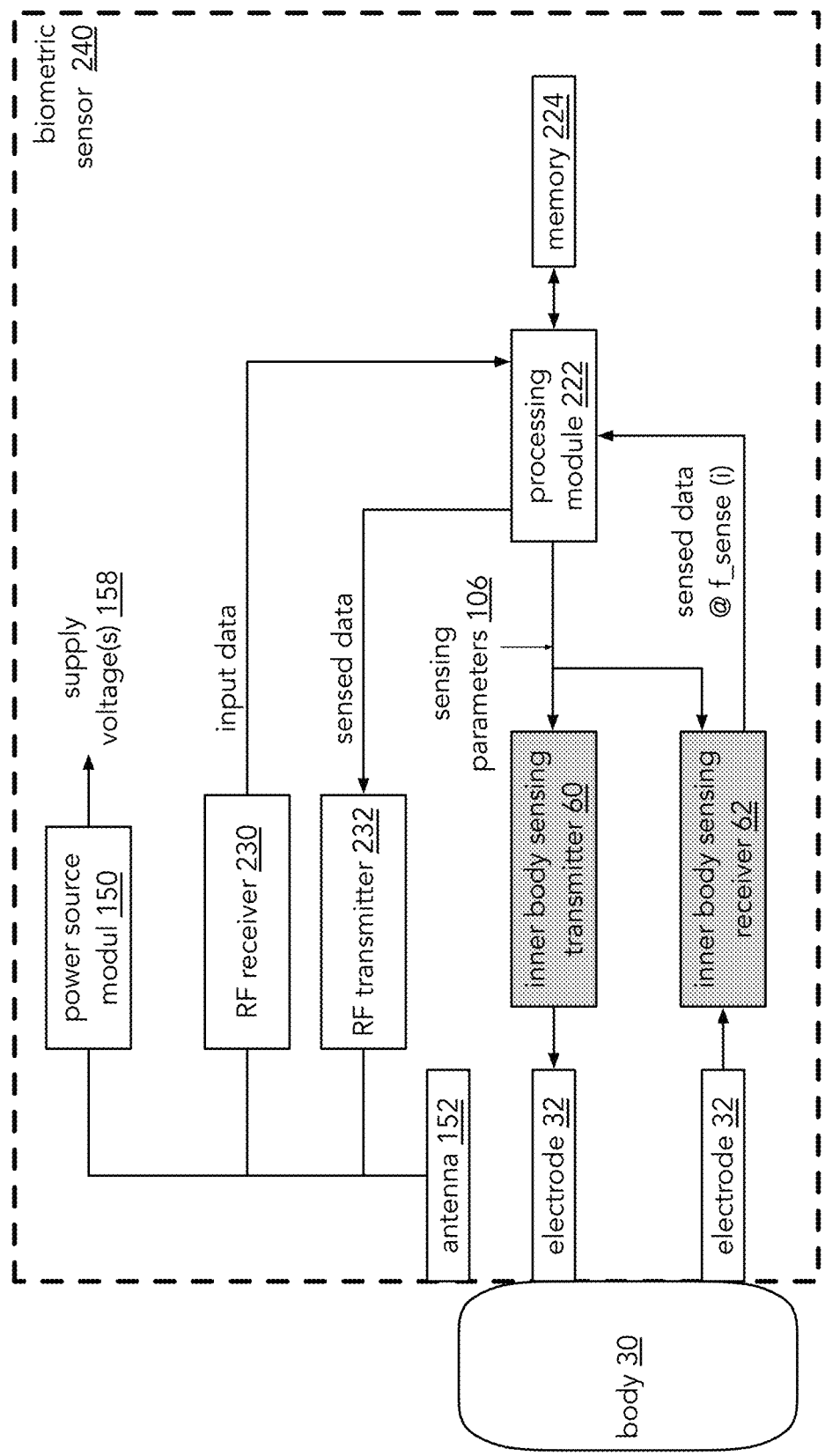
FIG. 48 is a schematic block diagram of another embodiment of a biometric sensor.

FIG. 48 is a schematic block diagram of another embodiment of a biometric sensor 240 is similar to the biometric sensor 220 of FIG. 43. In this embodiment, the biometric sensor 240 includes the inner body sensing transmitter 60 and the inner body sensing receiver 62 instead of the body surface sensor "a" and/or "b" 100.

Figure 49:
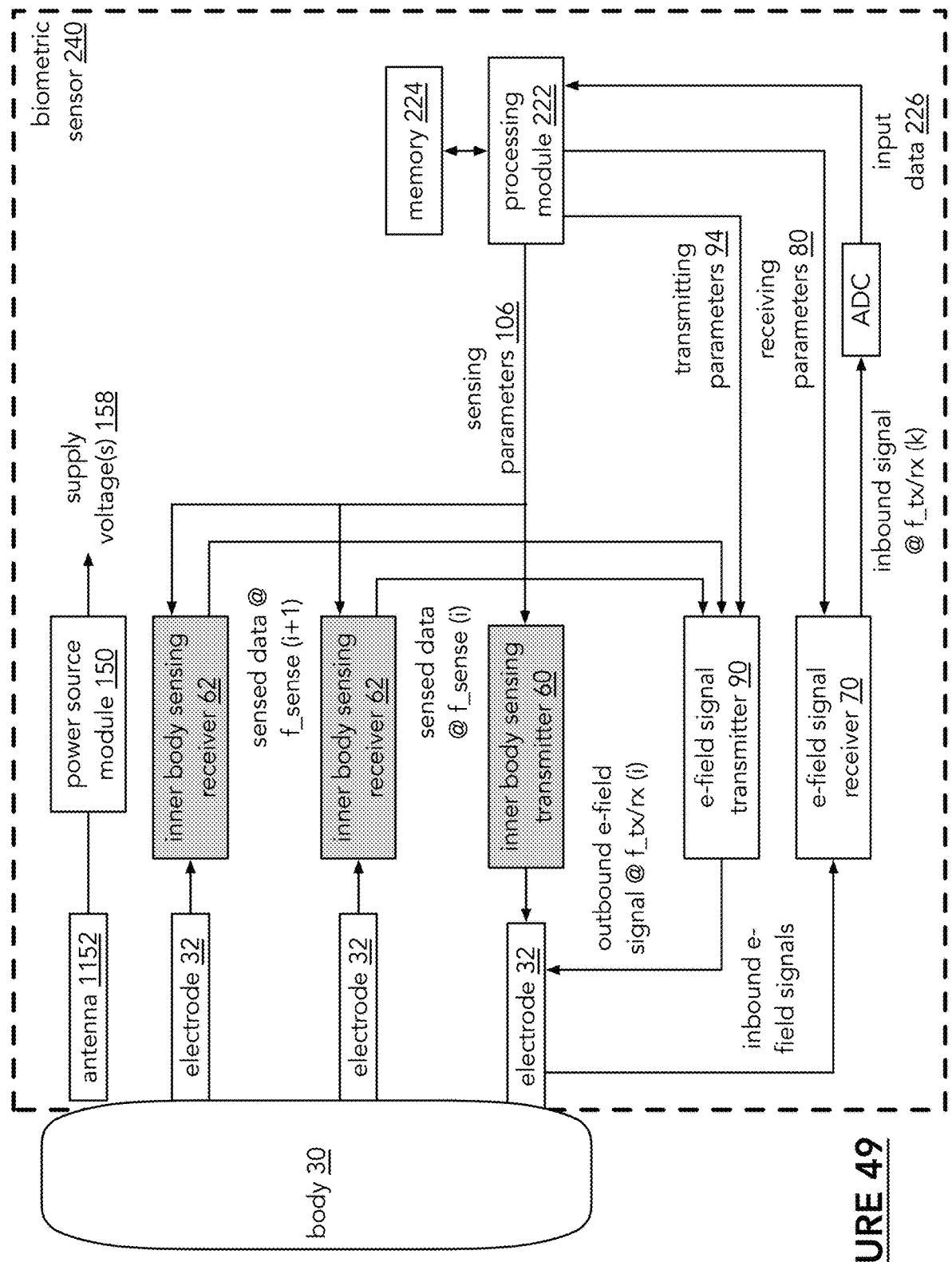
FIG. 49 is a schematic block diagram of another embodiment of a biometric sensor.

FIG. 49 is a schematic block diagram of another embodiment of a biometric sensor 240 is similar to the biometric sensor 240 of FIG. 47. In this embodiment, the biometric sensor 240 includes a second inner body sensing receiver 62, which is configured to receive a sense signal at a second sense frequency (e.g., f_sense (i+1)) and the first inner body sensing receiver 62 receives a sense signal at a first sense frequency (e.g., f_sense (i)).

A first body impedance between the electrodes of the inner body sensing transmitter and the first inner body sensing transmitter will be different than a second body impedance between the electrodes of the inner body sensing transmitter and the second inner body sensing transmitter. In addition, the body voltage and/or current effect on the first and second impedances is captured by the first and second inner body sensing receivers to aid in interpreting a condition of the body (e.g., heart rate, blood flow, respiration, etc.).

Figure 50:
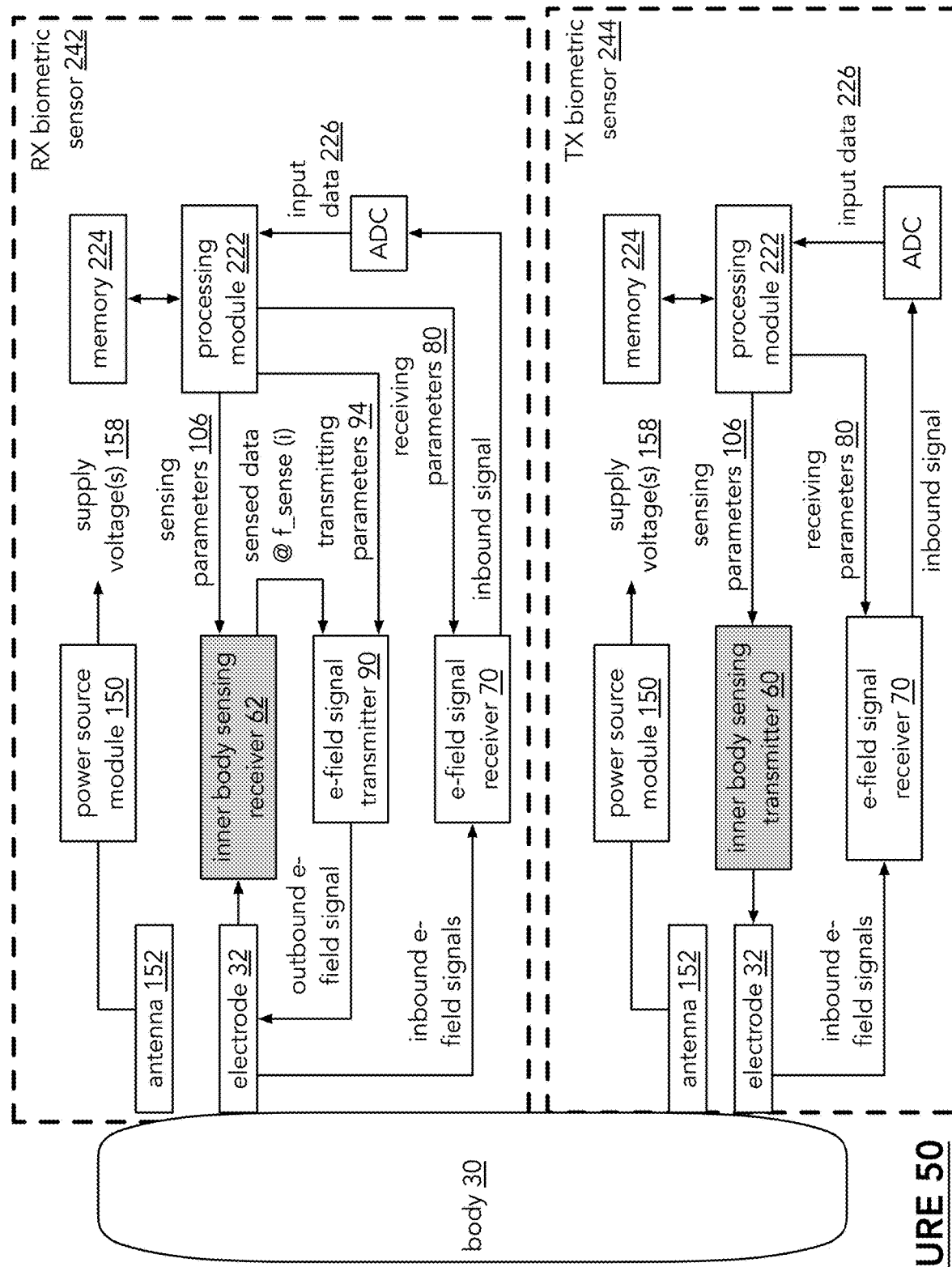
FIG. 50 is a schematic block diagram of another embodiment of a biometric sensor.

FIG. 50 is a schematic block diagram of another embodiment of a biometric sensor that includes a transmit (TX) biometric sensor 244 and a receive (RX) biometric sensor 242. The TX biometric sensor 244 includes an electrode 32, an inner body sensing transmitter 60, an e-field signal receiver 70, a power source module 150, an ADC, a processing module 222, and memory 224.

The RX biometric sensor 242 includes an electrode 32, an inner body sensing receiver 62, an e-field signal receiver 70, an e-field signal transmitter 90, a power source module 150, an ADC, a processing module 222, and memory 224. This embodiment allows for greater separation between the electrodes 32 associated with the inner body sensing transmitter 60 and receiver 62. In furtherance of this embodiment, the TX biometric sensor 244 transmits sensing signals to a plurality of RX biometric sensors 242 using different frequencies for the sensing signals or using the same frequency and a TDMA communication with the RX biometric sensors 242.

Figure 51:
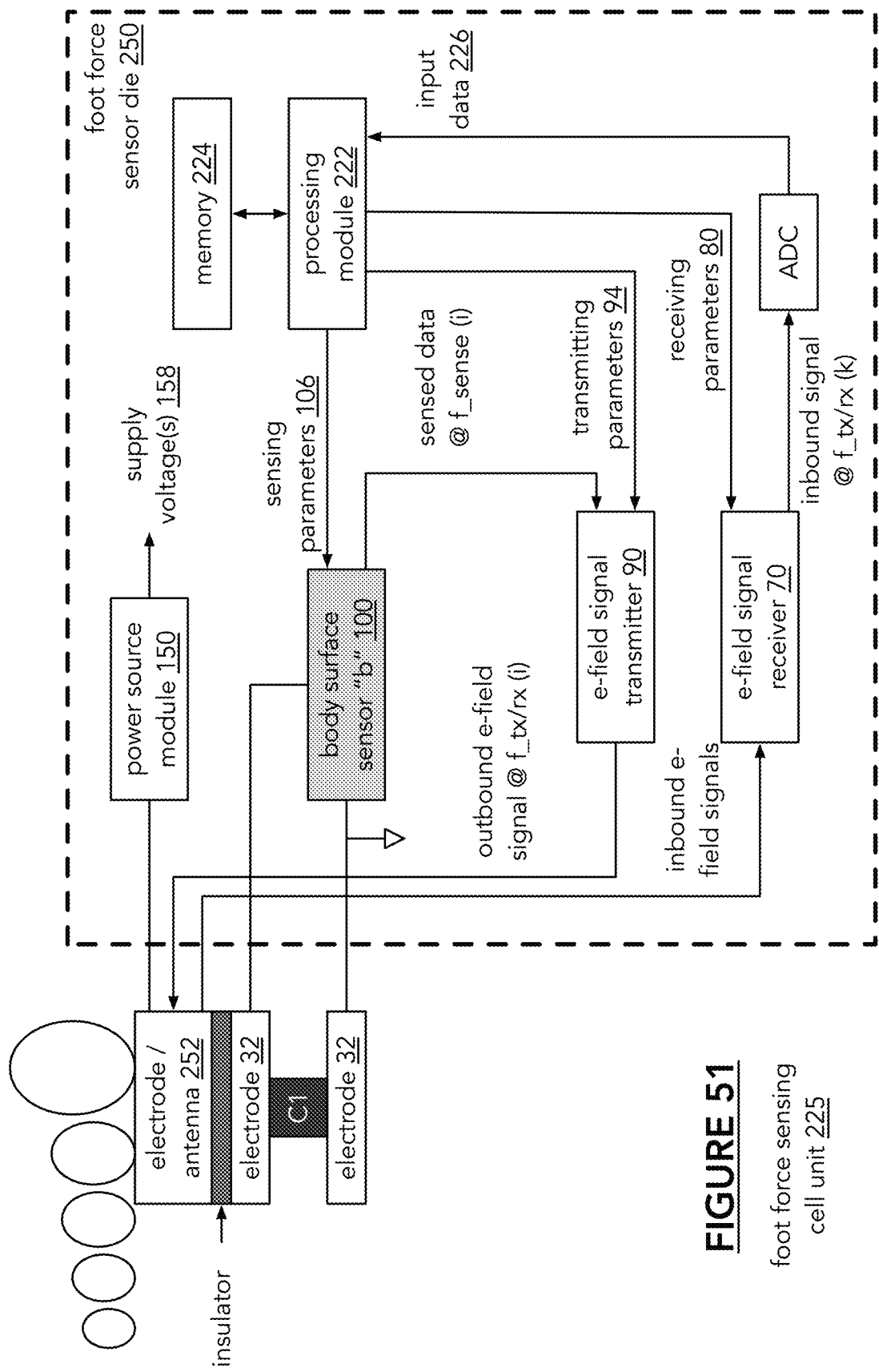
FIG. 51 is a schematic block diagram of an embodiment of a foot force sensing cell unit.

FIG. 51 is a schematic block diagram of an embodiment of a foot force sensing cell unit 225 that includes a foot force sensor die 250, an electrode/antenna 252, an insulator, electrodes 32, and a variable capacitor (C1). The foot force sensor die 250 includes an e-field signal receiver 70, an e-field signal transmitter 90, a body surface sensor "b" 100, a power source module 150, an ADC, a processing module 222, and memory 224.

When compressed, the capacitance of the capacitor C1 varies. For instance, when foot force is applied to the capacitor, its capacitance changes. The foot force sensor die 250 measures impedance of the capacitance of C1 as it varies due to varying levels of applied foot forces (e.g., varies when walking, running, etc.). The die 250 provides the varying impedance of the die as an outbound e-field signal to the communication device 12.

The communication device 12 and/or the computing device 24, processing the impedance data of the varying capacitor to first determine the capacitance values represented by the impedance data. From the capacitance values, the communication device 12 and/or the computing device 24 determines the applied foot forces based on the capacitance values.

Figure 52:
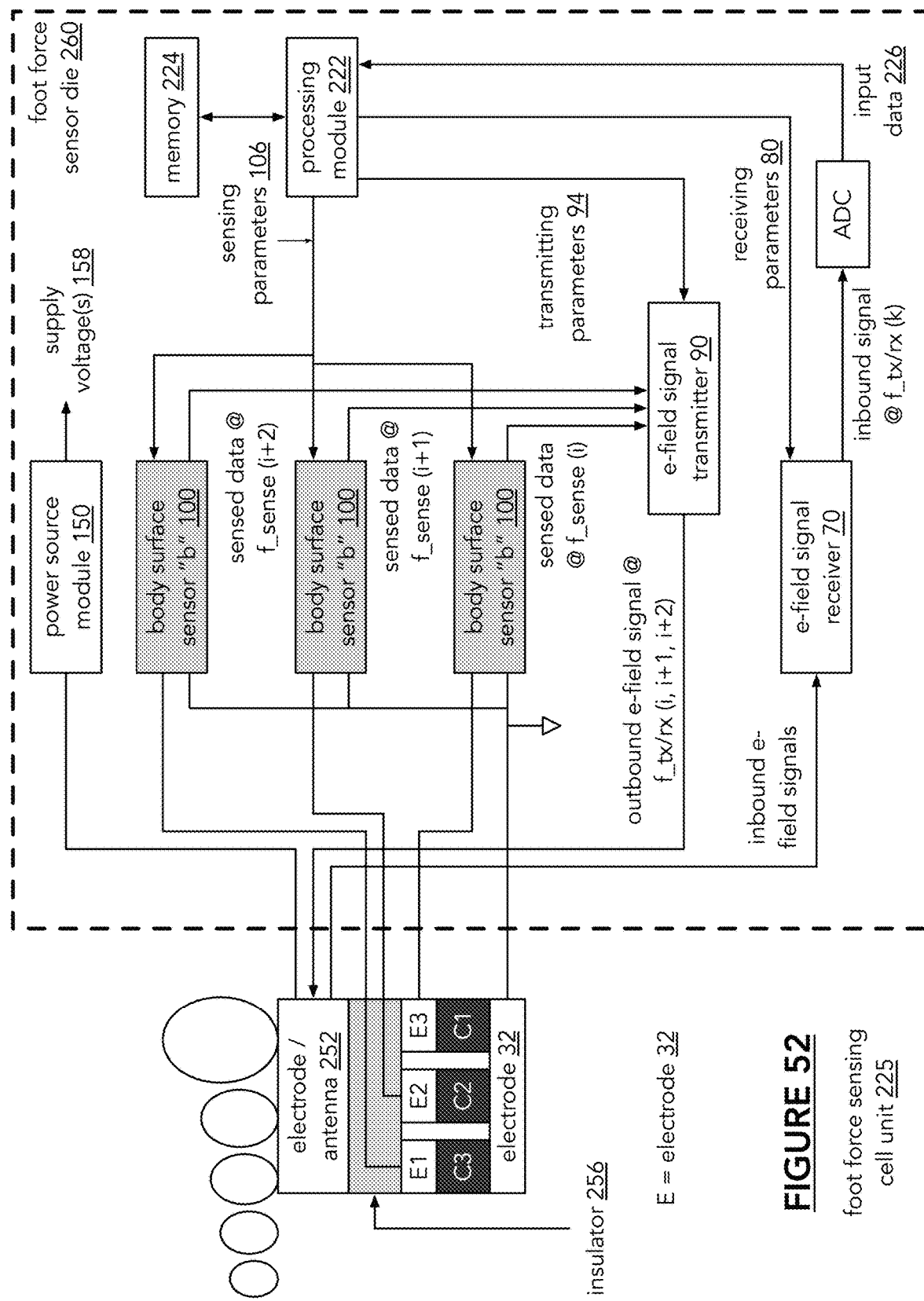
FIG. 52 is a schematic block diagram of another embodiment of a foot force sensing cell unit.

FIG. 52 is a schematic block diagram of another embodiment of a foot force sensing cell unit 225 that includes a foot force sensor die 260, an electrode/antenna 252, an insulator 256, three electrodes (E1-E3), three capacitors (C1-C3), and a shared common electrode 32. The foot force sensor die 260 includes an e-field signal receiver 70, an e-field signal transmitter 90, three body surface sensors "b" 100 (one for each capacitor), a power source module 150, an ADC, a processing module 222, and memory 224.

In this embodiment, the impedance of each of the three capacitors is sensed using individual sensing signals, each having its own sense frequency. For example, C1 is sensed by a first body surface sensor 100 that uses a first sensing signal at a first sensing frequency (e.g., f_sense (i)); C2 is sensed by a second body surface sensor 100 that uses a second sensing signal at a second sensing frequency (e.g., f_sense (i+1)); and C3 is sensed by a third body surface sensor 100 that uses a third sensing signal at a third sensing frequency (e.g., f_sense (i+2)).

Each of the sensed signals is transmitted by the e-field signal transmitter 90 using three e-field transmit frequencies. For example, the sensed data of the first capacitor at f_sense (i) is transmitted using tx/rx frequency of f_tx/rx (i)); the sensed data of the second capacitor at f_sense (i+1)) is transmitted using tx/rx frequency of f_tx/rx (i+1)); and the sensed data of the third capacitor at f_sense (i+2)) is transmitted using tx/rx frequency of f_tx/rx (i+2)).

Figure 53:
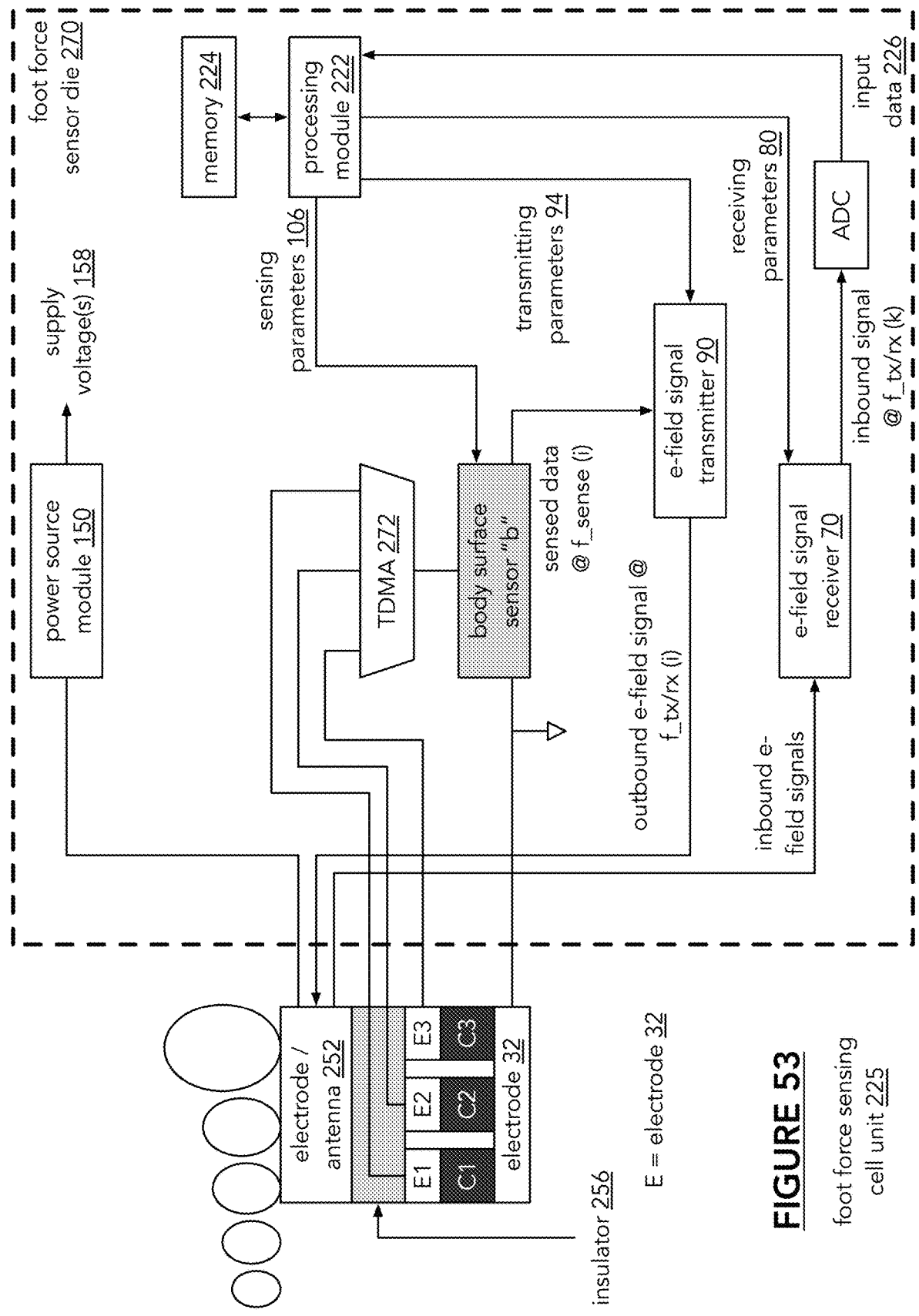
FIG. 53 is a schematic block diagram of another embodiment of a foot force sensing cell unit.

FIG. 53 is a schematic block diagram of another embodiment of a foot force sensing cell unit 225 that includes a foot force sensor die 270, an electrode/antenna 252, an insulator 256, three electrodes (E1-E3), three capacitors (C1-C3), and a shared common electrode 32. The foot force sensor die 270 includes an e-field signal receiver 70, an e-field signal transmitter 90, a body surface sensor "b" 100, a power source module 150, an ADC, a processing module 222, memory 224, and a TDMA-based multiplexer 272.

In this embodiment, the impedance of each of the three capacitors is sensed using a sensing signal that has the same frequency in a TDMA manner. For example, C1 is sensed by the body surface sensor 100 using a sensing signal at a sensing frequency (e.g., f_sense (i)) during a first time interval; C2 is sensed by the body surface sensor 100 using the sensing signal at the sensing frequency (e.g., f_sense (i)) during a second time interval; and C3 is sensed by the body surface sensor 100 using the sensing signal at the sensing frequency (e.g., f_sense (i)) during a third time interval.

Each of the sensed signals is transmitted by the e-field signal transmitter 90 using the same e-field transmit frequency in a TDMA manner. For example, the sensed data of the first capacitor is transmitted using tx/rx frequency of f_tx/rx (i)) during the first time interval; the sensed data of the second capacitor is transmitted using the tx/rx frequency during the second time interval; and the sensed data of the third capacitor is transmitted using the same tx/rx frequency during the third time interval.

FIGS. 54A-54D are a top, a front, a bottom, and a side view diagrams of an example of a foot force sensing cell unit 225 that includes a printed circuit board (PCB) 280, an electrode/antenna 252, three capacitors 284, three capacitor contact pads 282, and a foot force sensor die 260 and/or 270. The PCB functions as an insulator between the electrode/antenna 252 and the capacitor contact pads 282.

The electrode/antenna 252 includes a monopole or dipole pattern (e.g., spiral or other meandering shape) that functions as an antenna for RF communications and as an electrode for e-field signals. For efficient electromagnetic radiation of RF signals, the length of the pattern for the antenna is ½+/−10% of the wavelength of the RF signals, where the wavelength ($\lambda$)=the speed of light (c) divided by the frequency (f) of the signals (e.g., $\lambda=c/f$).

For example, an RF signal that has a frequency of 2 GHz has a wavelength of $(3*10^8 \text{ m/s})/(2*10^9 \text{ cycles/second})=$ 0.15 meters. Thus, ½ wavelength is 7.5 centimeters (cm), which would be the length of the pattern for the antenna portion of the electrode/antenna 252.

For an e-field signal that has a frequency of 1 MHz, the wavelength is $(3*10^8 \text{ m/s})/(1*10^6 \text{ cycles/second})$, which equals 300 meters. With a length of 7.5 cm, the electrode/antenna 252 is inefficient at electromagnetic radiation of the 1 MHz e-field signal but is efficient at electric field radiation of the e-field signal through the body to another electrode.

The electrode/antenna 252 is printed on the top side of the foot force sensing cell unit 225, where the top is toward the foot in a sole piece (e.g., an insole, a midsole, and/or an outsole). The capacitor contact pads 282 are printed on the bottom of the foot force sensing cell unit 225 and coupled to the IC 260/270 via printed traces. The IC 260/270 is also mounted on the bottom and soldered into place. An adhesive may also be used to further secure the IC in place.

There are a variety of ways to implement the foot force sensing cell unit 225. For example, the foot force sensing cell unit 225 is installed in a housing (not shown). As another example, the foot force sensing cell unit 225 is encapsulated with a material that has a much lower durometer rating than the capacitors 284 such that the capacitors are substantially free to move as a result of compression. As yet another example, the foot force sensing cell unit 225 includes more or less than three capacitors 284. In a further example, the foot force sensing cell unit 225 has a circular shape from the top view, where the diameter of the cell unit 225 is 0.25 inches to 2 inches, or more. In a still further example, the foot force sensing cell unit 225 has another shape (e.g., square, rectangle, oval, pentagon, hexagon, etc.) from the top view.

In an embodiment, the foot force sensing cell unit 225 is a wireless and batteryless device that is powered by recovering energy from RF signals and communicates sensed foot force data via e-field signal through a body. In another embodiment, the foot force sensing cell unit 225 is wireless and assisted passive device. By being wireless and passive device, the cell units 225 provide unparalleled durability, ease of use, and/or longevity for in-shoe foot force sensing circuits.

FIG. 55 is a schematic block diagram of an example of a sole piece 290 (e.g., insole, midsole, and/or outsole) that includes receptacles 292 for foot force sensing cell units 225. The number and positioning of the receptacles 292 varies depending on foot force sensing objectives and/or on the size of the foot force sensing cell units 225. For example, the sole piece 290 includes three receptacles: one in the heel section, one in the forefoot medial area, and the third in the forefoot lateral area. As another example, sole piece 290 includes fifteen receptacles 292 as shown. As a further example, the sole piece 290 includes twenty or more receptacles 292 for full coverage of the sole piece 290.

FIGS. 56A-56E are schematic block diagrams of an example of placing a foot force sensing cell unit 225 in a receptacle of a sole piece 290 of FIG. 55. FIG. 56A is an isometric view of a foot force sensing cell unit 225. FIG. 56B is a side view of a foot force sensing cell unit 225. FIG. 56C is a cross-section side view of a respectable 292 of the sole piece 290.

From the side view, the sole piece includes an opening 293, an upper section 295, a semi-rigid piece 296, a lower section 297. The upper section 295 is comprised of a gel, foam, rubber, TPU (thermoplastic polyurethane), EVA (ethylene-vinyl acetate), cork, plastic, and/or padding that has a lower durometer than the capacitors of the unit 225. The lower section 297 is of the same material as the upper section or a different material. If the upper and lower sections are of the same material, the sole piece includes the semi-rigid plate 296, which is comprised of plastic, rubber, a TPU, EVA, etc. that has a higher durometer than the lower and upper sections. If the lower section is of a different material (e.g., gel, foam, rubber, TPU, EVA, and/or padding and has a higher durometer than the upper section), the semi-rigid plate 296 is omitted.

The opening is sized to receive the foot force sensing cell unit 225. In the present example, the capacitors are not encapsulated or housed in a housing. As such, the opening 293 is shaped to receive the three capacitors and the printed circuit board such that the top of the printed circuit board substantially aligns with the top edge of the upper section 295.

FIG. 56D illustrates the foot force sensing cell unit 225 installed in the opening 293 of a receptacle 292. The unit 225 is secured in place via a top layer 298, which has electrical characteristics that allow the e-field signals to pass between the electrode/antenna and a foot with negligible interference and does not adversely affect the reception of RF signals by the electrode/antenna.

FIG. 56E illustrates the foot force sensing cell unit 225 installed in the opening 293 of a receptacle 292 without a top layer 296. In this example embodiment, the unit 225 is secured in the opening 293 via an adhesive, via a pressure fit, via a twist lock, via a tap & die coupling, and/or other securing mechanism.

FIG. 57 is a schematic block diagram of another example of a sole piece 290 that includes receptacles 292 for foot force sensing cell units 225. In this example, the sole piece 290 includes four receptacles 292, but could include more or less receptacles 292.

FIGS. 58A-58E are schematic block diagrams of an example of placing a foot force sensing cell 225 in a receptacle 292 of a sole piece 290 of FIG. 57. FIG. 58A is an isometric view of a foot force sensing cell unit 225. FIG. 58B is a side view of a foot force sensing cell unit 225.

FIG. 58C is a cross-section side view of a respectable 292 of the sole piece 290. From the side view, the sole piece includes an opening 293, an upper section 295, and a semi-rigid piece 296. The upper section 295 is comprised of a gel, foam, rubber, TPU (thermoplastic polyurethane), EVA (ethylene-vinyl acetate), cork, plastic, and/or padding that has a lower durometer than the capacitors of the unit 225.

FIG. 58D illustrates the foot force sensing cell unit 225 installed in the opening 293 of a receptacle 292. The unit 225 is secured in place via a top layer 298. FIG. 58E illustrates the foot force sensing cell unit 225 installed in the opening 293 of a receptacle 292 without a top layer 296. In this example embodiment, the unit 225 is secured in the opening 293 via an adhesive, via a pressure fit, via a twist lock, via a tap & die coupling, and/or other securing mechanism.

Figure 59:
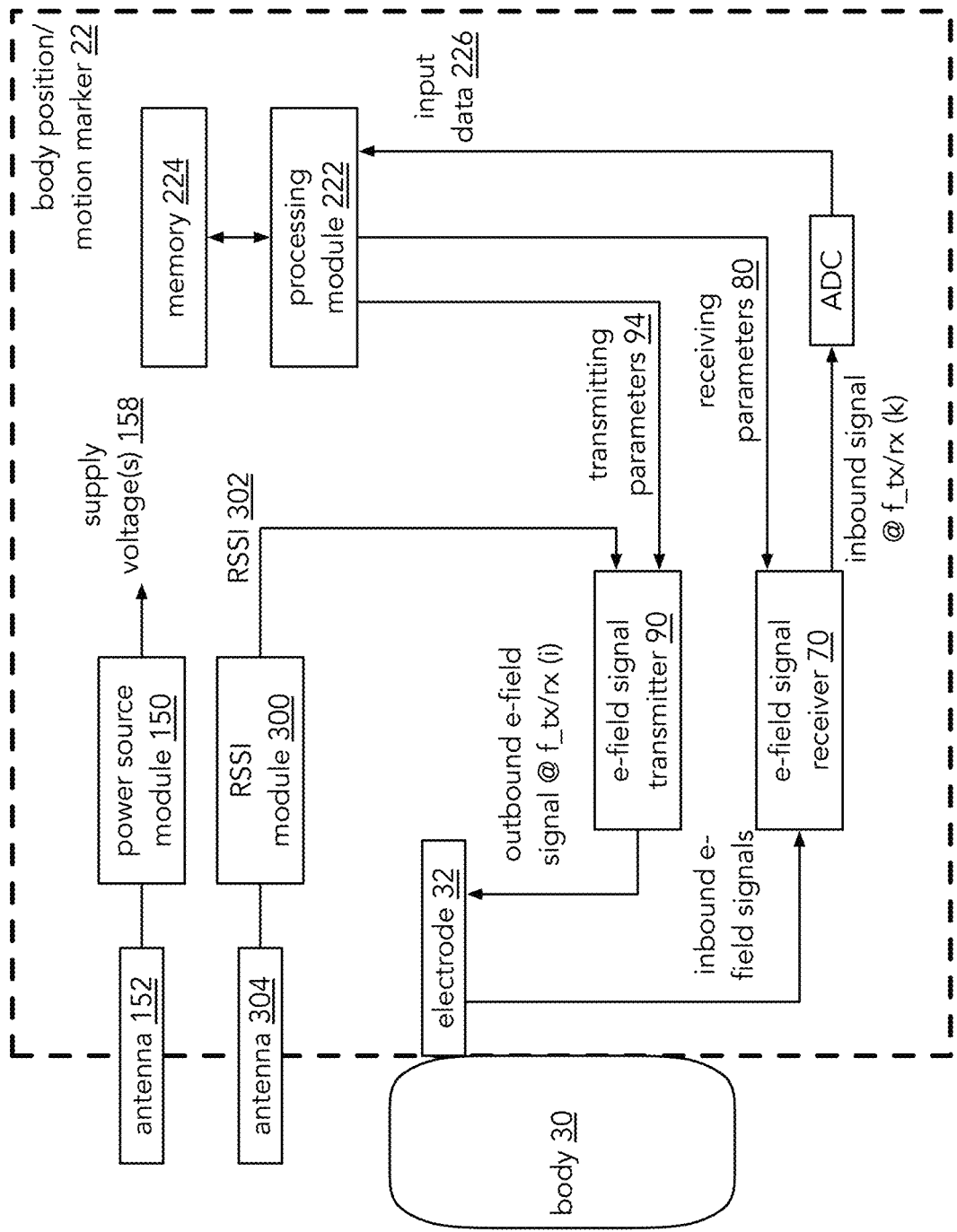
FIG. 59 is a schematic block diagram of another example of a body position/motion marker.

FIG. 59 is a schematic block diagram of another example of a body position/motion marker 22 that includes an electrode 32, an e-field signal receiver 70, an e-field signal transmitter 90, an ADC, a power source module 150, an antenna 152, a processing module 222, memory 224, an ADC, an RSSI (received signal strength indication) module 300, and a second antenna 304. The electrode 32, the e-field signal receiver 70, the e-field signal transmitter 90, the ADC, the power source module 150, the antenna 152, the processing module 222, the memory 224, and the ADC function as previously discussed regarding inbound e-field signals, inbound signals, input data 226, transmitting parameters 94, and receiving parameters 80.

In this embodiment, the personal coordinate unit 20 transmits an RF signal to the marker 22 (e.g., a 28 GHz and/or 60 GHz signal). The antenna 304, which is sized for 28 GHz and/or 60 GHz signals, receives the RF signal. The RSSI module 300 determines the RSSI 302 of the RF signal and provides it as outbound data to the e-field signal transmitter 90. The e-field signal transmitter 90 converts the RSSI 302 (e.g., one or more RSSI measurements) into an outbound e-field signal that is conveyed through the electrode 32 and the body 30 to the communication device 12.

Figure 60:
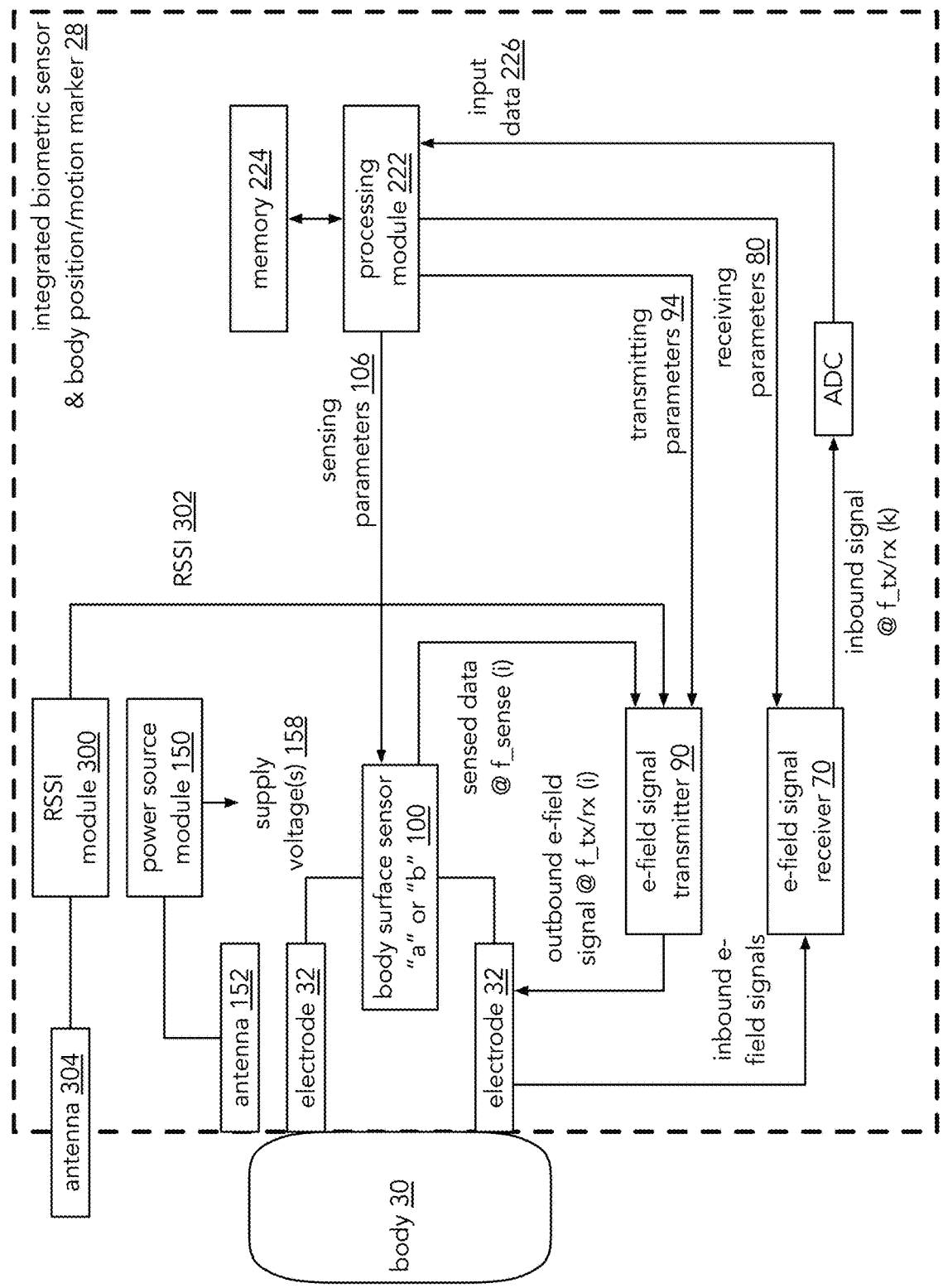
FIG. 60 is a schematic block diagram of another example of an integrated biometric sensor and body position/motion marker.

FIG. 60 is a schematic block diagram of another example of an integrated biometric sensor and body position/motion marker 28 that includes electrodes 32, an e-field signal receiver 70, an e-field signal transmitter 90, a body surface sensor 100, a power source module 150, an antenna 152, an ADC, a processing module 222, memory 224, an RSSI module 300, and a second antenna 304. The processing module 222 coordinates e-field signal transmissions of the body sensed data and the RSSI data 302. In an embodiment, the body sensed data and the RSSI data are assigned individual tx/rx e-field frequencies such that they can be transmitted concurrently. In another embodiment, e-field signal transmission of the body sensed data and the RSSI data uses the same tx/rx e-field frequency in a time sharing manner.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While transistors may be shown in one or more of the above-described figure(s) as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

As applicable, one or more functions associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, and/or other AI. The human mind is not equipped to perform such AI techniques, not only due to the complexity of these techniques, but also due to the fact that artificial intelligence, by its very definition—requires "artificial" intelligence—i.e., machine/non-human intelligence.

As applicable, one or more functions associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

As applicable, one or more functions associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

As applicable, one or more functions associated with the methods and/or processes described herein can be implemented in a system that is operable to electronically store digital data in a memory device. Such storage cannot practically be performed by the human mind because the human mind is not equipped to electronically store digital data.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A personal monitoring system comprises:
a passive biometric sensor operable to:
sense a body condition of a body in accordance with a sense signal at a sense frequency to produce sensed data of the body condition; and
transmit an e-field signal via the body regarding the sensed data, wherein the e-field signal is in accordance with an e-field transmit/receive frequency; and
a communication device operable to:
receive the e-field signal via the body; and
recover the sensed data from the received e-field signal.

2. The personal monitoring system of claim 1 further comprises:
a second passive biometric sensor operable to:
sense a second body condition of the body in accordance with a second sense signal at a second sense frequency to produce second sensed data of the second body condition; and
transmit a second e-field signal via the body regarding the second sensed data, wherein the second e-field signal is in accordance with a second e-field transmit/receive frequency; and
the communication device is further operable to:
receive the second e-field signal via the body; and
recover the second sensed data from the second received e-field signal.

3. The personal monitoring system of claim 1, wherein the communication device further comprises:
an external wireless communication module for wireless communications with a computing device.

4. The personal monitoring system of claim 1 further comprises:
the communication device is further operable to transmit input data to the passive biometric sensor via a transmit e-field signal; and
the passive biometric sensor is further operable to:
receive the transmit e-field signal via the body; and
recover the input data from the received transmit e-field signal.

5. The personal monitoring system of claim 1, wherein the body condition comprises one or more of:
heart rate;
respiration;
perspiration;
temperature;
hydration; and
a neurological system.

6. The personal monitoring system of claim 1, wherein communication is further operable to:
assign the sense frequency and the e-field transmit/receive frequency to the passive biometric sensor.

7. The personal monitoring system of claim 1 further comprises:
the communication device as a component of a computing device.

8. A personal monitoring system comprises:
a passive foot force sensing unit operable to:
sense a body force of a body in accordance with a sense signal at a sense frequency to produce sensed force data of a body condition; and
transmit an e-field signal via the body regarding the sensed force data, wherein the e-field signal is in accordance with an e-field transmit/receive frequency; and a communication device operable to:
  receive the e-field signal via the body; and
  recover the sensed force data from the received e-field signal.

9. The personal monitoring system of claim 8 further comprises:
a second passive foot force sensing unit operable to:
  sense a second body force of the body in accordance with a second sense signal at a second sense frequency to produce second sensed force data of the second body condition; and
  transmit a second e-field signal via the body regarding the second sensed force data, wherein the second e-field signal is in accordance with a second e-field transmit/receive frequency; and
the communication device is further operable to:
  receive the second e-field signal via the body; and
  recover the second sensed force data from the second received e-field signal.

10. The personal monitoring system of claim 8, wherein the communication device further comprises:
an external wireless communication module for wireless communications with a computing device.

11. The personal monitoring system of claim 8 further comprises:
the communication device is further operable to transmit input data to the passive foot force sensing unit via a transmit e-field signal; and
the passive foot force sensing unit is further operable to:
  receive the transmit e-field signal via the body; and
  recover the input data from the received transmit e-field signal.

12. The personal monitoring system of claim 8, wherein communication is further operable to:
assign the sense frequency and the e-field transmit/receive frequency to the passive foot force sensing unit.

13. The personal monitoring system of claim 8 further comprises:
the communication device as a component of a computing device.

14. A personal monitoring system comprises:
a passive body position marker operable to:
  receive a radio frequency (RF) signal;
  determine a signal strength of received RF signal; and
  transmit, via the RF signal, a signal regarding the signal strength;
a personal coordinate unit operable to:
  receive the signal regarding the signal strength;
  transmit an e-field signal via a body regarding the signal strength, wherein the e-field signal is in accordance with an e-field transmit/receive frequency; and
a communication device operable to:
  receive the e-field signal via the body; and
  recover the signal strength from the received e-field signal.

15. The personal monitoring system of claim 14 further comprises:
a second passive body position marker operable to:
  receive the RF signal;
  determine a second signal strength of received RF signal; and
  transmit, via the RF signal, a second signal regarding the second signal strength;
the personal coordinate unit is further operable to:
  receive the second signal regarding the second signal strength;
  transmit a second e-field signal via the body regarding the second signal strength, wherein the second e-field signal is in accordance with a second e-field transmit/receive frequency; and
the communication device is further operable to:
  receive the second e-field signal via the body; and
  recover the second signal strength from the received second e-field signal.

16. The personal monitoring system of claim 14, wherein the communication device further comprises:
an external wireless communication module for wireless communications with a computing device.

17. The personal monitoring system of claim 14 further comprises:
the communication device is further operable to transmit input data to the passive body position marker and/or the personal coordinate unit via a transmit e-field signal; and
the passive body position marker and/or the personal coordinate unit is/are further operable to:
  receive the transmit e-field signal via the body; and
  recover the input data from the received transmit e-field signal.

18. The personal monitoring system of claim 14, wherein communication is further operable to:
assign the sense frequency and the e-field transmit/receive frequency to the personal coordinate unit.

19. The personal monitoring system of claim 14 further comprises:
the communication device as a component of a computing device.

* * * * *